United States Patent
Suzuki

(10) Patent No.: US 11,967,681 B2
(45) Date of Patent: Apr. 23, 2024

(54) METHOD OF MANUFACTURING ALL-SOLID STATE SECONDARY BATTERY, ELECTRODE SHEET FOR ALL-SOLID STATE SECONDARY BATTERY, AND METHOD OF MANUFACTURING ELECTRODE SHEET FOR ALL-SOLID STATE SECONDARY BATTERY

(71) Applicant: FUJIFILM Corporation, Tokyo (JP)

(72) Inventor: Hideyuki Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 600 days.

(21) Appl. No.: 17/170,780

(22) Filed: Feb. 8, 2021

(65) Prior Publication Data

US 2021/0336297 A1    Oct. 28, 2021

Related U.S. Application Data

(63) Continuation of application No. PCT/JP2019/037484, filed on Sep. 25, 2019.

(30) Foreign Application Priority Data

Sep. 27, 2018    (JP) .................................. 2018-182797

(51) Int. Cl.
*H01M 4/00* (2006.01)
*H01M 4/04* (2006.01)
(Continued)

(52) U.S. Cl.
CPC ....... *H01M 10/0585* (2013.01); *H01M 4/043* (2013.01); *H01M 4/139* (2013.01);
(Continued)

(58) Field of Classification Search
CPC ........ H01M 4/62; H01M 4/139; H01M 4/131; H01M 4/0404; H01M 10/0562; H01M 10/0525
See application file for complete search history.

(56) References Cited

U.S. PATENT DOCUMENTS

| | | |
|---|---|---|
| 9,484,568 B2 | 11/2016 | Nagasaka et al. |
| 2013/0209873 A1 | 8/2013 | Nagasaka et al. |

(Continued)

FOREIGN PATENT DOCUMENTS

| | | |
|---|---|---|
| JP | H05109429 | 4/1993 |
| JP | 2008243735 | 10/2008 |

(Continued)

OTHER PUBLICATIONS

Yoshida et al., Binder Composition for All-solid Secondary Batteries, Slurry Composition for All-solid Secondary Batteries, Solid Electrolyte-containing Layer, and All-solid Secondary Batteries, May 2021, See the Abstract. (Year: 2021).*

(Continued)

*Primary Examiner* — Cynthia H Kelly
*Assistant Examiner* — Monique M Wills
(74) *Attorney, Agent, or Firm* — JCIPRNET

(57) ABSTRACT

Provided is a method of manufacturing an all-solid state secondary battery having a layer configuration in which a positive electrode active material layer, a solid electrolyte layer, and a negative electrode active material layer are laminated in this order, the method comprising: a precompression bonding step of laminating a solid electrolyte layer and one of a positive electrode active material layer or a negative electrode active material layer to form a laminate and compressing the laminate to bond the layers, the solid electrolyte layer being formed on a support and including a binder consisting of a polymer and an inorganic solid (Continued)

electrolyte; a step of peeling off the support from the solid electrolyte layer such that 1% to 10 mass % of the solid electrolyte layer that is compressed and bonded to the active material layer remains in the support; and a post-compression bonding step of laminating the solid electrolyte layer from which the support is peeled off and another one of the positive electrode active material layer or the negative electrode active material layer to form a laminate and compressing the laminate to bond the layers. Provided also are an electrode sheet for an all-solid state secondary battery that is manufactured in the manufacturing method, and a method of manufacturing the electrode sheet for an all-solid state secondary battery.

8 Claims, 3 Drawing Sheets

(51) Int. Cl.
*H01M 4/139* (2010.01)
*H01M 10/0562* (2010.01)
*H01M 10/0585* (2010.01)
*H01M 10/0525* (2010.01)

(52) U.S. Cl.
CPC .... *H01M 10/0562* (2013.01); *H01M 10/0525* (2013.01); *H01M 2300/0068* (2013.01)

(56) References Cited

U.S. PATENT DOCUMENTS

| | | |
|---|---|---|
| 2013/0295432 A1 | 11/2013 | Inoue |
| 2018/0277891 A1 | 9/2018 | Mimura et al. |
| 2018/0309167 A1 | 10/2018 | Kaga et al. |
| 2021/0091409 A1 | 3/2021 | Mimura et al. |

FOREIGN PATENT DOCUMENTS

| | | | | |
|---|---|---|---|---|
| JP | 2008293721 | 12/2008 | | |
| JP | 5144846 | 2/2013 | | |
| JP | 2015118870 | 6/2015 | | |
| JP | 2017103253 | 6/2017 | | |
| JP | 2021072283 A | * 5/2021 | ............. | Y02P 70/50 |
| KR | 20130130704 | 12/2013 | | |
| KR | 20210060481 A | * 5/2021 | ............. | H01M 4/62 |
| WO | 2012053359 | 4/2012 | | |
| WO | 2017099248 | 6/2017 | | |
| WO | 2017141735 | 8/2017 | | |

OTHER PUBLICATIONS

Nakanishi et al. Solid Electrolyte, Solid Electrolyte Battery and Method for Manufacturing the Same, May 2021, See the Abstract. (Year: 2021).*

"Office Action of Japan Counterpart Application" with English translation thereof, dated Nov. 2, 2021, p. 1-p. 7.

"International Search Report (Form PCT/ISA/210) of PCT/JP2019/037484," dated Dec. 17, 2019, with English translation thereof, pp. 1-5.

"Written Opinion of the International Searching Authority (Form PCT/ISA/237) of PCT/JP2019/037484," dated Dec. 17, 2019, with English translation thereof, pp. 1-8.

"Search Report of Europe Counterpart Application", dated Oct. 7, 2021, pp. 1-8.

"Office Action of Korea Counterpart Application" with English translation thereof, dated Nov. 3, 2022, p. 1-p. 6.

* cited by examiner

METHOD OF MANUFACTURING ALL-SOLID STATE SECONDARY BATTERY, ELECTRODE SHEET FOR ALL-SOLID STATE SECONDARY BATTERY, AND METHOD OF MANUFACTURING ELECTRODE SHEET FOR ALL-SOLID STATE SECONDARY BATTERY

CROSS-REFERENCE TO RELATED APPLICATIONS

This application is a Continuation of PCT International Application No. PCT/JP2019/037484 filed on Sep. 25, 2019, which claims priority under 35 U.S.C. § 119 (a) to Japanese Patent Application No. 2018-182797 filed in Japan on Sep. 27, 2018. Each of the above applications is hereby expressly incorporated by reference, in its entirety, into the present application.

BACKGROUND OF THE INVENTION

1. Field of the Invention

The present invention relates to a method of manufacturing an all-solid state secondary battery, an electrode sheet for an all-solid state secondary battery, and a method of manufacturing an electrode sheet for an all-solid state secondary battery.

2. Description of the Background Art

In an all-solid state secondary battery, a negative electrode, an electrolyte, and a positive electrode are all solid, and safety or reliability which is considered an issue of batteries including an organic electrolytic solution can be significantly improved. In addition, the service lives can also be extended. Further, an all-solid state secondary battery may have a structure in which electrodes and an electrolyte are directly disposed in series. Therefore, the energy density can be further increased as compared to a secondary battery in which an organic electrolytic solution is used, and the application to an electric vehicle or a large-sized storage battery is expected.

In general, the all-solid state secondary battery has a layer configuration in which a negative electrode active material layer, a solid electrolyte layer, and a positive electrode active material layer are laminated in this order. Regarding a method of manufacturing the all-solid state secondary battery having the above-described layer configuration, various techniques are disclosed. For example, a manufacturing technique of compressing and bonding (pressing) a constituent layer can be used. For example, JP2008-293721A describes a method including: laminating an electrolyte film and a first electrode layer on a high modulus of elasticity member in this order; compressing the laminate; peeling off the high modulus of elasticity member; and laminating a second electrode layer on the electrolyte film. In addition, JP2015-118870A describes a method including: laminating a first laminate in which a positive electrode mixture layer and a solid electrolyte layer are compressed and joined and a second laminate in which a negative electrode mixture layer and a solid electrolyte layer are compressed and joined such that the solid electrolyte layers of the laminates overlap each other; and compressing and joining the laminates.

SUMMARY OF THE INVENTION

In general, a constituent layer of the all-solid state secondary battery such as a negative electrode active material layer, a solid electrolyte layer, or a positive electrode active material layer is formed of solid particles (for example, an inorganic solid electrolyte, solid particles, or a conductive auxiliary agent). Therefore, from the viewpoint of the battery performance, in particular, battery resistance, of the all-solid state secondary battery, it is important to laminate the layers with not only high adhesion between solid particles in the respective layers but also high interlaminar adhesion between adjacent layers.

However, in the method of pressing a laminate including a negative electrode active material layer, a solid electrolyte layer, and a positive electrode active material layer multiple times to form a laminate, the respective layers cannot be compressed and bonded with sufficient interlaminar adhesion. For example, in a case where the positive electrode active material layer and the solid electrolyte layer are compressed and bonded using the method described in JP2008-293721A, a surface of the solid electrolyte layer where the negative electrode active material layer is provided is typically flat. Therefore, even in a case where the solid electrolyte layer and the negative electrode active material layer are compressed and bonded, strong interlaminar adhesion is not exhibited. In the method described in JP2015-118870A, the formation of a void at an interface between each of the active material layers and the solid electrolyte layer can be prevented by further compressing and bonding the solid electrolyte layers that are compressed and bonded to the positive electrode active material layer and the negative electrode active material layer, respectively. However, surfaces of the solid electrolyte layers that are compressed and bonded are flat. Therefore, the solid electrolyte layers cannot strongly adhere to each other, and the improvement is required.

In particular, recently, the performance of an electric vehicle has increased, and research and development for practical use or the like has rapidly progressed. Therefore, battery performance required for the all-solid state secondary battery has increased. Therefore, a method of strengthening the interlaminar adhesion of the constituent layers to manufacture an all-solid state secondary battery having higher battery performance is required.

An object of the present invention is to provide a method of compressing and bonding constituent layers with stronger interlaminar adhesion to manufacture an all-solid state secondary battery having higher battery performance with high productivity. In addition, another object of the present invention is to provide: an electrode sheet for an all-solid state secondary battery that is manufactured as an intermediate product using the above-described manufacturing method; and a method of manufacturing the electrode sheet for an all-solid state secondary battery.

The present inventors repeatedly conducted a thorough investigation and found that, in a method of sequentially compressing and bonding a negative electrode active material layer, a solid electrolyte layer, and a positive electrode active material layer, when a support is peeled after compressing and bonding one of the positive electrode active material layer or the negative electrode active material layer and the solid electrolyte layer formed on the support, a part of the solid electrolyte layer is made to remain in the support such that the solid electrolyte layer and another active material layer laminated on the solid electrolyte layer can be compressed and bonded with strong interlaminar adhesion. Further, it was found that the all-solid state secondary battery manufactured as described above exhibits excellent battery performance (low battery resistance). The present invention has been completed based on the above findings as a result of repeated investigation.

That is, the above-described objects have been achieved by the following means.

<1> A method of manufacturing an all-solid state secondary battery having a layer configuration in which a positive electrode active material layer, a solid electrolyte layer, and a negative electrode active material layer are laminated in this order, the method comprising:
a pre-compression bonding step of laminating a solid electrolyte layer and one of a positive electrode active material layer or a negative electrode active material layer to form a laminate and compressing the laminate to bond the layers, the solid electrolyte layer being formed on a support and including a binder consisting of a polymer and an inorganic solid electrolyte;
a step of peeling off the support from the solid electrolyte layer such that 1% to 10 mass % of the solid electrolyte layer that is compressed and bonded to the active material layer remains in the support; and
a post-compression bonding step of laminating the solid electrolyte layer from which the support is peeled off and another one of the positive electrode active material layer or the negative electrode active material layer to form a laminate and compressing the laminate to bond the layers.

<2> The method of manufacturing an all-solid state secondary battery according to <1>, further comprising:
a step of forming a film on the support using a solid electrolyte composition including a binder consisting of a polymer and an inorganic solid electrolyte before the pre-compression bonding step.

<3> The method of manufacturing an all-solid state secondary battery according to <1> or <2>,
in which the binder is a particle binder.

<4> The method of manufacturing an all-solid state secondary battery according to any one of <1> to <3>,
in which in the pre-compression bonding step, a content of the binder in the solid electrolyte layer is 2% to 5 mass % and a compression force is 5 to 100 MPa.

<5> The method of manufacturing an all-solid state secondary battery according to any one of <1> to <4>,
in which a thickness of the solid electrolyte layer formed on the support is 20 to 100 μm.

<6> The method of manufacturing an all-solid state secondary battery according to any one of <1> to <5>,
in which in the peeling step, the support is peeled off in a state where 1% to 5 mass % of the solid electrolyte layer remains.

<7> The method of manufacturing an all-solid state secondary battery according to any one of <1> to <6>, further comprising:
a final compression step of compressing the laminate that is obtained in the post-compression bonding step and includes the positive electrode active material layer, the solid electrolyte layer, and the negative electrode active material layer at a compression force of 100 to 1000 MPa.

<8> An electrode sheet for an all-solid state secondary battery comprising:
one of a positive electrode active material layer or a negative electrode active material layer; and
a solid electrolyte layer that is laminated on the active material layer,
in which the solid electrolyte layer includes a binder consisting of a polymer and an inorganic solid electrolyte and has unevenness on a surface.

<9> A method of manufacturing the electrode sheet for an all-solid state secondary battery according to <8>, the method comprising:
a pre-compression bonding step of laminating a solid electrolyte layer and one of a positive electrode active material layer or a negative electrode active material layer to form a laminate and compressing the laminate to bond the layers, the solid electrolyte layer being formed on a support; and
a step of peeling off the support from the solid electrolyte layer such that 1% to 10 mass % of the solid electrolyte layer that is compressed and bonded to the active material layer remains in the support.

The present invention can provide a method of strongly compressing and bonding (also referred to as "adhering" or simply "compressing") an active material layer and a solid electrolyte layer to manufacturing an all-solid state secondary battery having high battery performance with high productivity. In addition, the present invention can also provide: an electrode sheet for an all-solid state secondary battery that is manufactured as an intermediate product using the above-described manufacturing method; and a method of manufacturing the electrode sheet for an all-solid state secondary battery.

The above-described and other characteristics and advantageous effects of the present invention will be clarified from the following description appropriately with reference to the accompanying drawings.

DESCRIPTION OF THE PREFERRED EMBODIMENTS

Figure 1:
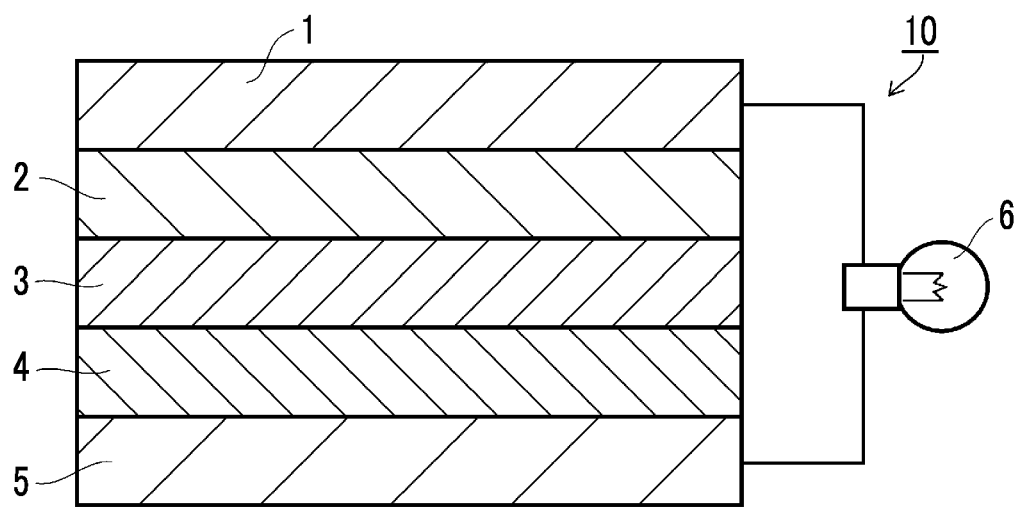
FIG. 1 is a vertical cross-sectional view schematically showing an all-solid state secondary battery according to a preferred embodiment of the present invention.

In the present invention, "layers being compressed and bonded" represents that the layers are bonded (joined) and integrated to form a laminate by laminating the layers directly (adjacent to each other).

In addition, in the present invention, "a solid electrolyte layer is transferred to an active material layer" represents that the active material layer and the solid electrolyte layer are compressed and bonded in a state (contact state) where they can be directly laminated such that they are integrated to form a laminate. In the manufacturing method according to an embodiment of the present invention, specifically, "a solid electrolyte layer is transferred to an active material layer" represents that the solid electrolyte layer and the active material layer formed on a support are compressed and bonded and the support is peeled off such that a laminate including the active material layer and the solid electrolyte layer is formed. This operation is performed by a pre-compression bonding step and a peeling step defined by the present invention.

In the present invention, it is assumed that, in a case where a plurality of constituent layers having the same composition are directly laminated and are formed separately, each of the layers is one layer. For example, in JP2015-118870A, it is assumed that solid electrolyte layers that are compressed and bonded to a positive electrode mixture layer and a negative electrode mixture layer, respectively, have a two-layer laminate structure irrespective of whether they are directly laminated or have the same composition.

In the present invention, a layer formed in each of steps will be referred to as "negative electrode active material layer", "positive electrode active material layer", or "solid electrolyte layer". To be exact, a layer formed in each of steps and a layer (layer during of after a final compression step) incorporated into an all-solid state secondary battery are not the same (for example, the thickness of the layer decreases), but the same name is used for the layers for easy understanding. In a case where it is necessary to distinguish a layer formed in each of steps from a layer incorporated into an all-solid state secondary battery, the layer will also be referred to as an applied and dried layer of (each of compositions).

In the present invention, numerical ranges represented by "to" include numerical values before and after "to" as lower limit values and upper limit values.

In the present invention, the simple expression "acryl" or "(meth)acryl" refers to acryl and/or methacryl.

First, an all-solid state secondary battery and an electrode sheet for an all-solid state secondary battery that are manufactured using a method of manufacturing an all-solid state secondary battery and a method of manufacturing an electrode sheet for an all-solid state secondary battery according to an embodiment of the present invention (both of which will be collectively referred to as "the manufacturing method according to the embodiment of the present invention") will be described. Further, a sheet for an all-solid state secondary battery that is suitably used in the manufacturing method according to the embodiment of the present invention will be described.

[All-Solid State Secondary Battery]

The all-solid state secondary battery that is manufactured using the method of manufacturing an all-solid state secondary battery according to the embodiment of the present invention has a layer configuration in which a positive electrode active material layer, a solid electrolyte layer, and a negative electrode active material layer are directly laminated in this order. More specifically, the all-solid state secondary battery includes: the positive electrode active material layer; the negative electrode active material layer that faces the positive electrode active material layer; and the solid electrolyte layer that is disposed between the positive electrode active material layer and the negative electrode active material layer to be adjacent to the positive electrode active material layer and the negative electrode active material layer. In the all-solid state secondary battery, the respective layers including the positive electrode active material layer, the solid electrolyte layer, and the negative electrode active material layer are laminated (bonded) with strong interlaminar adhesion.

It is preferable that a positive electrode current collector is provided on a surface of the positive electrode active material layer opposite to the solid electrolyte layer to form a positive electrode. Likewise, it is preferable that a negative electrode current collector is provided on a surface of the negative electrode active material layer opposite to the solid electrolyte layer to form a negative electrode.

The thickness of each of the layers in the all-solid state secondary battery is not particularly limited and is preferably 10 to 1,000 µm and more preferably 20 µm or more and less than 500 µm in consideration of the dimension of a general all-solid state secondary battery. The thickness of at least one of the positive electrode active material layer or the negative electrode active material layer is still more preferably 50 µm or more and less than 500 µm.

In the present invention, both of the positive electrode active material layer and the negative electrode active material layer will also be simply referred to as "active material layer". In addition, both of a positive electrode active material and a negative electrode active material will also be simply referred to as "active material".

The positive electrode active material layer, the solid electrolyte layer, and the negative electrode active material layer are formed of respective compositions described below, and the kind of a component in each of the layers and the content thereof are the same as the kind of a component in each of the compositions and the content thereof with respect to the solid content of each of the compositions. The positive electrode active material layer or the negative electrode active material layer to which the solid electrolyte layer is compressed and bonded in the pre-compression bonding step described below may be a layer (metal layer) formed of metal. Examples of the metal layer that is suitable as the negative electrode active material layer include a layer formed by deposition or forming of lithium metal powder and a lithium metal layer such as a lithium foil or a lithium deposited film. The thickness of the lithium metal layer is not limited to the above-described thickness of the negative electrode active material layer and may be, for example, 1 to 500 µm.

[Case]

Depending on uses, the all-solid state secondary battery according to the embodiment of the present invention may be used as the all-solid state secondary battery having the above-described structure as it is but is preferably sealed in an appropriate case to be used in the form of a dry cell. The case may be a metallic case or a resin (plastic) case. In a case where a metallic case is used, examples thereof include an aluminum alloy case and a stainless steel case. It is preferable that the metallic case is classified into a positive electrode-side case and a negative electrode-side case and that the positive electrode-side case and the negative electrode-side case are electrically connected to the positive electrode current collector and the negative electrode current collector, respectively. The positive electrode-side case and the negative electrode-side case are preferably integrated by being joined together through a gasket for short-circuit prevention.

Hereinafter, an all-solid state secondary battery according to a preferred embodiment of the present invention will be described with reference to FIG. 1, but the present invention is not limited thereto.

FIG. 1 is a cross-sectional view schematically showing the all-solid state secondary battery (lithium ion secondary battery) according to the preferred embodiment of the present invention. In the case of being seen from the negative electrode side, an all-solid state secondary battery 10 of the present embodiment includes a negative electrode current collector 1, a negative electrode active material layer 2, a solid electrolyte layer 3, a positive electrode active material layer 4, and a positive electrode current collector 5 in this order. The respective layers have a layer structure in which they are in contact with one another and adjacent to each other. In a case in which the above-described layer structure is adopted, during charging, electrons (e) are supplied to the negative electrode side, and lithium ions ($Li^+$) are accumulated in the negative electrode side. On the other hand, during discharging, the lithium ions ($Li^+$) accumulated in the negative electrode side return to the positive electrode, and electrons are supplied to an operation portion 6. In an example shown in the drawing, an electric bulb is adopted as a model of the operation portion 6 and is lit by discharging.

Figure 2:
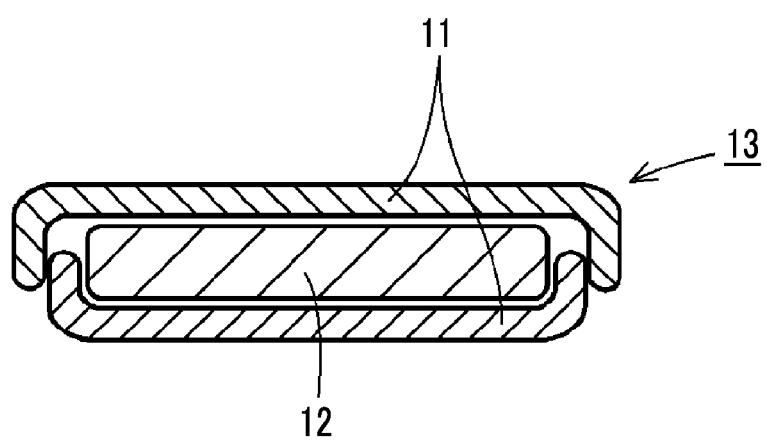
FIG. 2 is a vertical cross-sectional view schematically showing a coin type all-solid state secondary battery prepared in Example.

In a case where the all-solid state secondary battery having a layer configuration shown in FIG. 1 is put into a 2032-type coin case, the all-solid state secondary battery will be referred to as "laminate 12 for an all-solid state secondary battery" as shown in FIG. 2, and a battery prepared by putting this laminate 12 for an all-solid state secondary battery into a 2032-type coin case 11 will also be referred to as "coin-type all-solid state secondary battery 13".

(Positive Electrode Active Material Layer, Solid Electrolyte Layer, and Negative Electrode Active Material Layer)

In the all-solid state secondary battery 10, the respective layers including the positive electrode active material layer 4, the solid electrolyte layer 3, and the negative electrode active material layer 2 are laminated with strong interlaminar adhesion, and excellent battery performance is exhibited. In the all-solid state secondary battery 10, the negative electrode active material layer 4 and the positive electrode active material layer 2 are formed of a negative electrode composition and a positive electrode composition described below, respectively.

Although not shown in FIG. 1, in the all-solid state secondary battery 10, a functional layer or member, the above-described case, or the may be appropriately interposed or disposed between the negative electrode current collector 1 and the negative electrode active material layer 2, between the positive electrode active material layer 4 and the positive electrode current collector 5, or on the outside of the all-solid state secondary battery 10. In addition, each of the layers may have a single-layer configuration or a multi-layer configuration but preferably has a multi-layer configuration.

[Electrode Sheet for all-Solid State Secondary Battery]

The electrode sheet for an all-solid state secondary battery according to the embodiment of the present invention is suitably used for the all-solid state secondary battery according to the embodiment of the present invention. This electrode sheet for an all-solid state secondary battery includes: one of the positive electrode active material layer or the negative electrode active material layer; and the solid electrolyte layer that is laminated (compressed and bonded) on the active material layer. The solid electrolyte layer includes a binder consisting of a polymer and an inorganic solid electrolyte and has unevenness on a surface. It is preferable that the electrode sheet for an all-solid state secondary battery according to the embodiment of the present invention is manufactured by the pre-compression bonding step and the peeling step in the method of manufacturing an all-solid state secondary battery according to the embodiment of the present invention described below, and preferable examples thereof include an electrode sheet 15 for an all-solid state secondary battery shown in FIG. 4.

Figure 4:
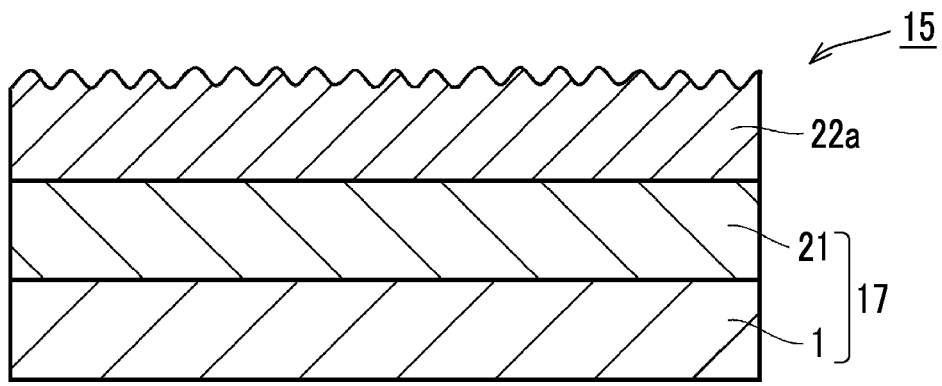
FIG. 4 is a schematic cross-sectional view showing a laminated sheet including the negative electrode active material sheet and the solid electrolyte layer after performing a peeling step in the preferred method of manufacturing an all-solid state secondary battery according to the present invention.

The shape of the surface unevenness of the solid electrolyte layer in the electrode sheet for an all-solid state secondary battery is not particularly limited as long as the surface unevenness is formed in a state where a part (1% to 10 mass %) of the solid electrolyte layer misses or falls out. In addition, as shown in FIG. 4, a period of the unevenness does not have to be constant (uniform). A part of the solid electrolyte layer remains in the support without being transferred in the peeling step such that the recess portion of the surface is formed (as a non-transferred portion).

A material and a method for forming the electrode sheet for an all-solid state secondary battery according to the embodiment of the present invention will be described below.

The electrode sheet for an all-solid state secondary battery according to the embodiment of the present invention may be a sheet in which the active material layer and the solid electrolyte layer are formed on a substrate (current collector) or may be a sheet that is formed of the active material layer and the solid electrolyte layer without including a substrate.

The substrate is not particularly limited as long as the active material layer and the solid electrolyte layer can be supported, and it is preferable that the substrate functions as the current collector. Examples of a material for forming the substrate include a sheet body (plate-shaped body) formed of materials described below regarding the current collector, an organic material, and an inorganic material. Examples of the organic materials include various polymers, and specific examples thereof include polyethylene terephthalate, polypropylene, polyethylene, and cellulose. Examples of the inorganic materials include glass and ceramic.

The electrode sheet for an all-solid state secondary battery according to the embodiment of the present invention may include another layer such as a protective layer (peeling sheet) or a coating layer.

Each of the layers forming the electrode sheet for an all-solid state secondary battery according to the embodiment of the present invention and the thickness thereof are the same as each of the layers described above regarding the all-solid state secondary battery according to the embodiment of the present invention and the thickness thereof. The contents of the respective components in the active material layer of the electrode sheet are not particularly limited, but are preferably the same as the contents of the respective components with respect to the solid content of the solid electrolyte composition (electrode composition) according to the embodiment of the present invention.

[Sheet for All-Solid State Secondary Battery]

It is preferable that each of the layers used in the manufacturing method according to the embodiment of the present invention is formed in a sheet shape or a film shape. Examples of the shape include an active material sheet that includes the active material layer without including the solid electrolyte layer laminated on the active material layer and a solid electrolyte sheet that includes the solid electrolyte layer. The sheet may be a sheet in which the active material layer or the solid electrolyte layer are formed on a substrate or may be a sheet that is formed of the active material layer or the solid electrolyte layer without including a substrate. A sheet used in the pre-compression bonding step described below is preferably an active material sheet including a substrate that functions as a current collector or a solid electrolyte sheet including a substrate that functions as a support. A material for forming the substrate is as described above. In addition, the sheet may include the above-described other layers.

The thickness of each of the layers in the sheet for an all-solid state secondary battery according to the embodiment of the present invention and the thickness thereof are the same as each of layers described below regarding the all-solid state secondary battery and the thickness thereof. It is preferable that the solid electrolyte layer in the solid electrolyte sheet for an all-solid state secondary battery is formed of the solid electrolyte composition according to the embodiment of the present invention. The contents of the respective components in the solid electrolyte layer are not particularly limited, but are preferably the same as the contents of the respective components with respect to the solid content of the solid electrolyte composition according to the embodiment of the present invention.

[Manufacturing Method According to Embodiment of Present Invention]

The method of manufacturing an all-solid state secondary battery according to the embodiment of the present invention includes the following pre-compression bonding step, the following peeling step, and the following post-compression bonding step, in which the steps are performed in this order. On the other hand, the method of manufacturing an electrode sheet for an all-solid state secondary battery according to the embodiment of the present invention includes the following pre-compression bonding step and the following peeling step, in which the steps are performed in this order.

In the manufacturing method according to the embodiment of the present invention, by performing the pre-compression bonding step and the peeling step, the solid electrolyte layer having a configuration in which the unevenness is formed on the surface opposite to the active material layer can be transferred to the active material layer. This way, the solid electrolyte layer can be transferred, and the unevenness can be formed on the surface. Therefore, the production efficiency is high, and the active material layer can be compressed and bonded to the surface with strong interlaminar adhesion. Therefore, an all-solid state secondary battery in which the active material layer and the solid electrolyte layer strongly adhere to each other such that high battery performance is exhibited can be manufactured with high productivity.

Pre-compression bonding step: a step of laminating a solid electrolyte layer and one of a positive electrode active material layer or a negative electrode active material layer to form a laminate and compressing the laminate to bond the layers, the solid electrolyte layer being formed on a support and including a binder consisting of a polymer and an inorganic solid electrolyte Peeling step: a step of peeling off the support from the solid electrolyte layer such that 1% to 10 mass % of the solid electrolyte layer that is compressed and bonded to the active material layer remains in the support Post-compression bonding step: a step of laminating the solid electrolyte layer from which the support is peeled off and another one of the positive electrode active material layer or the negative electrode active material layer to form a laminate and compressing the laminate to bond the layers In the present invention as long as the respective steps are performed in the above-described order, the respective steps may be performed continuously or with another steps (for example, the following step) interposed therebetween (discontinuously). In addition, in a case where the respective steps are performed discontinuously, the steps can also be performed after changing the time, the place, the performer, and the like.

It is preferable that the manufacturing method according to the embodiment of the present invention includes at least one of the following steps.

In a case where a plurality of film forming steps are performed among the following film forming steps, the respective components (for example, the inorganic solid electrolyte or the binder) in the composition used in each of the steps may be the same as or different from each other.

Solid electrolyte layer Ruining step: a step of forming a film on the support using a solid electrolyte composition including a binder consisting of a polymer and an inorganic solid electrolyte before the pre-compression bonding step One active material layer forming step: a step of forming a film on a substrate (current collector) using an electrode composition including one of a positive electrode active material or a negative electrode active material before the pre-compression bonding step Another active material layer forming step: a step of forming a film on a substrate (current collector) using an electrode composition including another one of the positive electrode active material or the negative electrode active material before the post-compression bonding step Final compression step: a step of compressing the laminate (laminate for an all-solid state secondary battery) including the positive electrode active material layer, the solid electrolyte layer, and the negative electrode active material layer at a compression force of 100 to 1000 MPa The manufacturing method according to the embodiment of the present invention may further include a cutting step of cutting the formed constituent layer (sheet) using a well-known method.

<Solid Electrolyte Layer Forming Step>

In the manufacturing method according to the embodiment of the present invention, it is preferable that the step of forming the solid electrolyte layer is performed before the pre-compression bonding step. The solid electrolyte layer forming step may be performed before or after one active material layer forming step that is performed before the pre-compression bonding step. In the manufacturing method according to the embodiment of the present invention, although not particularly limited thereto, it is preferable that the solid electrolyte sheet that is prepared in the film forming step and in which the support and the solid electrolyte layer are laminated in this order is used in the pre-compression bonding step.

In the film forming step, a method of forming a film on the support using the solid electrolyte composition including the binder and the inorganic solid electrolyte to prepare a laminate including the support and the solid electrolyte layer can be adopted without any particular limitation. For example, a method of forming a film (applying and drying) (directly) on the support using the solid electrolyte composition can be used. As a result, the applied and dried layer of the solid electrolyte composition can be formed on the support. The applied and dried layer refers to a layer formed by applying the solid electrolyte composition and drying a dispersion medium (that is, a layer having a composition obtained by removing the dispersion medium from the solid electrolyte composition according to the embodiment of the present invention). Within a range where the effects of the present invention do not deteriorate, the applied and dried layer may include the dispersion medium even after drying. For example, 1 mass % or lower of the dispersion medium with respect to the total mass of the applied and dried layer may be included (remain). The applied and dried layer is a layer that forms the solid electrolyte layer in a case where it is incorporated into an all-solid state secondary battery.

The method for applying the solid electrolyte composition is not particularly limited and can be appropriately selected. Examples of the method include various coating methods (preferably wet-type coating) such as spray coating, spin coating, dip coating, slit coating, stripe coating, bar coating, coating using a baker type applicator.

In a case where the solid electrolyte composition is applied, the mass (mg) of the inorganic solid electrolyte per unit area ($cm^2$) of the solid electrolyte layer (weight per unit area) is not particularly limited. The mass (mg) of the inorganic solid electrolyte can be appropriately determined depending on the designed battery capacity and may be, for example, 1 to 100 $mg/cm^2$. Here, in a case where the solid electrolyte composition includes an active material described below, regarding the weight of the inorganic solid electrolyte per unit area, the total amount of the active material and the inorganic solid electrolyte is preferably in the above-described range.

The drying temperature of the solid electrolyte composition is not particularly limited. The lower limit of the drying temperature is preferably 30° C. or higher, more preferably 60° C. or higher, and still more preferably 80° C. or higher. The upper limit of the drying temperature is preferably 300° C. or lower, more preferably 250° C. or lower, and still more preferably 200° C. or lower. In a case where the solid electrolyte composition is heated in the above-described temperature range, the dispersion medium can be removed to make the solid electrolyte composition enter a solid state (applied and dried layer). The drying time is, for example, 0.3 to 3 hours without any particular limitation.

In the solid electrolyte layer forming step, the solid electrolyte composition can also be compressed after the film formation. As the compression method, for example, a press method can be used without any particular limitation. Specific example of the press method include a flat press method using a hydraulic cylinder press machine and a roller press machine using a compression roller. It is preferable that the compression force is adjusted in a range where the inorganic solid electrolyte particles in the applied and dried layer and further particle binder can be maintained in the form of particles. The compression force is, for example, 1 to 100 MPa and preferably 5 to 80 MPa. The compression time is not particularly limited and can be, for example, 1 second to 5 hours and preferably 3 seconds to 1 hour. The compression may be performed for a short time (for example, within several hours) at a high pressure or for a long time (one day or longer) at an intermediate pressure. The atmosphere during the compression is not particularly limited, and the compression may be performed, for example, in the atmosphere, under the dried air (the dew point: −20° C. or lower), in an inert gas (for example, in an argon gas, in a helium gas, or in a nitrogen gas), and the like. The compression force may be homogeneous or variable with respect to a compressed portion (applied and dried layer). The compression force may be variable depending on the area or the thickness of the compressed portion. In addition, the pressure may also be variable stepwise for the same portion. A pressing surface of the press machine may be smooth or roughened.

The applied and dried layer can also be compressed under heating. The heating temperature is not particularly limited, but is generally in a range of 30° C. to 300° C. The compression can also be performed at a temperature higher than the glass transition temperature of the inorganic solid electrolyte or can also be performed at a temperature higher than the glass transition temperature of the polymer forming the binder. In general, the compression temperature does not exceed the melting point of the polymer.

The thickness of the applied and dried layer (solid electrolyte layer) obtained as described above is not particularly limited and may be the same as the thickness of the solid electrolyte layer in the all-solid state secondary battery. The applied and dried layer is compressed in a step described below and thus may be more than that of the solid electrolyte layer in the all-solid state secondary battery. The thickness of the applied and dried layer is, for example, preferably 20 to 200 μm, more preferably 20 to 100 μm, and still more preferably 40 to 80 μm.

The applied and dried layer (solid electrolyte layer) includes the binder and the inorganic solid electrolyte described below, and the inorganic solid electrolyte particles and further the inorganic solid electrolyte and the support bind to each other through the binder. The binding state of the inorganic solid electrolyte is not particularly limited, but it is preferable that the inorganic solid electrolyte binds to the support surface such that a region (binding portion) where they bind to each other strongly and a region (non-binding portion) where they bind to each other weakly or do not bind to each other are mixed with each other. By adopting the above-described binding state, a part of the solid electrolyte layer can be made to remain in the support in the peeling step described below. The above-described binding state can be achieved by adjusting, for example, the method of preparing the solid electrolyte composition, the content of the binder in the solid electrolyte composition, and the like.

The solid electrolyte layer or the like can also be formed on the support, for example, by compression-molding the solid electrolyte composition or the like under a compression condition described below.

(Support)

The support used in the solid electrolyte layer forming step is not particularly limited as long as it can support the active material layer and the solid electrolyte layer. Examples of a material for forming the support include a metal such as aluminum, stainless steel (SUS), or copper and a resin such as polyethylene terephthalate, polyethylene naphthalate, polyimide, or polytetrafluoroethylene (PTFE). From the viewpoint of easily realizing the above-described binding state, it is preferable that the support is formed of a metal. It is preferable that the support is formed in a sheet shape or a film shape, and the thickness of the support is not particularly limited and is, for example, preferably 5 to 50 μm and more preferably 10 to 30 μm. In consideration of the binding strength (adhesive strength) between the support and the inorganic solid electrolyte, a well-known release layer or unevenness may be provided on the surface of the support.

(Solid Electrolyte Composition)

The solid electrolyte composition (also referred to as "inorganic solid electrolyte-containing composition") used in the solid electrolyte layer forming step includes the binder and the inorganic solid electrolyte. The solid electrolyte composition preferably includes a dispersion medium and typically does not include an active material and a conductive auxiliary agent described below (the content thereof in the solid electrolyte layer is 1 mass % or lower). In a case where the dispersion medium is included, a mixed aspect of the inorganic solid electrolyte, the binder, and the dispersion medium is not particularly limited and is preferably a slurry in which the binder and the inorganic solid electrolyte are dispersed in the dispersion medium.

The moisture content (also referred to as "water content") in the solid electrolyte composition is not particularly limited and is preferably 500 ppm or lower, more preferably 200 ppm or lower, still more preferably 100 ppm or lower, and still more preferably 50 ppm or lower. In a case where the moisture content of the solid electrolyte composition is low, deterioration of the inorganic solid electrolyte can be suppressed. The moisture content refers to the amount of water (the mass ratio thereof to the solid electrolyte composition) in the solid electrolyte composition and specifically is a value measured by Karl Fischer titration after filtering the solid electrolyte composition the through a membrane filter having a pore size of 0.02 μm.

Hereinafter, the components that are included in the solid electrolyte composition and components that may be included therein will be described.

—Inorganic Solid Electrolyte—

The inorganic solid electrolyte used in the solid electrolyte layer forming step has conductivity of an ion of a metal belonging to Group 1 or Group 2 in the periodic table.

In the present invention, the inorganic solid electrolyte is an inorganic solid electrolyte, and the solid electrolyte refers to a solid-form electrolyte capable of migrating ions therein. The inorganic solid electrolyte is clearly distinguished from organic solid electrolytes (polymer electrolytes such as polyethylene oxide (PEO) and organic electrolyte salts such as lithium bis(trifluoromethanesulfonyl)imide (LiTFSI)) since the inorganic solid electrolyte does not include any organic matter as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers (LiPF$_6$, LiBF$_4$, lithium bis(fluorosulfonyl)imide (LiFSI), LiCl, and the like). The inorganic solid electrolyte is not particularly limited as long as it has ion conductivity of a metal belonging to Group 1 or Group 2 in the periodic table and generally does not have electron conductivity. In a case where an all-solid state secondary battery according to the embodiment of the present invention is a lithium ion battery, the inorganic solid electrolyte preferably has ion conductivity of lithium ions.

The inorganic solid electrolyte can be appropriately selected from solid electrolyte materials that are typically used for an all-solid state secondary battery. Examples of the inorganic solid electrolyte include (i) a sulfide-based inorganic solid electrolyte, (ii) an oxide-based inorganic solid electrolyte, (iii) a halide-based inorganic solid electrolyte, and (iv) a hydride-based solid electrolyte. In the present invention, from the viewpoint that a more favorable interface can be formed between the active material and the inorganic solid electrolyte, a sulfide-based inorganic solid electrolyte is preferably used.

(i) Sulfide-Based Inorganic Solid Electrolyte

The sulfide-based inorganic solid electrolyte is preferably a compound that contains a sulfur atom, has ion conductivity of a metal belonging to Group 1 or Group 2 in the periodic table, and has electron-insulating properties. The sulfide-based inorganic solid electrolyte is preferably an inorganic solid electrolyte that contains at least Li, S, and P as elements and has lithium ion conductivity. However, the sulfide-based inorganic solid electrolyte may include elements other than Li, S, and P depending on the purposes or cases.

Examples of the sulfide-based inorganic solid electrolyte include a lithium ion-conductive inorganic solid electrolyte satisfying a composition represented by Formula (1).

$$L_{a1}M_{b1}P_{c1}S_{d1}A_{e1} \qquad (1)$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F, and a1 to e1 represent the compositional ratios between the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the mixing amounts of raw material compounds to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide (Li$_2$S), phosphorus sulfide (for example, diphosphorus pentasulfide (P$_2$S$_5$)), a phosphorus single body, a sulfur single body, sodium sulfide, hydrogen sulfide, lithium halides (for example, LiI, LiBr, and LiCl), or sulfides of an element represented by M (for example, SiS$_2$, SnS, and GeS$_2$).

The ratio between Li$_2$S and P$_2$S$_5$ in Li—P—S-based glass and Li—P—S-based glass ceramic is preferably 60:40 to 90:10 and more preferably 68:32 to 78:22 in terms of the molar ratio between Li$_2$S:P$_2$S$_5$. In a case where the ratio between Li$_2$S and P$_2$S$_5$ is set in the above-described range, it is possible to increase the lithium ion conductivity. Specifically, the lithium ion conductivity can be preferably set to $1 \times 10^{-4}$ S/cm or more and more preferably set to $1 \times 10^{-3}$ S/cm or more. The upper limit is not particularly limited, but realistically $1 \times 10^{-1}$ S/cm or less.

As specific examples of the sulfide-based inorganic solid electrolytes, combination examples of raw materials will be described below. Examples thereof include Li$_2$S—P$_2$S$_5$, Li$_2$S—P$_2$S$_5$—LiCl, Li$_2$S—P$_2$S$_5$—H$_2$S, Li$_2$S—P$_2$S$_5$—H$_2$S—LiCl, Li$_2$S—LiI—P$_2$S$_5$, Li$_2$S—LiI—Li$_2$O—P$_2$S$_5$, Li$_2$S—LiBr—P$_2$S$_5$, Li$_2$S—Li$_2$O—P$_2$S$_5$, Li$_2$S—Li$_3$PO$_4$—P$_2$S$_5$, Li$_2$S—P$_2$S$_5$—P$_2$O$_5$, Li$_2$S—P$_2$S$_5$—SiS$_2$, Li$_2$S—P$_2$S$_5$—SiS$_2$—LiCl, Li$_2$S—P$_2$S$_5$—SnS, Li$_2$S—P$_2$S$_5$—Al$_2$S$_3$, Li$_2$S—GeS$_2$, Li$_2$S—GeS$_2$—ZnS, Li$_2$S—Ga$_2$S$_3$, Li$_2$S—GeS$_2$—Ga$_2$S$_3$, Li$_2$S—GeS$_2$—P$_2$S$_5$, Li$_2$S—GeS$_2$—Sb$_2$S$_5$, Li$_2$S—GeS$_2$—Al$_2$S$_3$, Li$_2$S—SiS$_2$, Li$_2$S—Al$_2$S$_3$, Li$_2$S—SiS$_2$—Al$_2$S$_3$, Li$_2$S—SiS$_2$—P$_2$S$_5$, Li$_2$S—SiS$_2$—P$_2$S$_5$—LiI, Li$_2$S—SiS$_2$—LiI, Li$_2$S—SiS$_2$—Li$_4$SiO$_4$, Li$_2$S—SiS$_2$—Li$_3$PO$_4$, and Li$_{10}$GeP$_2$S$_{12}$. Mixing ratios of the respective raw materials do not matter. Examples of a method for synthesizing the sulfide-based inorganic solid electrolyte using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolyte

The oxide-based inorganic solid electrolyte is preferably a compound that contains an oxygen atom, has ion conductivity of a metal belonging to Group 1 or Group 2 in the periodic table, and has electron-insulating properties.

The ion conductivity of the oxide-based inorganic solid electrolyte is preferably $1 \times 10^{-6}$ S/cm or more, more preferably $5 \times 10^{-6}$ S/cm or more, and particularly preferably $1 \times 10^{-5}$ S/cm or more. The upper limit is not particularly limited, but realistically $1 \times 10^{-1}$ S/cm or less.

Specific examples of the compound include: $Li_{xa}La_{ya}TiO_3$ (xa satisfies $0.3 \leq xa \leq 0.7$ and ya satisfies $0.3 \leq ya \leq 0.7$) (LLT); $Li_{xb}La_{yb}Zr_{zb}M^{bb}{}_{mb}O_{nb}$ ($M^{bb}$ represents one or more elements selected from Al, Mg, Ca, Sr, V, Nb, Ta, Ti, Ge, In, or Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$.); $Li_{xc}B_{yc}M^{cc}{}_{zc}O_{nc}$ ($M^{cc}$ represents one or more elements selected from C, S, Al, Si, Ga, Ge, In, or Sn, xc satisfies $0 < xc \leq 5$, yc satisfies $0 < yc \leq 1$, zc satisfies $0 < zc \leq 1$, and nc satisfies $0 < nc \leq 6$); $Li_{xd}(Al,Ga)_{yd}(Ti,Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, md satisfies $1 \leq md \leq 7$, and nd satisfies $3 \leq nd \leq 13$); $Li_{(3-2xe)}M^{ee}{}_{xe}D^{ee}O$ (xe represents a number of 0 to 0.1, $M^{ee}$ represents a divalent metal atom, and $D^{ee}$ represents a halogen atom or a combination of two or more halogen atoms); $Li_{xf}Si_{yf}O_{zf}$ (xf satisfies $1 \leq xf \leq 5$, yf satisfies $0 < yf \leq 3$, and zf satisfies $1 \leq zf \leq 10$); $Li_{xg}S_{yg}O_{zg}$ (xg satisfies $1 \leq xg \leq 3$, yg satisfies $0 < yg \leq 2$, and zg satisfies $1 \leq zg \leq 10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies w<1); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al,Ga)_{xh}(Ti,Ge)_{2-xh}Si_{yh}P_{3-yh}O_{12}$ (xh represents $0 \leq xh \leq 1$, and yh represents $0 \leq yh \leq 1$); and $Li_7La_3Zr_2O_{12}$ (LLZ) having a garnet-type crystal structure.

In addition, phosphorus compounds containing Li, P, and O are also desirable. Examples of the phosphorus compound include: lithium phosphate ($Li_3PO_4$); LiPON in which some of oxygen elements in lithium phosphate are substituted with nitrogen elements; and $LiPOD^1$ ($D^1$ preferably represents one or more elements selected from Ti, V, Cr, Mn, Fe, Co, Ni, Cu, Zr, Nb, Mo, Ru, Ag, Ta, W, Pt, or Au).

Further, for example, $LiA^1ON$ ($A^1$ represents one or more elements selected from Si, B, Ge, Al, C, or Ga) can be preferably used.

(iii) Halide-Based Inorganic Solid Electrolyte

The halide-based inorganic solid electrolyte is preferably a compound that is generally used and contains a halogen atom, has ion conductivity of a metal belonging to Group 1 or Group 2 in the periodic table, and has electron-insulating properties.

The halide-based inorganic solid electrolyte is not particularly limited, and examples thereof include LiCl, LiBr, LiI, and compounds such as $Li_3YBr_6$ or $Li_3YCl_6$ described in ADVANCED MATERIALS, 2018, 30, 1803075. In particular, $Li_3YBr_6$ or $Li_3YCl_6$ is preferable.

(iV) Hydride-Based Inorganic Solid Electrolyte

The hydride-based inorganic solid electrolyte is preferably a compound that is generally used and contains a hydrogen atom, has ion conductivity of a metal belonging to Group 1 or Group 2 in the periodic table, and has electron-insulating properties.

The hydride-based inorganic solid electrolyte is not particularly limited, and examples thereof include $LiBH_4$, $Li_4(BH_4)_3I$, and $3LiBH_4$—LiCl.

The inorganic solid electrolyte is preferably in the form of particles. In this case, the average particle size (volume average particle size) of the inorganic solid electrolyte is not particularly limited and preferably 0.01 μm or more, more preferably 0.1 μm or more, still more preferably 0.5 μm or more, and still more preferably 1 μm or more. The upper limit is preferably 100 μm or less, more preferably 50 μm or less, still more preferably 10 μm or less, and still more preferably 7 μm or less. The average particle size of the inorganic solid electrolyte is measured in the following order. The inorganic solid electrolyte particles are diluted using water (heptane in a case where the inorganic solid electrolyte is unstable in water) in a 20 mL sample bottle to prepare 1 mass % of a dispersion liquid. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (trade name, manufactured by Horiba Ltd.), and a quartz cell for measurement at a temperature of 25° C. Other detailed conditions and the like can be found in JIS Z8828: 2013 "Particle Size Analysis-Dynamic Light Scattering" as necessary. For each level, five specimens are prepared and the average value thereof is adopted.

The solid electrolyte composition may include one inorganic solid electrolyte or two or more inorganic solid electrolytes.

From the viewpoints of a reduction in interface resistance, and binding properties, the content of the inorganic solid electrolyte in the solid electrolyte composition is preferably 50 mass % or higher, more preferably 70 mass % or higher, and still more preferably 90 mass % or higher with respect to 100 mass % of the solid content. From the same viewpoint, the upper limit is preferably 99.9 mass % or lower, more preferably 99.5 mass % or lower, and particularly preferably 99 mass % or lower.

In the present specification, the solid content (solid component) refers to components that neither volatilize nor evaporate and disappear in a case where the solid electrolyte composition is dried at 170° C. for 6 hours in a nitrogen atmosphere at a pressure of 1 mmHg. Typically, the solid content refers to components other than a dispersion medium described below.

—Binder—

In the manufacturing method according to the embodiment of the present invention, the binder has a function of binding the solid particles to each other or binding the solid particles and the substrate (current collector) or the support to each other.

As the polymer forming the binder, various polymers that are typically used in a solid electrolyte composition for an all-solid state secondary battery can be adopted without any particular limitation. Examples of the polymers include a fluorine-containing polymer, a hydrocarbon-based thermoplastic polymer, a (meth)acrylic polymer, copolymers with other vinyl monomers, polyurethane, polyurea, polyamide, polyimide, polyester, polyether, polycarbonate, and a cellulose derivative polymer.

Examples of a fluorine-containing polymer include polytetrafluoroethylene (PTFE), polyvinylene difluoride (PVdF), and a copolymer (PVdF-HFP) of polyvinylene difluoride and hexafluoropropylene.

Examples of a hydrocarbon-based thermoplastic polymer include polyethylene, polypropylene, styrene-butadiene rubber (SBR), hydrogenated styrene-butadiene rubber (HSBR), butylene rubber, acrylonitrile-butadiene rubber, polybutadiene, and polyisoprene.

Examples of a (meth)acrylic polymer include various (meth)acrylic monomers, (meth)acrylamide monomers, copolymers of two or more monomers thereof (preferably a copolymer of acrylic acid and methyl acrylate).

In addition, copolymers with other vinyl monomers are also be suitably used. Examples of the copolymers include a copolymer of methyl (meth)acrylate and styrene, a copolymer of methyl (meth)acrylate and acrylonitrile, and a copolymer of butyl (meth)acrylate, acrylonitrile, and styrene. In the present specification, the copolymer may be any one of a statistic copolymer or a periodic copolymer and is preferably a block copolymer.

In addition, examples of the polymers of polyurethane, polyurea, polyamide, and polyimide include a polymer having a urethane bond, a polymer having a urea bond, a polymer having an amide bond, and a polymer having an imide bond described in JP2015-088480A.

Examples of the polyester and the polyether include polyester and polyether described as a polymer chain that can be adopted as $P^3$ in a polymer C described below.

Among these, a fluorine-containing polymer, a hydrocarbon-based thermoplastic polymer, a (meth)acrylic polymer, a polyurethane polymer, a polycarbonate polymer, or a cellulose derivative polymer is preferable, and a (meth)acrylic polymer or a polyurethane polymer is more preferable from the viewpoint of high affinity to the inorganic solid electrolyte, high flexibility of the polymer itself, and strong binding properties with the solid particles.

As the polymer forming the binder, the following polymers A to C are more preferable from the viewpoints of binding properties between the solid particles and the residual amount of the solid electrolyte layer in the peeling step.

(Polymer A)

The polymer A is a polymer incorporated with a macromonomer having a number-average molecular weight of 1,000 or higher as a side chain component.

In the present invention, a main chain of the polymer refers to a linear molecular chain in which all the molecular chains forming the polymer other than the main chain can be considered pendants to the main chain. In a case where the polymer includes a component derived from a macromonomer, typically, the longest chain among all the molecular chains forming the polymer is the main chain although depending on the mass average molecular weight of the macromonomer. In this case, a functional group at a polymer terminal is not included in the main chain. In addition, side chains of the polymer refers to molecular chains other than the main chain and include a short molecular chain and a long molecular chain. The side chain component refers to a component forming a side chain of the polymer and may be a part or the entirety of the side chain.

—Main Chain Component—

The main chain of the polymer A is not particularly limited, a typical polymer component such as the above-described various polymers can be used, and a (meth)acrylic polymer or a copolymer with other vinyl monomers is preferable.

As a polymerizable compound forming the main chain, a polymerizable compound having a polymerizable unsaturated group (for example, a group having an ethylenically unsaturated bond) is preferable, and examples thereof include various vinyl compounds and (meth)acrylic compounds. In the present invention, in particular, a (meth)acrylic compound is preferable, and a (meth)acrylic compound selected from a (meth)acrylic acid compound, a (meth)acrylic acid ester compound, or a (meth)acrylonitrile compound is more preferable. The number of polymerizable unsaturated groups in one molecule of the polymerizable compound is not particularly limited and is preferably 1 to 4 and more preferably 1.

As the vinyl compound or the (meth)acrylic compound, a compound represented by Formula (b-1) is preferable.

(b-1)

In the formula, $R^1$ represents a hydrogen atom, a hydroxy group, a cyano group, a halogen atom, an alkyl group (having preferably 1 to 24 carbon atoms, more preferably 1 to 12 carbon atoms, and still more preferably 1 to 6 carbon atoms), an alkenyl group (having preferably 2 to 24 carbon atoms, more preferably 2 to 12 carbon atoms, and still more preferably 2 to 6 carbon atoms), an alkynyl group (having preferably 2 to 24 carbon atoms, more preferably 2 to 12 carbon atoms, and still more preferably 2 to 6 carbon atoms), or an aryl group (having preferably 6 to 22 carbon atoms and more preferably 6 to 14 carbon atoms). In particular, a hydrogen atom or an alkyl group is preferable, and a hydrogen atom or a methyl group is more preferable.

$R^2$ represents a hydrogen atom or a substituent. The substituent which can be used as $R^2$ is not particularly limited, and examples thereof include a substituent T described below. In particular, an alkyl group (having preferably 1 to 24 carbon atoms, more preferably 1 to 12 carbon atoms, and still more preferably 1 to 6 carbon atoms), an alkenyl group (having preferably 2 to 12 carbon atoms and more preferably 2 to 6 carbon atoms), an aryl group (having preferably 6 to 22 carbon atoms and more preferably 6 to 14 carbon atoms), an aralkyl group (having preferably 7 to 23 carbon atoms and more preferably 7 to 15 carbon atoms), a cyano group, a carboxy group, a hydroxy group, a sulfanyl group, a sulfonate group, a phosphate group, a phosphonate group, an aliphatic heterocyclic group having an oxygen atom (having preferably 2 to 12 carbon atoms and more preferably 2 to 6 carbon atoms), or an amino group ($NR^N_2$: $R^N$ represents a hydrogen atom or a substituent and preferably a hydrogen atom or an alkyl group having 1 to 12 carbon atoms (more preferably having 1 to 3 carbon atoms)) is preferable. In particular, for example, a methyl group, an ethyl group, a propyl group, a butyl group, a cyano group, an ethenyl group, a phenyl group, a carboxy group, a sulfanyl group, or a sulfonate group is preferable.

The sulfonate group, the phosphate group, and the phosphonate group may be esterified with, for example, an alkyl group having 1 to 6 carbon atoms. As the aliphatic heterocyclic group having an oxygen atom, for example, an epoxy group-containing group, an oxetane group-containing group, or a tetrahydrofuryl group-containing group is preferable.

$L^1$ represents a linking group and is not particularly limited. Examples of the linking group include an alkylene group having 1 to 6 carbon atoms (having preferably 1 to 3 carbon atoms), an alkenylene group having 2 to 6 carbon atoms (having preferably 2 or 3 carbon atoms), an arylene group having 6 to 24 carbon atoms (having preferably 6 to 10 carbon atoms), an oxygen atom, a sulfur atom, an imino group (—NR$^N$—), a carbonyl group, a phosphate linking group (—O—P(OH)(O)—O—), a phosphonate linking group (—P(OH)(O)—O—), and a group relating to a combination thereof. Among these, a —CO—O— group, a —CO—N(R$^N$)— group (R$^N$ is as described above) is preferable.

In the present invention, the number of atoms forming the linking group is preferably 1 to 36, more preferably 1 to 24, still more preferably 1 to 12, and still more preferably 1 to 6. The number of linking atoms in the linking group is preferably 10 or less and more preferably 8 or less. The lower limit is 1 or more. The number of linking atoms refers to the minimum number of atoms that connect predetermined structural units. For example, in the case of —CH$_2$—C(=O)—O—, the number of atoms forming the linking group is 6, but the number of linking atoms is 3.

The above-described linking group may have a substituent. Examples of the substituent include the substituent T described below. For example, an alkyl group or a halogen atom can be used.

n represents 0 or 1 and preferably 1. In this case, in a case where -(L$^1$)$_n$-R$^2$ represents one substituent (for example, an alkyl group), n represents 0, and R$^2$ represents a substituent (alkyl group).

As the (meth)acrylic compound, not only the compound represented by Formula (b-1) but also a compound represented by (b-2) or (b-3) are preferable.

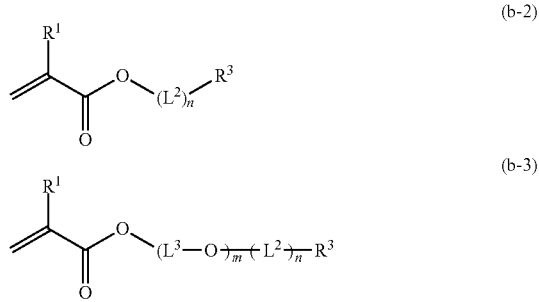

R$^1$ and n have the same definitions as those of Formula (b-1). In this case, n in Formula (b-2) represents 1.

R$^3$ has the same definition as that of R$^2$. For example, a hydrogen atom, an alkyl group, an aryl group, a carboxy group, a sulfanyl group, a phosphate group, a phosphonate group, an aliphatic heterocyclic group having an oxygen atom, or an amino group is preferable.

L$^2$ represents a linking group and has the same definition as L$^1$. In this case, for example, an oxygen atom, an alkylene group, an alkenylene group, a carbonyl group, an imino group, or a group including a combination thereof is preferable.

L$^3$ represents a linking group, has the same definition as that of L$^1$, and preferably represents an alkylene group having 1 to 6 carbon atoms (having preferably 1 to 3 carbon atoms).

m represents an integer of 1 to 200, preferably an integer of 1 to 100, and more preferably an integer of 1 to 50.

In Formulae (b-1) to (b-3), a carbon atom forming the polymerizable group that is not bonded to R$^1$ is represented as an unsubstituted carbon atom (H$_2$C=) but may have a substituent as described above. The substituent is not particularly limited, and examples thereof include the groups that can be used as R$^1$.

In addition, in Formulae (b-1) to (b-3), a group which may have a substituent such as an alkyl group, an aryl group, an alkylene group, or an arylene group may have a substituent within a range where the effects of the present invention do not deteriorate. Examples of the substituent include the substituent T, specifically, a halogen atom, a hydroxy group, a carboxy group, a sulfanyl group, an acyl group, an alkyl group, an acyloxy group, an alkoxy group, an aryloxy group, an aryloyl group, an aryloyloxy group, or an amino group. As the substituent, a group in a group (b) of functional groups described below can also be used.

Specific examples of the (meth)acrylic compound include compounds A-1 to A-60 described in JP2015-088486A, but the present invention is not limited thereto.

—Side Chain Component—

The number-average molecular weight of the macromonomer framing the side chain component is 1,000 or higher, preferably 2,000 or higher, and more preferably 3,000 or higher. The upper limit is preferably 500,000 or lower, more preferably 100,000 or lower, and still more preferably 30,000 or lower. The number-average molecular weight of the macromonomer is a value measured using a measurement method described below. The polymer A has a side chain having a molecular weight in the above-described range, the binding properties with the solid particles can be improved, and the dispersibility in the solid electrolyte composition can be improved.

The SP value of the macromonomer in the polymer (A) is not particularly limited and is preferably 10 or lower and more preferably 9.5 or lower. The lower limit value is not particularly limited, but is practically 5 or more. The SP value is an index indicating a property of being dispersed in an organic solvent. In addition, by adjusting the macromonomer to have a specific molecular weight or higher and preferably to adjust the SP value to be the above-described SP value or higher, the binding properties with the solid particles can be improved, affinity to a solvent can be improved, and thus the polymer can be stably dispersed.

Unless specified otherwise, the SP value in the present invention is obtained using a Hoy method (H. L. Hoy Journal of Painting, 1970, Vol. 42, 76-118). In addition, the unit of the SP value is not shown but is cal$^{1/2}$ cm$^{-3/2}$. The SP value of the macromonomer component incorporated into the side chain is not substantially different from the SP value of the macromonomer.

The macromonomer is not particularly limited as long as the mass average molecular weight is 1000 or higher. Examples of the polymer forming the binder include a macromonomer including the above-described various polymers as the main chain. In particular, a macromonomer having a polymer chain bonded to a polymerizable unsaturated group is preferable. The polymer chain in the macromonomer forms a side chain (graft chain) to the main chain of the polymer.

The polymerizable unsaturated group in the macromonomer is not particularly limited, and the details will be described below. Examples of the polymerizable group include various vinyl groups and (meth)acryloyl groups. Among these, a (meth)acryloyl group is preferable.

The polymer chain in the macromonomer A is not particularly limited, and a typical polymer component can be used. Examples of the polymer component include a (meth)acrylic polymer chain and a chain of a polyvinyl polymer chain. Among these, a (meth)acryl polymer chain is preferable. It is preferable that the (meth)acrylic polymer chain includes a component derived from a (meth)acrylic compound selected from a (meth)acrylic acid compound, a (meth)acrylic acid ester compound, and a (meth)acrylonitrile compound, and it is more preferable that the chain of a (meth)acrylic resin is a polymer of two or more (meth) acrylic compounds. As the (meth)acrylic compound, the compound described above regarding the polymerizable compound forming the main chain can be adopted without any particular limitation.

It is preferable that the macromonomer is a compound represented by Formula (b-13a).

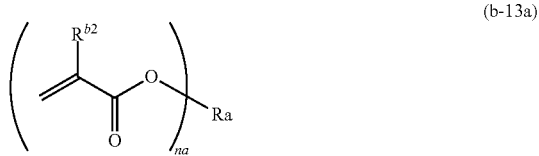

$R^{b2}$ has the same definition as $R^1$.

na is not particularly limited and is preferably an integer of 1 to 6, more preferably 1 or 2, and still more preferably 1.

In a case where na represents 1, Ra represents a substituent. In a case where na represents 2 or more, Ra represents a linking group.

The substituent that can be used as Ra is not particularly limited and is preferably the above-described polymer chain and more preferably the (meth)acrylic polymer chain.

The linking group that can be used as Ra is not particularly limited. For example, an alkane linking group having 1 to 30 carbon atoms, a cycloalkane linking group having 3 to 12 carbon atoms, an aryl linking group having 6 to 24 carbon atoms, a heteroaryl linking group having 3 to 12 carbon atoms, an ether group, a sulfide group, a phosphinidene group (—PR—:R represents a hydrogen atom or an alkyl group having 1 to 6 carbon atoms), a silylene group (—SiR$^{S1}$R$^{S2}$—:R$^{S1}$ and R$^{S2}$ represent a hydrogen atom or an alkyl group having 1 to 6 carbon atoms), a carbonyl group, and an imino group (—NR$^{N1}$—:R$^{N1}$ represents a hydrogen atom or a substituent, preferably represents a hydrogen atom, an alkyl group having 1 to 6 carbon atoms, or an aryl group having 6 to 10 carbon atoms), or a combination thereof.

Ra may be directly bonded to an oxygen atom (—O—) in Formula (b-13a) but is preferably bonded to an oxygen atom (—O—) in Formula (b-13a) through a linking group. The linking group is not particularly limited, and for example, a chain transfer agent residue used for the formation (polymerization) of Ra can be used.

It is preferable that the polymer A has at least one functional group in the following group (b) of functional groups. This functional group may be included in the main chain or in a side chain but is preferably included in the main chain. By including a specific functional group in the main chain or the like, interaction with a hydrogen atom, an oxygen atom, or a sulfur atom present on the surface of the solid particles is strengthened, binding properties are improved, and the interface resistance can be reduced.

Group (b) of Functional Groups a carbonyl group-containing group, an amino group, a sulfonate group, a phosphate group, a hydroxy group, an ether group, a cyano group, and a thiol group Examples of a carbonyl group-containing group include a carboxy group, a carbonyloxy group, and an amido group, and the number of carbon atoms in the carbonyl group-containing group is preferably 1 to 24, more preferably 1 to 12, and still more preferably 1 to 6. The number of carbon atoms in the amino group is preferably 0 to 12, more preferably 0 to 6, and still more preferably 0 to 2. The sulfonate group and the phosphate group may be an ester or a salt thereof. In the case of an ester, the number of carbon atoms is preferably 1 to 24, more preferably 1 to 12, and still more preferably 1 to 6. The above-described functional group may be present as a substituent or may be present as a linking group. For example, the amino group may be present as a divalent imino group or a trivalent nitrogen atom.

Specific examples of the above-described macromonomer and further examples of a macromonomer other than the above-described macromonomer include "vinyl monomer (X)" described in JP2015-088486A.

The details of a binder consisting of the polymer A can be found in "binder particles (B) described in JP2015-088486A.

(Polymer B)

The polymer B is a polymer that includes a main chain having at least one bond selected from the following bond group (I) and includes a polymer having an aspect in which the main chain includes a hydrocarbon polymer segment and a polymer having an aspect in which the main chain does not include a hydrocarbon polymer segment.

<Bond Group (I)>

An ester bond, an amide bond, a urethane bond, a urea bond, an imide bond, an ether bond, and a carbonate bond The bond selected from the bond group (I) is not particularly limited as long as it is included in the main chain of the polymer and may be in any one of an aspect where it is included in a constitutional unit (repeating unit) and/or an aspect where it is included as a bond that links different constitutional units to each other. In this case, the bond selected from the bond group (I) is not included in the main chain of the hydrocarbon polymer segment.

In the aspect where the bond selected from the bond group (I) is included in the constitutional unit, it is preferable that, as one constitutional unit of the polymer B, a hydrophilic segment including the bond selected from the bond group (I) is included in the main chain of the polymer B, and it is more preferable that at least one segment (hereinafter, also referred to as "hydrophilic segment") selected from polyester, polyamide, polyurethane, polyurea, polyimide, polyether, or polycarbonate is included in the main chain of the polymer B.

In a case where the polymer B includes the hydrophilic segment and the hydrocarbon polymer segment, the bond selected from the bond group (I) may be further included as a binding site between the hydrophilic segment and the hydrocarbon polymer segment.

In a case where the polymer B is a polymer having the aspect in which the main chain does not include the hydrocarbon polymer segment, the polymer B may be a polymer selected from the group consisting of polyester, polyamide, polyurethane, polyurea, polyimide, polyether, and polycarbonate or may be any one of a random polymer or a polycondensation segmented polymer of at least two polymers selected from the above-described group (the polycondensation segmented polymer is preferable).

On the other hand, in a case where the polymer B has an aspect where the main chain includes the hydrophilic segment and the hydrocarbon polymer segment, this polymer B may be any one of a random polymer or a polycondensation segmented polymer including at least one polymer selected from the group consisting of polyester, polyamide, polyurethane, polyurea, polyimide, polyether, and polycarbonate and a hydrocarbon polymer having a functional group at a terminal for a reaction with the terminal of the above-described polymer, and it is preferable that the polymer B is the polycondensation segmented polymer.

—Hydrocarbon Polymer Segment—

The hydrocarbon polymer segment refers to a segment consisting of an oligomer or a polymer (hereinafter, also referred to as "hydrocarbon polymer") including a carbon atom and a hydrogen atom. To be exact, the hydrocarbon polymer segment refers to a structure in which at least two atoms (for example, hydrogen atoms) or a group (for example, a methyl group) is desorbed from the polymer including a carbon atom and a hydrogen atom.

In a case where the functional group that may be included in the polymer terminal for bonding to the hydrophilic segment or the like is not included in the hydrocarbon polymer segment.

The hydrocarbon polymer is a polymer having a structure in which at least two or more repeating units are aligned. In addition, it is preferable that the hydrocarbon polymer includes at least 50 or more carbon atoms. This hydrocarbon polymer may include a carbon-carbon unsaturated bond or may include a ring structure of an aliphatic ring and/or an aromatic ring. That is, the hydrocarbon polymer may be a hydrocarbon polymer including a hydrocarbon selected from an aliphatic hydrocarbon or an aromatic hydrocarbon. From the viewpoint of exhibiting the effect of steric repulsion in a case where the polymer is flexible and present as particles, it is preferable that the hydrocarbon polymer includes an aliphatic hydrocarbon.

The hydrocarbon polymer is preferably an elastomer, and specific examples of the elastomer include a diene elastomer having a double bond in the main chain and a non-diene elastomer not having a double bond in the main chain. Examples of the diene elastomer include styrene-butadiene rubber (SBR), styrene-ethylene-butadiene rubber (SEBR), butyl rubber (copolymer rubber of isobutylene and isoprene, IIR), a butadiene rubber (BR), an isoprene rubber (IR), and an ethylene-propylene-diene rubber. Examples of the non-diene elastomer include an olefin elastomer such as ethylene-propylene rubber or a styrene-ethylene-butylene rubber and a hydrogen reduced form of the above-described diene elastomer.

The mass average molecular weight of the hydrocarbon polymer segment is preferably 1,000 or higher, more preferably 1,000 or higher and lower than 1,000,000, still more preferably 1,000 or higher and lower than 100,000, and still more preferably 1,000 or higher and lower than 10,000. In addition, from the viewpoint of improving the particle dispersibility of the polymer (B) and obtaining fine particles, the glass transition temperature is preferably 0° C. or lower, more preferably −20° C. or lower, and still more preferably −40° C. or lower. The lower limit is not particularly limited and is generally −150° C. or higher. The solubility parameter (SP) value of the hydrocarbon polymer segment is preferably lower than 9.0, more preferably lower than 8.7, and still more preferably lower than 8.5. The lower limit is not particularly limited and is generally 6.0 or higher.

The mass average molecular weight and the SP value of the hydrocarbon polymer segment are values measured using measurement methods described in WO2018/020827A.

The content of the hydrocarbon polymer segment in the polymer B (the polymer having the aspect where the main chain includes the hydrocarbon polymer segment) is preferably 1% to 80 mass %, more preferably 5% to 80 mass %, still more preferably 5% to 50 mass %, still more preferably 10% to 40 mass %, and most preferably 10% to 30 mass %.

From the viewpoint of synthesizing the polymer B, it is preferable that the hydrocarbon polymer includes a functional group for forming a bond to the hydrophilic segment or the like at the terminal, and it is more preferable that the hydrocarbon polymer includes a functional group capable of polycondensation. Examples of the functional group capable of polycondensation include a hydroxy group, a carboxy group, an amino group, a sulfanyl group, and an acid anhydride. Among these, a hydroxy group is preferable. The hydrocarbon polymer having the functional group capable of polycondensation at the terminal is not particularly limited, and examples thereof include respective commercially available products described in WO2018/020827A.

<Hydrophilic Segment>

As described above, examples of the hydrophilic segment in the polymer B include a segment consisting of at least one polymer selected from the group consisting of polyester, polyamide, polyurethane, polyurea, polyimide, polyether, and polycarbonate. As the polymer forming the hydrophilic segment, various well-known polymers can be used without any particular limitation. In addition, examples of the polymers of polyurethane, polyurea, polyamide, and polyimide include a polymer having a urethane bond, a polymer having a urea bond, a polymer having an amide bond, and a polymer having an imide bond described in JP2015-088480A.

The polymers can be synthesized using an ordinary method, and the details thereof can be found in a raw material compound and a synthesis method described in JP2015-088480A and a raw material compound and a synthesis method described in WO2018/020827A.

The polymer B may have a bond other than the polymer forming the hydrophilic segment in the hydrophilic segment, and examples thereof include an aspect of a segment consisting of polyurethane having a carbonate bond in a molecular chain.

<Functional Group Selected from Group (II) of Functional Groups>

It is preferable that the polymer B has a functional group for wettability on and/or adsorption to the solid particle surfaces. Examples of the functional group include a functional group having an interaction with a hydrogen bond on the solid particle surfaces and a functional group capable of forming a chemical bond to a group on the solid particle surfaces. Specifically, it is preferable that the polymer B has at least one functional group selected from the following group (II) of functional groups. From the viewpoint of effectively exhibiting wettability on and/or adsorption to the solid particle surfaces, it is preferable that the polymer B does not have two or more functional groups capable of forming a bond with another functional group.

<Group of Functional Groups (II)>

A carboxy group, a sulfonate group ($-SO_3H$), a phosphate group ($-PO_4H_2$), an amino group, a hydroxy group, a sulfanyl group, an isocyanate group, an alkoxysilyl group, and a group having a fused ring structure of three or more rings Salts of the sulfonate group and the phosphate group may also be used, and examples of the salts include a sodium salt and a calcium salt.

The alkoxysilyl group is not particularly limited as long as it is a silyl group in which a Si atom is substituted with at least one alkoxy group (preferably having 1 to 12 carbon atoms), and examples of another substituent on the Si atom include an alkyl group and an aryl group. As the alkoxysilyl group, for example, the description of an alkoxysilyl group in the substituent T described below can be preferably adopted.

As the group having a fused ring structure of three or more rings, a group having a cholesterol ring structure or a group having a structure where three or more aromatic rings are fused is preferable, and a cholesterol residue or a pyrenyl group is more preferable.

It is preferable that the polymer B has the functional group selected from the group (II) of functional groups at a position other than the hydrocarbon polymer segment, and it is more preferable that the polymer B has the functional group in the hydrophilic segment.

The content of the functional group selected from the group (II) of functional groups in the polymer B is not particularly limited, and the proportion of repeating units having the functional group selected from the group (II) of functional groups with respect to all the repeating units forming the polymer B used in the present invention is preferably 1% to 50 mol % and more preferably 5% to 20 mol %.

Specific examples of the polymer B (the polymer having the aspect where the main chain includes the hydrocarbon polymer segment) include "exemplary compounds (B-1) to (B-21)" described in WO2018/020827A, but the present invention is not limited thereto.

The details of the polymer B can be found in "Polymer (B)" described in WO2018/020827A.

(Polymer C)

The polymer C is a branched polymer represented by Formula 1.

In the polymer C, linking groups, polymer chains, and adsorption groups $A^1$ represented by the respective reference numerals may be the same as or different from each other, respectively. In addition, in a case where a plurality of the respective chains (—S—$R^2$—$P^1$, —S—$R^3$—$P^2$, and —S—$R^4$-($A^1$)p) linked to $R^1$ are present, these chains may be the same as or different from each other.

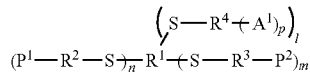

Formula (1)

In Formula 1, $R^1$ represents a (l+m+n)-valent linking group. $A^1$ represents a hydrogen atom, an acidic group, a group having a basic nitrogen atom, a urea group, a urethane group, an alkoxysilyl group, an epoxy group, an isocyanate group, or a hydroxyl group. p represents an integer of 1 to 10. $R^2$, $R^3$, and $R^4$ each independently represent a single bond or a linking group. $P^1$ represents a polymer chain including 50 mass % or higher of a component having a SP value of 19.5 or higher. $P^2$ represents a polymer chain including a component derived from a macromonomer having a number-average molecular weight of 500 or higher. l represents an integer of 0 to 5, m represents an integer of 1 to 8, and n represents an integer of 1 to 9. l+m+n represents an integer of 3 to 10.

$R^1$ represents a (l+m+n)-valent linking group, which is typically a linking group (organic linking group) consisting of an organic group having a skeleton to which a carbon atom is linked through a covalent bond and preferably a linking group having an oxygen atom. The molecular weight of the linking group is not particularly limited and, for example, is preferably 200 or higher and more preferably 300 or higher. The upper limit of the molecular weight is preferably 5,000 or lower, more preferably 4,000 or lower, and still more preferably 3,000 or lower. It is preferable that the linking group does not consist of only one tetravalent carbon atom.

The valence of the linking group is 3 to 10 and has the same definition and the same preferable range as those of (l+m+n) as the sum of l, m, and n described below.

It is preferable that the linking group has a group represented by the following Formula 1a. It is preferable that the number of groups represented by Formula 1a in the linking group $R^1$ is the same as (l+m+n) that is the valence of $R^1$. In a case where the linking group has a plurality of groups represented by Formula 1a, the groups may be the same as or different from each other.

Formula 1a

In Formula (1a), n represents an integer of 0 to 10, preferably an integer of 1 to 6, and more preferably 1 or 2.

$R^f$ represents a hydrogen atom or a substituent and preferably a hydrogen atom. The substituent which may be used as $R^f$ is not particularly limited, and examples thereof include a halogen atom (for example, a fluorine atom, a chlorine atom, an iodine atom, or a bromine atom), an alkyl group (having preferably 1 to 12 carbon atoms, more preferably 1 to 6 carbon atoms, and still more preferably 1 to 3 carbon atoms), an alkoxy group (having preferably 1 to 12 carbon atoms, more preferably 1 to 6 carbon atoms, and still more preferably 1 to 3 carbon atoms), an acyl group (having preferably 2 to 12 carbon atoms, more preferably 2 to 6 carbon atoms, and still more preferably 2 or 3 carbon atoms), an aryl group (having preferably 6 to 22 carbon atoms and more preferably 6 to 10 carbon atoms), an alkenyl group (having preferably 2 to 12 carbon atoms and more preferably 2 to 5 carbon atoms), a hydroxy group, a nitro group, a cyano group, a mercapto group, an amino group, an amido group, and an acidic group (for example, a carboxyl group, a phosphate group, or a sulfonate group). Each of the acidic groups may be a salt thereof. Examples of a counter ion include an alkali metal ion an alkali earth metal ion, an ammonium ion, and an alkylammonium ion.

It is preferable that the linking group $R^1$ is a linking group represented by the following Formula 1A or Formula 1B.

Formula 1A

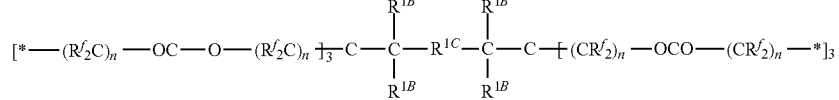

Formula 1B

In both the formulae, $R^f$ and n have the same definitions and the same preferable ranges as those of $R^f$ and n in Formula 1a. * represents a binding site to a sulfur atom in Formula 1.

In Formula 1A, $R^{1A}$ represents a hydrogen atom or a substituent. The substituent which can be used as $R^{1A}$ is not particularly limited, and examples thereof include the respective substituents which can be used as $R^f$ and the group represented by Formula 1a. In particular, an alkyl group or the group represented by Formula 1a is preferable. The number of carbon atoms in the alkyl group is preferably 1 to 12, more preferably 1 to 6, and still more preferably 1 to 3. The substituent which can be used as $R^{1A}$ may have one or two or more substituents, and the substituent which may be further included is not particularly limited, and examples thereof include the respective substituents which can be used as $R^f$. In particular, a hydroxy group is preferable. Examples of the substituent which may further have one or two or more substituents include a hydroxyalkyl group (the number of carbon atoms is as described above). Specifically, hydroxymethyl is preferable.

In Formula 1B, $R^{1C}$ represents a linking group. The linking group which can be used as $R^{1C}$ is not particularly limited, and examples thereof include respective linking groups which can be used as W in Formula 3. In particular, an alkylene group, an ether group (—O—), a sulfide group (—S—), a carbonyl group, or a linking group including a combination of two or more (preferably 2 to 5) thereof is preferable, and an ether group is more preferable. $R^{1B}$ represents a hydrogen atom or a substituent and preferably a hydrogen atom. The substituent which can be used as $R^{1B}$ is not particularly limited, and examples thereof include the respective substituents which can be used as $R^f$.

In Formula 1A and Formula 1B, groups represented by the same reference numeral may be the same as or different from each other.

In addition to the above-described linking groups, as the linking group $R^1$, for example, a linking group in Formula 1B in which one or two or more groups represented by Formula 1a are substituted with each of the substituents which can be used as $R^f$, in particular, hydroxymethyl is also a preferable aspect.

As the linking group $R^1$, a linking group represented by any one of the following Formulae 1C to 1H is also preferable. In each of the formulae, * represents a binding site to S in Formula 1.

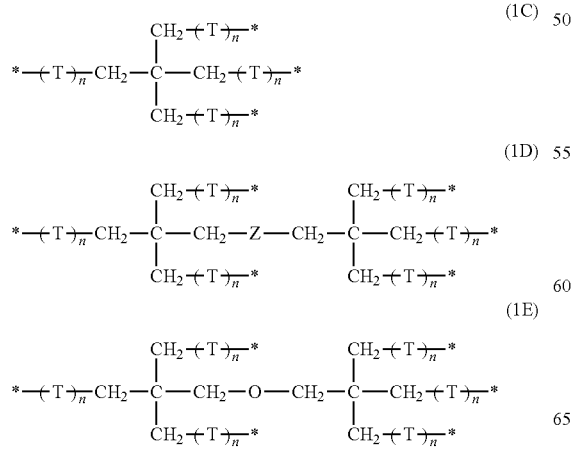

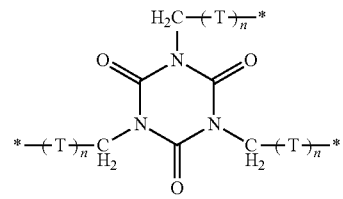

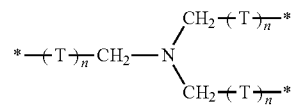

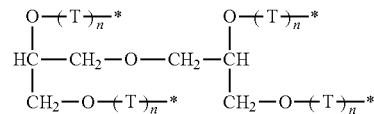

In Formulae 1C to 1H, T represents a linking group and preferably a group represented by any one of the following Formulae T1 to T6 or a linking group including a combination of two or more (preferably two or three). Examples of the linking group including a combination include a linking group (—OCO-alkylene group) including a combination of the linking group represented by Formula T6 and the linking group represented by Formula T1. In the group represented by any one of Formulae T1 to T6, a sulfur atom in Formula 1 may be bound to any binding site. However, in a case where T represents an oxyalkylene group (the group represented by any one of Formulae T2 to T5) or an —OCO-alkylene group, it is preferable that a sulfur atom in Formula 1 is bound to a carbon atom (binding site) at a terminal.

A plurality of T's present in each of the formulae may be the same as or different from each other.

Z represents a linking group and is preferably a group represented by the following Formula Z1 or Z2.

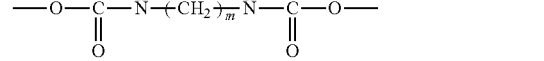

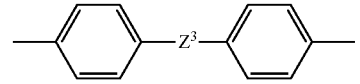

In each of Formula 1C to 1H, n represents an integer, preferably an integer of 0 to 14, more preferably an integer of 0 to 5, and still more preferably an integer of 1 to 3.

In each of Formula T1 and Formula Z1, m represents an integer of 1 to 8, more preferably an integer of 1 to 5, and still more preferably an integer of 1 to 3.

$Z^3$ represents a linking group, preferably an alkylene group having 1 to 12 carbon atoms, and more preferably an alkylene group having 1 to 6 carbon atoms. In particular, a 2,2-propanediyl group is still more preferable.

Hereinafter, specific examples of the linking group $R^1$ will be shown, but the present invention is not limited thereto. In each of the specific examples, * represents a binding site to a sulfur atom in Formula 1.

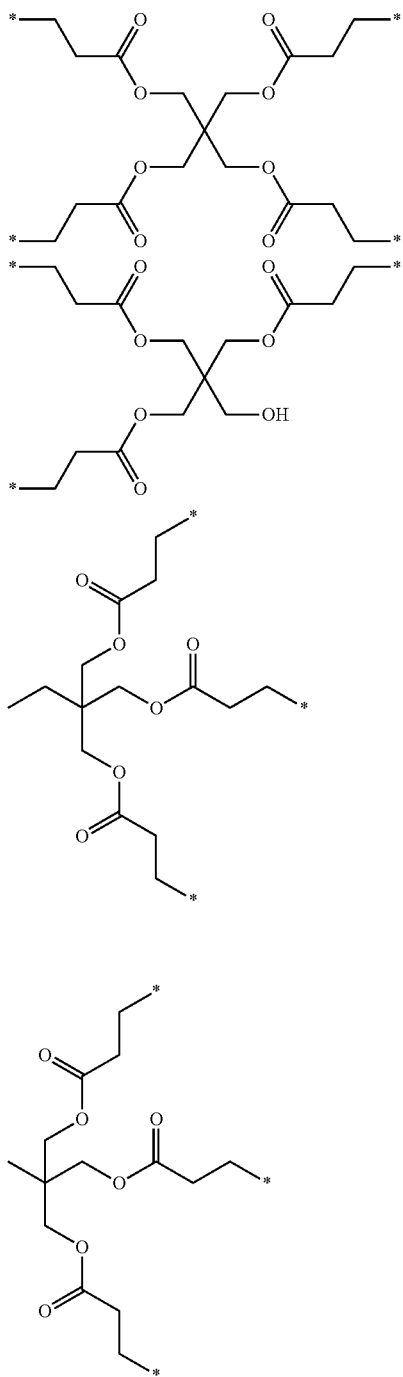

In Formula 1, $R^2$, $R^3$, and $R^4$ each independently represent a single bond or a linking group. $R^2$ and $R^3$ represent preferably a single bond, and $R^4$ represents preferably a linking group.

The linking group that can be used as each of $R^2$, $R^3$, and $R^4$ is not particularly limited, and it is preferable that the linking group is not a linking group consisting of an oligomer or a polymer including two or more repeating units.

Examples of the linking group include linking groups which can be used as W in Formula 3. However, as —$R^4$-($A^1$)p in the formula, a polymer chain can be used. For example, a polymer chain including a p number of $A^1$'s described below can also be used as at least one component consisting of a polymerizable compound forming the polymer chain $P^1$ described below and preferably as each of the components.

In Formula 1, the polymer chain $P^1$ represents a polymer chain including 50 mass % or higher of a component having a SP value of 19.5 or higher. By introducing the polymer chain $P^1$ into the polymer C, a function of improving a cohesive force of the resin required to form binder particles consisting of the polymer C is exhibited. As long as the polymer chain $P^1$ includes 50 mass % or higher of the component having a SP value of 19.5 or higher, the polymer chain $P^1$ may include one or two or more components having a SP value of 19.5 or higher. It is preferable that the polymer chain $P^1$ does not include a component derived from the macromonomer. The macromonomer is not particularly limited, and examples thereof include the macromonomer forming the polymer chain $P^2$ described below.

The polymer chain $P^1$ is not particularly limited as long as it is a polymer chain that reacts with a sulfur atom or the linking group $R^2$ in Formula 1 to be introduced into the polymer C represented by Formula 1, and a chain consisting of a typical polymer can be used. Examples of the polymer chain include a chain consisting of a polymer of a polymerizable compound including one or two or more (preferably 1 to 4) ethylenically unsaturated bonds (addition polymerizable unsaturated bonds) at a terminal or a side chain of the molecular structure. Examples of the ethylenically unsaturated bond include a vinyl group and a (meth)acryloyl group. Preferable examples of the polymerizable compound forming the polymer chain $P^1$ include a styrene compound, vinylnaphthalene, vinylcarbazole, (meth)acrylic acid, a (meth)acrylic acid ester compound, a (meth)acrylamide compound, a (meth)acrylonitrile compound, an allyl compound, a vinyl ether compound, a vinyl ester compound, and a dialkyl itaconate compound.

Among the components derived from the polymerizable compounds, it is preferable that, the polymer chain $P^1$ includes a component derived from a polymerizable compound selected from (meth)acrylic acid, a (meth)acrylic acid ester compound, a (meth)acrylamide compound, or a (meth) acrylonitrile compound, (the polymer chain $P^1$ is a polymer chain consisting of a (meth)acrylic polymer), and it is more preferable that the polymer chain $P^1$ includes a component derived from a polymerizable compound selected from (meth)acrylic acid, a (meth)acrylic acid ester compound, or a (meth)acrylonitrile compound.

The component having a SP value of 19.5 or higher in the polymer chain $P^1$ may be any component as long as it has a SP value of 19.5 or higher, and is preferably a component that is not derived from the macromonomer. As this component, a component derived from a polymerizable compound having a low molecular weight is preferable, a component derived from a polymerizable compound having a low molecular weight that has an ethylenically unsaturated bond is more preferable, and a component having a SP value of 19.5 or higher among the components derived from the polymerizable compounds is still more preferable. The molecular weight of the polymerizable compound having a low molecular weight is not uniquely determined and is, for example, preferably lower than 1000 and more preferably lower than 500.

In a case where the polymer chain $P^1$ includes a component having a SP value of 19.5 or higher, a dispersion liquid of the binder particles in which particles of the polymer C are dispersed in the synthesis process of the polymer C in a hydrophobic solvent (for example, preferably the dispersion medium described below) can be prepared, and further binding properties between solid particles or battery characteristics is excellent. The SP value of the component is preferably 20.0 or higher and more preferably 21.0 or higher. On the other hand, the upper limit is not particularly limited and is appropriately set. For example, the upper limit is preferably 45.0 or lower and more preferably 30.0 or lower.

Examples of a method of setting the SP value of the component to be 19.5 or higher include a method of introducing a functional group having high polarity, for example, a method of introducing a substituent such as a hydroxyl group.

In the present invention, a value calculated using the Okitsu method is used as the SP value of the component in the polymer C. The Okitsu method is specifically described in, for example, "Journal of the Adhesion Society of Japan", 1993, vol. 29, No. 6, pp. 249 to 259. As the SP value of a component in the present application, a value calculated based on a structure of the component incorporated into the polymer is used.

In addition, in a case where the component has an acidic group, and this acidic group is neutralized to disperse the binder particles in the solid electrolyte composition, the SP value of the component before neutralization is used.

In the present invention, the unit of the SP value of the polymer C is not shown but is $MPa^{1/2}$.

The compound for deriving the component having a SP value of 19.5 or higher is not particularly limited, and examples thereof include (meth)acrylic acid, a hydroxyalkyl (meth)acrylate, (meth)acrylic acid (polyoxyalkylene ester), N-mono or di(alkyl) (meth)acrylic acid amide, N-(hydroxyalkyl) (meth)acrylic acid amide, an $\alpha,\beta$-unsaturated nitrile compound, and compounds used in Examples below. Specific examples of the component having a SP value of 19.5 or higher include components derived from tetrahydrofurfuryl (meth)acrylate, 2-acrylamido-2-methylpropanesulfonic acid, diacetone acrylamide, 2-(meth)acryloyloxyethyl acid phosphate, N-(meth)acryloyloxyethyl-N, and N-dimethylammonium-$\alpha$-N-methylcarboxybetaine.

The polymer chain $P^1$ may include components other than the component having a SP value of 19.5 or higher, for example, a component having a SP value of lower than 19.5. As this component, a component derived from the macromonomer may be used, but a component derived from a polymerizable compound having a low molecular weight is preferable, a component derived from a polymerizable compound having a low molecular weight that has an ethylenically unsaturated bond is more preferable, and a component having a SP value of lower than 19.5 among the components derived from the polymerizable compounds is still more preferable. The molecular weight of the polymerizable compound having a low molecular weight is not uniquely determined and is, for example, preferably lower than 500 and more preferably lower than 300.

The SP value of the component having a SP value of lower than 19.5 only has to be lower than 19.5, and the lower limit thereof is appropriately set without any particular limitation. For example, the lower limit is preferably 15.0 or higher and more preferably 17.0 or higher.

The component having a SP value of lower than 19.5 is not particularly limited as long as it is a component derived from a polymerizable compound that is copolymerizable with the polymerizable compound as the component having a SP value of 19.5 or higher. For example, a component derived from a polymerizable compound having a low molecular weight that has an ethylenically unsaturated bond can be used, and specific examples thereof include components derived from acrylic acid, a (meth)acrylic acid ester compound, a cyclic olefin compound, a diene compound, a styrene compound, a vinyl ether compound, a carboxylic acid vinyl ester compound, an unsaturated carboxylic anhydride, and the like. Examples of the copolymerizable compound include components having a SP value of lower than 19.5 among components derived from "vinyl monomer" described in paragraphs "0031" to "0035" of JP2015-088486A and "acrylic monomer" described in paragraphs "0036" to "0042" of JP2015-088486A.

The polymerization degree of all the components in the polymer chain $P^1$ is not particularly limited and is preferably 10 to 10000 and more preferably 20 to 2000.

The content of the component having a SP value of 19.5 or higher in the polymer chain $P^1$ is 50 mass % or higher. In a case where the polymer chain $P^1$ includes 50 mass % or higher of the component, binding properties between solid particles can be improved. From the viewpoint of binding properties between solid particles, the content is preferably 60 mass % or higher, more preferably 75 mass % or higher, and still more preferably 90 mass % or higher. The upper limit value of the content is not particularly limited and may be 100 mass % or may be lower than 100 mass %.

The content of the component having a SP value of lower than 19.5 in the polymer chain $P^1$ is 50 mass % or lower. It is preferable that the content of the component is set such that the total content of the component having a SP value of lower than 19.5 and the component having a SP value of 19.5 or higher is 100 mass %.

In Formula 1, $P^2$ represents a polymer chain (polymer skeleton) including a component derived from a macromonomer having a number-average molecular weight of 500 or higher.

In the present invention, the polymer chain including a component derived from the macromonomer includes not only a chain consisting of a polymer to which a plurality of components derived from the macromonomer are bound but also a chain consisting of one component derived from the macromonomer. In a case where the polymer chain $P^2$ is introduced into the polymer C, high-purity binder particles having a predetermined average particle size can be synthesized in the synthesis process of the polymer C, and a function of improving binding properties between solid particles and dispersibility of solid particles can be exhibited. $P^2$ is not particularly limited as long as it is a polymer chain that reacts with a sulfur atom or a linking group $R^3$ in Formula 1 to be introduced into the polymer C represented by Formula 1, and a chain consisting of a typical polymer or a typical macromonomer can be used. Examples of the polymer chain include a chain consisting of a polymerizable compound (including at least the macromonomer) having an ethylenically unsaturated bond at a terminal or a side chain of the molecular structure and a polymer of the polymerizable compound. As the polymerizable compound forming the polymer chain $P^2$, the same compound as the polymerizable compound forming the polymer chain $P^1$ is preferable, and methacrylic acid or a (meth)acrylic acid ester compound is more preferable (the polymer chain $P^2$ is a polymer chain consisting of a (meth)acrylic acid ester compound or a (meth)acrylic polymer).

The number-average molecular weight of the macromonomer measured using a measurement method described below only has to be 500 or higher, and from the viewpoint of binding properties between solid particles and dispersibility of solid particles, is preferably 1,000 or higher, more preferably 2,000 or higher, and still more preferably 3,000 or higher. The upper limit is not particularly limited and is preferably 500,000 or lower, more preferably 100,000 or lower, and still more preferably 30,000 or lower.

The macromonomer is preferably a compound having an ethylenically unsaturated bond at a terminal or a side chain of the molecular structure, and examples thereof include a compound having a number-average molecular weight of 500 or higher among the respective compounds described as the polymerizable compound forming the polymer chain $P^1$. The number of ethylenically unsaturated bonds in one molecule of the macromonomer is as described above and is preferably one.

It is preferable that the macromonomer for deriving the component in the polymer chain $P^2$ is a monomer represented by the following Formula 3. That is, it is preferable that the component in the polymer chain $P^2$ is a component obtained by cleavage (polymerization) of an ethylenically unsaturated bond in the monomer represented by the following Formula 3.

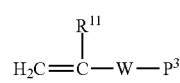

(Formula 3)

in Formula 3, $R^{11}$ represents a hydrogen atom or an alkyl group having 1 to 8 carbon atoms. The number of carbon atoms in the alkyl group is preferably 1 to 3 and more preferably 1. It is preferable that $R^{11}$ represents a hydrogen atom or methyl.

In Formula 3, W represents a single bond or a linking group and preferably a linking group.

The linking group that can be used as W is not particularly limited and is preferably an alkylene group having 1 to 30 carbon atoms, a cycloalkylene group having 3 to 12 carbon atoms, an arylene group having 6 to 24 carbon atoms, a heteroarylene group having 3 to 12 carbon atoms, an ether group (—O—), a sulfide group (—S—), a phosphinidene group (—PR—:R represents a hydrogen atom or an alkyl group having 1 to 6 carbon atoms), a silylene group (—SiR$^{S1}$R$^{S2}$—:R$^{S1}$ and R$^{S2}$ represent a hydrogen atom or an alkyl group having 1 to 6 carbon atoms), a carbonyl group, an imino group (—NR$^N$—:R$^N$ represents a hydrogen atom, an alkyl group having 1 to 6 carbon atoms, or an aryl group having 6 to 10 carbon atoms), or a linking group including a combination of two or more (preferably 2 to 10) thereof. In particular, an alkylene group having 1 to 30 carbon atoms, an arylene group having 6 to 24 carbon atoms, an ether group, a carbonyl group, a sulfide group, or a linking group including a combination of two or more (preferably 2 to 10) thereof is more preferable.

In Formula 3, $P^3$ represents a polymer chain, and a linking site to W is not particularly limited and may be a terminal or a side chain of the polymer chain. The polymer chain which can be used as $P^3$ is not particularly limited, and a polymer chain consisting of a typical polymer can be used. Examples of the polymer chain include a chain consisting of a (meth)acrylic polymer, polyether, polysiloxane, or polyester and a chain including a combination of two (preferably two or three) of the above-described chains. In particular, a chain including a (meth)acrylic polymer is preferable, and a chain of a (meth)acrylic polymer is more preferable. In the chain including a combination, the combination of chains is not particularly limited and is appropriately determined.

The chain consisting of a (meth)acrylic polymer, polyether, polysiloxane, or polyester is not particularly limited as long as it is a chain consisting of a typical (meth) acrylic polymer, a typical polyether, typical polysiloxane, or a typical polyester.

For example, as the (meth)acrylic polymer, a polymer including a component derived from a polymerizable compound selected from (meth)acrylic acid, a (meth)acrylic acid ester compound, a (meth)acrylamide compound, or a (meth) acrylonitrile compound is preferable, and a polymer including a component derived from a polymerizable compound selected from (meth)acrylic acid, a (meth)acrylic acid ester compound, or a (meth)acrylonitrile compound is more preferable. In particular, among the (meth)acrylic acid ester compounds, a polymer including a component derived from a long-chain alkyl ester of (meth)acrylic acid is preferable. For example, the number of carbon atoms in the long-chain alkyl group is preferably 4 or more, more preferably 4 to 24, and still more preferably 8 to 20. The (meth)acrylic polymer may include a component derived from the polymerizable compound having an ethylenically unsaturated bond, for example, a styrene compound or a cyclic olefin compound.

Examples of the polyether include polyalkylene ether and polyarylene ether. The number of carbon atoms in the alkylene group of the polyalkylene ether is preferably 1 to 10, more preferably 2 to 6, and still more preferably 2 to 4. The number of carbon atoms in the arylene group of the polyarylene ether is preferably 6 to 22 and more preferably 6 to 10. The alkylene groups and the arylene groups in the polyether chain may be the same as or different from each other. The terminal in the polyether chain is a hydrogen atom or a substituent, and examples of the substituent include an alkyl group (preferably having 1 to 20 carbon atoms).

Examples of the polysiloxane include a chain including a repeating unit represented by $—O—Si(R^S{}_2)—$. In the repeating unit, $R^S$ represents a hydrogen atom or a substituent, the substituent is not particularly limited, and examples thereof include a hydroxy group, an alkyl group (having preferably 1 to 12 carbon atoms, more preferably 1 to 6 carbon atoms, and still more preferably 1 to 3 carbon atoms), an alkenyl group (having preferably 2 to 12 carbon atoms, more preferably 2 to 6 carbon atoms, and still more preferably 2 or 3 carbon atoms), an alkoxy group (having preferably 1 to 24 carbon atoms, more preferably 1 to 12 carbon atoms, still more preferably 1 to 6 carbon atoms, and still more preferably 1 to 3 carbon atoms), an aryl group (having preferably 6 to 22 carbon atoms, more preferably 6 to 14 carbon atoms, and still more preferably 6 to 10 carbon atoms), and an aryloxy group (having preferably 6 to 22 carbon atoms, more preferably 6 to 14 carbon atoms, and still more preferably 6 to 10 carbon atoms), and an aralkyl group (having preferably 7 to 23 carbon atoms, more preferably 7 to 15 carbon atoms, and still more preferably 7 to 11 carbon atoms). In particular, an alkyl group having 1 to 3 carbon atoms, an alkoxy group having 1 to 12 carbon atom, a phenyl group is more preferable, and an alkyl group having 1 to 3 carbon atoms is still more preferable. A group positioned at the terminal of the polysiloxane is not particularly limited, and examples thereof include an alkyl group (having preferably 1 to 20 carbon atoms, more preferably 1 to 6 carbon atoms, and still more preferably 1 to 3 carbon atoms), an alkoxy group (having preferably 1 to 20 carbon atoms, more preferably 1 to 6 carbon atoms, and still more preferably 1 to 3 carbon atoms), an aryl group (preferably having 6 to 26 carbon atoms and more preferably having 6 to 10 carbon atoms), and a heterocyclic group (preferably having at least one of an oxygen atom, a sulfur atom, or a nitrogen atom; a heterocyclic group having 2 to 20 carbon atoms preferably a 5-membered ring or a 6-membered ring). The polysiloxane may be linear or branched.

The polyester is not particularly limited as long as it consists of a polycondensate of a polycarboxylic acid and a polyhydric alcohol. As the polycarboxylic acid and the polyhydric alcohol, for example, a typically used polycarboxylic acid and a typically used polyhydric alcohol can be used, and examples thereof include an aliphatic or aromatic polycarboxylic acid and an aliphatic or aromatic polyhydric alcohol. The valence of the polycarboxylic acid and the polyhydric alcohol only has to be 2 or more and is typically 2 to 4.

As the macromonomer for deriving the component in the polymer chain $P^2$, a polymer chain selected from the group consisting of a (meth)acrylic polymer, polyether, polysiloxane, polyester, and a combination thereof or a monomer having an ethylenically unsaturated bond bound to the polymer chain is more preferable. The polymer chain in the macromonomer has the same definition and the same preferable range as those of the polymer chain which can be preferably used as the polymer chain $P^3$ in Formula 3. In addition, the ethylenically unsaturated bond has the same definition as the ethylenically unsaturated bond in the polymerizable compound forming the polymer chain $P^1$, and a (meth)acryloyl group is preferable. The polymer chain and the ethylenically unsaturated bond may be bound to each other directly (without a linking group) or through a linking group. In this case, examples of the linking group include the linking group which can be used as W in Formula 3.

The SP value of the macromonomer is not particularly limited and is, for example, preferably 21 or lower and more preferably 20 or lower. The lower limit value is practically 15 or more.

The polymerization degree of the polymer chain (corresponding to the polymer chain $P^3$ in Formula 3) in the macromonomer of the polymer chain $P^2$ is not particularly limited as long as the number-average molecular weight of the macromonomer is 500, and is preferably 5 to 5000 and more preferably 10 to 300.

In addition to the component derived from the macromonomer, the polymer chain $P^2$ may include another component. The other component is not particularly limited, and examples thereof include the respective components forming the polymer chain $P^1$ (other than the macromonomer).

The polymerization degree of all the components forming the polymer chain $P^2$ is not particularly limited and is preferably 1 to 200 and more preferably 1 to 100.

The content of the component derived from the macromonomer in the polymer chain $P^2$ is not particularly limited as long as it exceeds 0 mass %. In a case where the polymer chain $P^2$ includes the component derived from the macromonomer, binding properties between solid particles can be improved. From the viewpoint of binding properties between solid particles, the content of the component is preferably 50 mass % or higher, more preferably 75 mass % or higher, and still more preferably 90 mass % or higher. The upper limit value of the content is not particularly limited and may be 100 mass % or may be lower than 100 mass %. In a case where the upper limit value is set to be lower than 100 mass %, the upper limit value can be set to be, for example, 50 mass % or lower.

In the polymer chain $P^2$, the content of the other component other than the component derived from the macromonomer is 0 mass % or higher and is preferably set such that the total content of the other $P^2$ chain component and the component derived from the macromonomer is 100 mass %.

In Formula 1, $A^1$ represents a hydrogen atom, an acidic group, a group having a basic nitrogen atom, a urea group, a urethane group, an alkoxysilyl group, an epoxy group, an isocyanate group, or a hydroxyl group. In particular, an acidic group, a group having a basic nitrogen atom, a urea group, or a urethane group is preferable.

The acidic group which can be used as $A^1$ is not particularly limited, and examples thereof include a carboxylate group (—COOH), a sulfonate group (sulfo group: —SO$_3$H), a phosphate group (phospho group: —OPO(OH)$_2$), a phosphonate group, and a phosphinate group.

Examples of the group having a basic nitrogen atom which can be used as $A^1$ include an amino group, a pyridyl group, an imino group, and an amidine.

Preferable examples of the urea group which can be used as $A^1$ include —NR$^{15}$CONR$^{16}$R$^{17}$ (here, R$^{15}$, R$^{16}$, and R$^{17}$ represent a hydrogen atom, an alkyl group having 1 to 20 carbon atoms, an aryl group having 6 or more carbon atoms, or an aralkyl group having 7 or more carbon atoms). As the urea group, —NR$^{15}$CONHR$^{17}$ (here, R$^{15}$ and R$^{17}$ represent a hydrogen atom, an alkyl group having 1 to 10 carbon atoms, an aryl group having 6 or more carbon atoms, or an aralkyl group having 7 or more carbon atoms) is more preferable, and —NHCONHR$^{17}$ (here, R$^{17}$ represents a hydrogen atom, an alkyl group having 1 to 10 carbon atoms, an aryl group having 6 or more carbon atoms, or an aralkyl group having 7 or more carbon atoms) is still more preferable.

Preferable examples of the urethane group which can be used as $A^1$ include a group including at least an imino group and a carbonyl group such as —NHCOR$^{18}$, —NR$^{19}$COOR$^{20}$, —OCONHR$^{21}$, or —OCONR$^{22}$R$^{23}$ (here, R$^{18}$, R$^{19}$, R$^{20}$, R$^{21}$, R$^{22}$, and R$^{23}$ represent an alkyl group having 1 to 20 carbon atoms, an aryl group having 6 or more carbon atoms, or an aralkyl group having 7 or more carbon atoms). As the urethane group, —NHCOOR$^{18}$ or —OCONHR$^{21}$ (here, R$^{18}$ and R$^{21}$ represent an alkyl group having 1 to 20 carbon atoms, an aryl group having 6 or more carbon atoms, or an aralkyl group having 7 or more carbon atoms) is more preferable, and —NHCOOR$^{18}$ or —OCONHR$^{21}$ (here, R$^{18}$ and R$^{21}$ represent an alkyl group having 1 to 10 carbon atoms, an aryl group having 6 or more carbon atoms, or an aralkyl group having 7 or more carbon atoms is still more preferable.

The alkoxysilyl group which can be used as $A^1$ is not particularly limited and is preferably an alkoxysilyl group having 1 to 6 carbon atoms, and examples thereof include methoxysilyl, ethoxysilyl, t-butoxysilyl, and cyclohexylsilyl.

$A^1$ interacts with the solid particles such that binding properties between solid particles exhibited by the binder particles can be further reinforced. The interaction is not particularly limited, and examples thereof include an interaction by a hydrogen bond, an interaction by an acid-base ionic bond, an interaction by a covalent bond, a π-π interaction by an aromatic ring, and a hydrophobic-hydrophobic interaction. The solid particles and the binder particles adsorb to each other due to one or two or more among the above-described interactions depending on the kind of the group which can be used as $A^1$ and the kind of the above-described solid particles.

In a case where the group which can be used as $A^1$ interacts, the chemical structure of the group which can be used as $A^1$ may or may not change. For example, in the above-described π-π interaction or the like, typically, the group which can be used as $A^1$ maintains the structure thereof without a change. On the other hand, in the interaction by a covalent bond or the like, typically, the functional group is converted into an anion (the group which can be used as $A^1$ changes) by desorption of active hydrogen such as a carboxylate group and is bound to the solid particles.

An acidic group, a hydroxyl group, or an alkoxysilyl group is suitably adsorbed to the positive electrode active material and the inorganic solid electrolyte. Among these, a carboxylate group is more preferable.

A group having a basic nitrogen atom is suitably adsorbed to a conductive auxiliary agent.

In Formula 1, p represents an integer of 1 to 10, preferably an integer of 1 to 5, more preferably an integer of 1 to 3, and still more preferably 1.

In Formula 1, l represents an integer of 0 to 5, preferably an integer of 0 to 4, more preferably an integer of 0 to 3, and still more preferably 0 to 2.

m represents an integer of 1 to 8, preferably an integer of 1 to 4, more preferably an integer of 1 to 3, and still more preferably 1 or 2.

n represents an integer of 1 to 9, preferably an integer of 2 to 5, and more preferably an integer of 3 to 5.

l+m+n represents an integer of 3 to 10, preferably an integer of 3 to 8, more preferably an integer of 3 to 6, and still more preferably an integer of 4 to 6.

The polymer chain in the polymer C represented by Formula 1 may be any one of a homopolymer, a block copolymer, an alternating copolymer, or a random copolymer and may be a graft copolymer.

As the polymer C, a commercially available product can be used. However, the binder particles can be synthesized, for example, by using a surfactant, an emulsifier, or a dispersant, the polymerizable compound forming the polymer chain $P^1$, the polymerizable compound forming the polymer chain $P^2$, the polymerizable compound having $A^1$ and $R^4$, a copolymerizable compound, and the like and performing an addition reaction of the polymerizable compound having $A^1$ and $R^4$ using a typical method, the polymerizable compound forming the polymer chain $P^1$, the polymerizable compound forming the polymer chain $P^2$, and a polyvalent thiol compound such that the polymer chain $P^1$ and the polymer chain $P^2$ are introduced into the thiol compound. Optionally, a polymerization (radical polymerization) reaction can also be performed using the polymerizable compound forming the polymer chain $P^1$ and the polymerizable compound forming the polymer chain $P^2$ according to a typical polymerization reaction or the like.

In this reaction, the polymer C is typically synthesized as spherical or granular polymer particles (binder particles). The average particle size of the obtained binder particles can be appropriately set to be in a predetermined range depending on the kinds of the compounds and the like to be used, a polymerization temperature, a dropping time, a dropping method, the amount of a polymerization initiator, and the like.

In the present invention, the expression of a compound (for example, in a case where a compound is represented by an expression with "compound" added to the end) refers to not only the compound itself but also a salt or an ion thereof. In addition, this expression also refers to a derivative obtained by modifying a part of the compound, for example, by introducing a substituent into the compound within a range where desired effects are exhibited.

A substituent, a linking group, or the like (hereinafter, referred to as "substituent or the like") is not specified in the present invention regarding whether to be substituted or unsubstituted may have an appropriate substituent. Accordingly, even in a case where a YYY group is simply described in the present specification, this YYY group includes not only an aspect having a substituent but also an aspect not having a substituent. The same shall be applied to a compound which is not specified in the present specification regarding whether to be substituted or unsubstituted. Preferable examples of the substituent include a substituent T described below.

In the present invention, in a case where a plurality of substituents or the like represented by a specific reference numeral are present or a plurality of substituents or the like are simultaneously or alternatively defined, the respective substituents or the like may be the same as or different from each other. In addition, unless specified otherwise, in a case where a plurality of substituents or the like are adjacent to each other, the substituents may be linked or fused to each other to form a ring.

Examples of the substituent T are as follows:

an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, or 1-carboxymethyl); an alkenyl group (preferably an alkenyl group having 2 to 20 carbon atoms, for example, vinyl, allyl, or oleyl); an alkynyl group (preferably an alkynyl group having 2 to 20 carbon atoms, for example, ethynyl, butadiynyl, or phenyl-ethynyl); a cycloalkyl group (preferably a cycloalkyl group having 3 to 20 carbon atoms, for example, cyclopropyl, cyclopentyl, cyclohexyl, or 4-methylcyclohexyl); an aryl group (preferably an aryl group having 6 to 26 carbon atoms, for example, phenyl, 1-naphthyl, 4-methoxyphenyl, 2-chlorophenyl, or 3-methylphenyl); a heterocyclic group (preferably a heterocyclic group having 2 to 20 carbon atoms and more preferably a 5- or 6-membered heterocyclic group having at least one oxygen atom, sulfur atom, or nitrogen atom; the heterocyclic group includes an aromatic heterocyclic group and an aliphatic heterocyclic group; for example, a tetrahydropyran ring group, a tetrahydrofuran ring group, 2-pyridyl, 4-pyridyl, 2-imidazolyl, 2-benzimidazolyl, 2-thiazolyl, or 2-oxazolyl); an alkoxy group (preferably an alkoxy group having 1 to 20 carbon atoms, for example, methoxy, ethoxy, isopropyloxy, or benzyloxy); an aryloxy group (preferably an aryloxy group having 6 to 26 carbon atoms, for example, phenoxy, 1-naphthyloxy, 3-methylphenoxy, or 4-methoxyphenoxy); a heterocyclic oxy group (a group in which an —O— group is bonded to the above-described heterocyclic group), an alkoxycarbonyl group (preferably an alkoxycarbonyl group having 2 to 20 carbon atoms, for example, ethoxycarbonyl or 2-ethylhexyloxycarbonyl); an aryloxycarbonyl group (preferably an aryloxycarbonyl group having 6 to 26 carbon atoms, for example, phenoxycarbonyl, 1-naphthyloxycarbonyl, 3-methylphenoxycarbonyl, or 4-methoxyphenoxycarbonyl); an amino group (preferably an amino group having 0 to 20 carbon atoms, an alkylamino group, or an arylamino group, for example, amino (—$NH_2$—), N,N-dimethylamino, N,N-diethylamino, N-ethylamino, or anilino); a sulfamoyl group (preferably a sulfamoyl group having 0 to 20 carbon atoms, for example, N,N-dimethylsulfamoyl or N-phenylsufamoyl); an acyl group (an alkylcarbonyl group, an alkenylcarbonyl group, an alkynylcarbonyl group, an arylcarbonyl group, or a heterocyclic carbonyl group, preferably an acyl group having 1 to 20 carbon atoms, for example, acetyl, propionyl, butyryl, octanoyl, hexadecanoyl, acryloyl, methacryloyl, crotonoyl, benzoyl, naphthoyl, or nicotinoyl); an acyloxy group (an alkylcarbonyloxy group, an alkenylcarbonyloxy group, an alkynylcarbonyloxy group, an arylcarbonyloxy group, or a heterocyclic carbonyloxy group, preferably an acyloxy group having 1 to 20 carbon atoms, for example, acetyloxy, propionyloxy, butyryloxy, octanoyloxy, hexadecanoyloxy, acryloyloxy, methacryloyloxy, crotonoyloxy, benzoyloxy, naphthoyloxy, or nicotinoyloxy); an aryloyloxy group (preferably an aryloyloxy group having 7 to 23 carbon atoms, for example, benzoyloxy); a carbamoyl group (preferably a carbamoyl group having 1 to 20 carbon atoms, for example, N,N-dimethylcarbamoyl or N-phenylcarbamoyl); an acylamino group (preferably an acylamino group having 1 to 20 carbon atoms, for example, acetylamino or benzoylamino); an alkylthio group (preferably an alkylthio group having 1 to 20 carbon atoms, for example, methylthio, ethylthio, isopropylthio, or benzylthio); an arylthio group (preferably an arylthio group having 6 to 26 carbon atoms, for example, phenylthio, 1-naphthylthio, 3-methylphenylthio, or 4-methoxyphenylthio); a heterocyclic thio group (a group in which an —S— group is bonded to the above-described heterocyclic group), an alkylsulfonyl group (preferably an alkylsulfonyl group having 1 to 20 carbon atoms, for example, methylsulfonyl or ethylsulfonyl), an arylsulfonyl group (preferably an arylsulfonyl group having 6 to 22 carbon atoms, for example, benzenesulfonyl), an alkylsilyl group (preferably an alkylsilyl group having 1 to 20 carbon atoms, for example, monomethylsilyl, dimethylsilyl, trimethylsilyl, or triethylsilyl); an arylsilyl group (preferably an arylsilyl group having 6 to 42 carbon atoms, for example, triphenylsilyl), a phosphoryl group (preferably a phosphate group having 0 to 20 carbon atoms, for example, —OP(=O)($R^P$)$_2$), a phosphonyl group (preferably a phosphonyl group having 0 to 20 carbon atoms, for example, —P(=O)($R^P$)$_2$), a phosphinyl group (preferably a phosphinyl group having 0 to 20 carbon atoms, for example, —P($R^P$)$_2$), a sulfo group (sulfonate group), a hydroxy group, a sulfanyl group, a cyano group, and a halogen atom (for example, a fluorine atom, a chlorine atom, a bromine atom, or an iodine atom). $R^P$ represents a hydrogen atom or a substituent (preferably a group selected from the substituent T).

In addition, each exemplary group of the substituent T may be further substituted with the substituent T.

In a case where a compound or a substituent, a linking group, or the like includes, for example, an alkyl group, an alkylene group, an alkenyl group, an alkenylene group, an alkynyl group, and/or an alkynylene group, these groups may be cyclic or chained, may be linear or branched, and may be substituted or unsubstituted as described above.

(Physical Properties of Polymer)
—Glass Transition Temperature—

The glass transition temperature of the polymer forming the binder is not particularly limited and is preferably 30° C. or lower, more preferably 25° C. or lower, still more preferably 15° C. or lower, and still more preferably 5° C. or lower. The lower limit of the glass transition temperature is not particularly limited, can be set to, for example, −200° C., and is preferably −150° C. or higher and more preferably −120° C. or higher.

The glass transition temperature (Tg) is measured using a dry sample of the polymer forming the binder as a measurement target with a differential scanning calorimeter "X-DSC7000" (trade name, manufactured by SII NanoTechnology Inc.) under the following conditions. The measurement is performed twice using the same sample, and the result of the second measurement is adopted.

Atmosphere in measuring chamber: nitrogen gas (50 mL/min)
Temperature increase rate: 5° C./min
Measurement start temperature: −100° C.
Measurement end temperature: 200° C.
Sample pan: aluminum pan
Mass of measurement sample: 5 mg
Calculation of Tg:Tg is calculated by rounding off the decimal point of an intermediate temperature between a declination start point and a declination end point in a DSC chart.

In a case where an all-solid state secondary battery is used, the glass transition temperature can be measured, for example, by disassembling the all-solid state secondary battery to peel off an active material layer or a solid electrolyte layer, putting the active material layer or the solid electrolyte layer into water to disperse a material thereof, filtering the dispersion liquid, collecting the remaining solid, and measuring the glass transition temperature of the solid using the above-described measurement method.

It is preferable that the polymer forming the binder is amorphous. In the present invention, "amorphous polymer" typically refers to a resin that shows no endothermic peak caused by crystal melting during measurement using the above-described measurement method of the glass transition temperature.

—Mass Average Molecular Weight—

The mass average molecular weight of the polymer forming the binder is not particularly limited. For example, the mass average molecular weight is preferably 3,000 or higher, more preferably 5,000 or higher, still more preferably 7,000 or higher, and still more preferably 15,000 or higher. The upper limit is practically 1,000,000 or lower, preferably 800,000 or lower, and more preferably 600,000 or lower.

<Measurement of Molecular Weight>

In the present invention, as the mass average molecular weight or the number-average molecular weight, a mass average molecular weight or a number-average molecular weight in terms of standard polystyrene is measured by gel permeation chromatography (GPC). Regarding a measurement method, basically, the following condition 1 or condition 2 (preferred) is used. An appropriate eluent may be appropriately selected and used depending on the kind of the polymer to be measured.

(Condition 1)
Column: a column in which two TOSOH TSKgel Super AWM-H's are linked
Carrier: 10 mM LiBr/N-methylpyrrolidone
Measurement temperature: 40° C.
Carrier flow rate: 1.0 ml/min
Sample concentration: 0.1 mass %
Detector: refractive index (RI) detector (Condition 2)
Column: a column in which TOSOH TSK gel Super HZM-H, TOSOH TSK gel Super HZ4000, and TOSOH TSK gel Super HZ2000 are linked to each other
Carrier: tetrahydrofuran
Measurement temperature: 40° C.
Carrier flow rate: 1.0 ml/min
Sample concentration: 0.1 mass %
Detector: refractive index (RI) detector The polymer forming the binder may be a non-crosslinked polymer or a crosslinked polymer. In addition, in a case where the crosslinking of the polymer progresses due to heating or voltage application, the molecular weight may be higher than the above-described molecular weight. At the start of using the all-solid state secondary battery, the mass average molecular weight of the polymer is preferably in the above-described range.

—Moisture Content—

The moisture content of the binder (polymer) is preferably 100 ppm (by mass) or lower. In addition, the binder may be dried by crystallization, or the polymer dispersion liquid solution may be used as it is.

(Dispersed State of Binder)

The binder consisting of the polymer may be present in the solid electrolyte composition in a state where it is dissolved in, for example, a dispersion medium (the binder that is dissolved in the dispersion medium will be referred to as "dissolution type binder"), and may be present (preferably, dispersed) in the form of a solid (in the form of particles) (the binder that is present in the form of a solid will be referred to as "particle binder"). In the present invention, it is preferable that the binder is a particle binder in the solid electrolyte composition and further in the constituent layer (applied and dried layer) from the viewpoint of reducing the battery resistance and reducing the number of steps to manufacture an all-solid state secondary battery.

In a case where the binder is a particle binder, the average particle size thereof is not particularly limited and is preferably 5 nm or more, more preferably 10 nm or more, still more preferably 20 nm or more, still more preferably 30 nm or more, and still more preferably 50 nm or more. The upper limit is preferably 500 nm or less, more preferably 400 nm or less, still more preferably 300 nm or less, and still more preferably 200 nm or less. The average particle size of the particle binder is a value measured using the same method as that of the average particle size of the inorganic solid electrolyte.

The solid electrolyte composition may include one binder or two or more binders.

The content of the binder in the solid electrolyte composition is not particularly limited and can be appropriately set. For example, from the viewpoints of binding properties between the solid particles and the residual amount of the solid electrolyte layer, the lower limit of the content in the solid electrolyte composition is preferably 0.1 mass % or higher, more preferably 0.5 mass % or higher, still more preferably 1 mass % or higher, and still more preferably 2 mass % or higher. On the other hand, from the viewpoints of deterioration in battery performance (increase in battery resistance) and the residual amount of the solid electrolyte layer, the lower limit in the solid electrolyte composition is preferably 8 mass % or lower, more preferably 6 mass % or lower, still more preferably 5 mass % or lower, and still more preferably lower than 4 mass %.

—Dispersion Medium—

The dispersion medium including a preferable amount of the solid electrolyte composition may be obtained by dispersing or dissolving a dispersoid such as an inorganic solid electrolyte, and examples thereof include various organic solvents. Examples of the organic solvent include the respective solvents of an alcohol compound, an ether compound, an amide compound, an amine compound, a ketone compound, an aromatic compound, an aliphatic compound, a nitrile compound, and an ester compound. Specific examples of the dispersion medium are as follows.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound include an alkylene glycol (for example, diethylene glycol, triethylene glycol, polyethylene glycol, or dipropylene glycol), an alkylene glycol alkyl ether (for example, ethylene glycol monomethyl ether, ethylene glycol monobutyl ether, propylene glycol monomethyl ether, diethylene glycol monomethyl ether, dipropylene glycol monomethyl ether, tripropylene glycol monomethyl ether, or diethylene glycol monobutyl ether), a dialkyl ether (for example, dimethyl ether, diethyl ether, diisopropyl ether, or dibutyl ether), and a cyclic ether (for example, tetrahydrofuran or dioxane (including respective isomers of 1,2-, 1,3, and 1,4-)).

Examples of the amide compound include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, and hexamethylphosphorictriamide.

Examples of the amine compound include triethylamine, diisopropylethylamine, and tributylamine.

Examples of the ketone compound include acetone, methyl ethyl ketone, methyl isobutyl ketone, cyclohexanone, and diisobutyl ketone.

Examples of the aromatic compound include benzene, toluene, and xylene.

Examples of the aliphatic compound include hexane, heptane, octane, and decane.

Examples of the nitrile compound include acetonitrile, propionitrile, and isobutyronitrile.

Examples of the ester compound include ethyl acetate, butyl acetate, propyl acetate, butyl butyrate, and butyl pentanoate.

Examples of a non-aqueous dispersion medium include the aromatic compound and the aliphatic compound described above.

In the present invention, in particular, a ketone compound, an aromatic compound, an aliphatic compound, or an ester compound is preferable, and a ketone compound, an aliphatic compound, or an ester compound is more preferable.

The boiling point of the dispersion medium under normal pressure (1 atm) is preferably 50° C. or higher and more preferably 70° C. or higher. The upper limit is more preferably 250° C. or lower and still more preferably 220° C. or lower.

The solid electrolyte composition may include one dispersion medium or two or more dispersion mediums.

The content of the dispersion medium in the solid electrolyte composition is not particularly limited and can be appropriately set. For example, the content of the dispersion medium in the solid electrolyte composition is preferably 20% to 99 mass %, more preferably 25% to 70 mass %, and still more preferably 30% to 60 mass %.

—Lithium Salt—

The solid electrolyte composition may include a lithium salt (supporting electrolyte). The lithium salt is preferably a lithium salt typically used for this kind of product and is not particularly limited. For example, a lithium salt described in paragraphs "0082" to "0085" of JP2015-088486A is preferable.

In a case where the solid electrolyte composition includes a lithium salt, the content of the lithium salt is preferably 0.1 parts by mass or more and more preferably 5 parts by mass or more with respect to 100 parts by mass of the inorganic solid electrolyte. The upper limit is preferably 50 parts by mass or less and more preferably 20 parts by mass or less.

—Dispersant—

The solid electrolyte composition may include a dispersant. As the dispersant, a dispersant that is generally used for an all-solid state secondary battery can be appropriately selected and used. Generally, a compound intended for particle adsorption and steric repulsion and/or electrostatic repulsion is preferably used.

—Other Additives—

As components other than the respective components described above, the solid electrolyte composition may appropriately include an ionic liquid, a thickener, a crosslinking agent (an agent causing a crosslinking reaction by radical polymerization, condensation polymerization, or ring-opening polymerization), a polymerization initiator (an agent that generates an acid or a radical by heat or light), an antifoaming agent, a leveling agent, a dehydrating agent, or an antioxidant. The ionic liquid is added to improved the ion conductivity, and a well-known material can be used without any particular limitation.

—Preparation of Solid Electrolyte Composition—

Typically, the solid electrolyte composition can be prepared as a mixture, preferably, as a slurry by mixing the inorganic solid electrolyte, the binder, and preferably the dispersion medium and appropriately other components, for example using various mixers that are typically used.

Examples of the mixer include a ball mill, a beads mill, a planetary mixer, a blade mixer, a roll mill, a kneader, and a disc mill. A mixing method is not particularly limited, and the components may be mixed at once or sequentially. Mixing conditions are not particularly limited, and appropriate conditions can be applied. In addition, a mixing environment is not also particularly limited, and examples thereof include a dry air environment and an inert gas environment.

In the manufacturing method according to the embodiment of the present invention, it is preferable that the solid electrolyte composition is prepared using the following method.

In a case where the solid electrolyte composition prepared using the following method is used for the manufacturing method according to the embodiment of the present invention, 1% to 10 mass % of the solid electrolyte layer can be made to remain in the support in the peeling step described below, and the solid electrolyte layer and the active material layer provided on the solid electrolyte layer can be compressed and bonded with strong interlaminar adhesion. Further, in the solid electrolyte layer that is transferred to the active material layer in the pre-compression bonding step, the formation of a deep recess portion and further the formation of a pinhole that is formed in the thickness direction can be suppressed.

(Case where Binder is Particle Binder)

For example, using a method of putting the inorganic solid electrolyte, the dispersion medium, and a predetermined amount of the binder into a mixer to mix the components, the solid electrolyte composition is prepared preferably as a slurry.

(Case where Binder is Dissolution Type Binder)

For example, a method of mixing a mixture obtained by mixing the inorganic solid electrolyte and a predetermined amount of the binder with each other and the inorganic solid electrolyte that is not mixed with the binder with each other using an ordinary method to prepare the solid electrolyte composition can be used. In this case, a mixing ratio between the inorganic solid electrolyte that is mixed with the binder and the inorganic solid electrolyte that is not mixed with the binder is not particularly limited and is appropriately determined depending on the above-described binding state (the residual amount in the support).

In the solid electrolyte layer forming step, the solid electrolyte sheet including the solid electrolyte layer that is formed (directly) on the support can be prepared.

<One Active Material Layer Forming Step>

In the manufacturing method according to the embodiment of the present invention, it is preferable to perform a step of forming a film on a substrate (current collector) using an electrode composition including one of a positive electrode active material or a negative electrode active material before the pre-compression bonding step. In this film forming step, the active material sheet is prepared by forming the negative electrode active material layer or the positive electrode active material layer as the active material layer to which the solid electrolyte layer is compressed and bonded. It is preferable that a negative electrode active material sheet including the negative electrode active material layer is prepared. In the manufacturing method according to the embodiment of the present invention, although not particularly limited thereto, it is preferable that the active material sheet that is prepared in the film forming step and in which the substrate and the active material layer are laminated in this order is used in the pre-compression bonding step.

This film forming step is typically performed before the pre-compression bonding step and may be performed before or after the solid electrolyte layer forming step.

In the film forming step, a method of preparing a laminate including the substrate and the active material layer by forming a film on the substrate using the electrode composition including one of the positive electrode active material or the negative electrode active material and preferably further including at least one of the inorganic solid electrolyte, the conductive auxiliary agent, or the binder can be applied without any particular limitation. For example, a method of forming a film (applying and drying) (directly) on the substrate using the electrode composition can be used. As a result, the applied and dried layer of the electrode composition can be formed on the substrate. The obtained applied and dried layer is the same as the applied and dried layer of the solid electrolyte composition, except that it includes the active material and optionally further includes the conductive auxiliary agent and the like in addition to the inorganic solid electrolyte.

The method of forming the electrode composition is the same as the method of forming the solid electrolyte composition.

The applied and dried layer (active material layer) of the electrode composition obtained as described above includes one of the positive electrode active material or the negative electrode active material described below and preferably further includes at least one of the inorganic solid electrolyte, the conductive auxiliary agent, or the binder, and the solid particles (the inorganic solid electrolyte, the active material, and the conductive auxiliary agent) and further the solid particles and the substrate bind to each other using the binder. Regarding the binding state in the active material sheet, it is preferable that the applied and dried layer and the active material layer bind to each other to the degree that the applied and dried layer does not peel off from the substrate in the peeling step described below and cracking, fracturing, or the like does not occur in the active material layer.

(Substrate)

It is preferable that the substrate used in the film forming step functions as a current collector in case of being incorporated into an all-solid state secondary battery.

As the substrate, a compact having a film shape or a sheet shape is typically used, but it is also possible to use a net-shaped substrate, a punched substrate, compacts of lath bodies, porous bodies, foaming bodies, or fiber groups, and the like.

The thickness of the current collector is not particularly limited, but is preferably 1 to 500 µm. In addition, it is also preferable that the surface of the current collector is made to be uneven through a surface treatment.

It is preferable that the substrate is an electron conductor. In a case where a positive electrode current collector is adopted as the substrate, as a material for forming the positive electrode current collector, not only aluminum, an aluminum alloy, stainless steel, nickel, or titanium but also a material (a material on which a thin film is formed) obtained by treating (coating) the surface of aluminum or stainless steel with carbon, nickel, titanium, or silver is preferable. Among these, aluminum or an aluminum alloy, or those having a surface coated with carbon is more preferable. In a case where a negative electrode current collector is adopted as the substrate, as a material for forming the negative electrode current collector, not only aluminum, copper, a copper alloy, stainless steel, nickel, or titanium but also a material obtained by treating (coating) the surface of aluminum, copper, a copper alloy, or stainless steel with carbon, nickel, titanium, or silver is preferable, and aluminum, copper, a copper alloy, or stainless steel or those having a surface coated with carbon is more preferable.

As the substrate having a surface coated with carbon, a well-known substrate can be used without any particular limitation. Examples of the substrate include "carbon-coated foil including a carbon-coated foil-farming coating solution layer and a metal foil") described in JP2013-023654A and JP2013-229187A.

(Electrode Composition)

The electrode composition used in the solid electrolyte layer forming step includes one of the positive electrode active material layer or the negative electrode active material layer described below and preferably further includes at least one of the inorganic solid electrolyte, the conductive auxiliary agent, or the binder and the dispersion medium. The electrode composition is the same as the above-described solid electrolyte composition, except that it further includes the active material, the conductive auxiliary agent, and the like. In addition, a mixed aspect, a moisture content, and the like of the electrode composition are the same as those of the above-described solid electrolyte composition.

In the present invention, the composition including the active material will be referred to as "electrode composition". Specifically, the composition including the positive electrode active material will be referred to as "positive electrode composition", and the composition including the negative electrode active material will be referred to as "negative electrode composition".

—Active Material—

The active material is capable of intercalating and deintercalating ions of a metal belonging to Group 1 or Group 2 in the periodic table. As the active material, an active material that is typically used for an all-solid state secondary battery can be appropriately selected and used.

(Positive Electrode Active Material)

The positive electrode active material is preferably capable of reversibly intercalating and/or deintercalating lithium ions. The above-described material is not particularly limited as long as the material has the above-described characteristics and may be transition metal oxides, elements capable of being complexed with Li such as sulfur, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a layered rock salt structure (MA), transition metal oxides having a spinel-type structure (MB), lithium-containing transition metal phosphate compounds (MC), lithium-containing transition metal halogenated phosphate compounds (MD), and lithium-containing transition metal silicate compounds (ME).

Specific examples of the transition metal oxides having a layered rock salt structure (MA) include $LiCoO_2$ (lithium cobalt oxide [LCO]), $LiNi_2O_2$ (lithium nickel oxide) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon type vanadium phosphate salt such as $Li_3V_2(PO_4)_3$ (lithium vanadium phosphate).

Examples of the lithium-containing transition metal halogenated phosphate compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxides having a layered rock salt structure (MA) is preferable, and LCO or NMC is more preferable.

The shape of the positive electrode active material is not particularly limited, but is preferably a particle shape. The average particle size (sphere-equivalent average particle size) of the positive electrode active material is not particularly limited. For example, the volume average particle size can be set to 0.1 to 50 μm. The average particle size of the positive electrode active material particles can be measured using the same method as that of the average particle size of the inorganic solid electrolyte. In order to allow the positive electrode active material to have a predetermined particle size, an ordinary pulverizer or classifier may be used. For example, a mortar, a ball mill, a sand mill, a vibration ball mill, a satellite ball mill, a planetary ball mill, a swirling air flow jet mill, or a sieve is preferably used. During the pulverization, wet pulverization of causing water or an organic solvent such as methanol to coexist with the negative electrode active material can be performed. In order to obtain a desired particle size, it is preferable to perform classification. Classification is not particularly limited and can be performed using, for example, a sieve or an air classifier. The classification can be used using a dry method or a wet method.

Positive electrode active materials obtained using a calcination method may be used after being washed with water, an acidic aqueous solution, an alkaline aqueous solution, or an organic solvent.

The electrode composition (positive electrode composition) may include one positive electrode active material or two or more positive electrode active materials.

The content of the positive electrode active material in the electrode composition is not particularly limited and is preferably 10% to 97 mass %, more preferably 30% to 95 mass %, still more preferably 40% to 93 mass %, and still more preferably 50% to 90 mass % with respect to 100 mass % of the solid content. In a case where the electrode composition includes the inorganic solid electrolyte, it is preferable that the total content of the positive electrode active material and the inorganic solid electrolyte is set to the content of the inorganic solid electrolyte in the solid electrolyte composition.

(Negative Electrode Active Material)

The negative electrode active material is preferably capable of reversibly intercalating and/or deintercalating lithium ions. The material is not particularly limited as long as it has the above-described properties, and examples thereof include a carbonaceous material, a metal oxide, a metal composite oxide, elemental lithium, a lithium alloy, and a negative electrode active material capable of forming an alloy with lithium. Among these, a carbonaceous material, a metal composite oxide, or lithium is preferably used from the viewpoint of reliability. From the viewpoint of increasing the capacity of an all-solid state secondary battery, an active material capable of forming an alloy with lithium is preferable. In the negative electrode active material formed of the negative electrode composition according to the embodiment of the present invention, the solid particles can be strongly bound to each other. Therefore, an active material capable of forming an alloy with lithium can be used as the negative electrode active material.

The carbonaceous material which is used as the negative electrode active material is a material substantially containing carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into hardly graphitizable carbonaceous materials (also referred to as "hard carbon") and graphitizable carbonaceous materials based on the graphitization degree. In addition, it is preferable that the carbonaceous material has the lattice spacing, density, and crystallite size described in JP1987-022066A (JP-S62-022066A), JP1990-006856A (JP-H2-006856A), and JP1991-045473A (JP-H3-045473A). The carbonaceous material is not necessarily a single material and, for example, may be a mixture of natural graphite and artificial graphite described in JP1993-090844A (JP-H5-090844A) or graphite having a coating layer described in JP1994-004516A (JP-H6-004516A).

As the carbonaceous material, hard carbon or graphite is preferably used, and graphite is more preferably used.

The oxide of a metal or a metalloid element that can be used as the negative electrode active material is not particularly limited as long as it is an oxide capable of intercalating and deintercalating lithium, and examples thereof include an oxide of a metal element (metal oxide), a composite oxide of a metal element or a composite oxide of a metal element and a metalloid element (collectively referred to as "metal composite oxide), and an oxide of a metalloid element (metalloid oxide). The oxides are more preferably amorphous oxides, and preferable examples thereof include chalcogenides which are reaction products between metal elements and elements in Group 16 of the periodic table). In the present invention, the metalloid element refers to an element having intermediate properties between those of a metal element and a non-metal element. Typically, the metalloid elements include six elements including boron, silicon, germanium, arsenic, antimony, and tellurium and further includes three elements including selenium, polonium, and astatine. In addition, "Amorphous" represents an oxide having a broad scattering band with a peak in a range of 20° to 40° in terms of 2θ in case of being measured by an X-ray diffraction method using CuKα rays, and the oxide may have a crystal diffraction line. The highest intensity in a crystal diffraction line observed in a range of 40° to 70° in terms of 2θ is preferably 100 times or less and more preferably 5 times or less relative to the intensity of a diffraction peak line in a broad scattering band observed in a range of 20° to 40° in terms of 2θ, and it is still more preferable that the oxide does not have a crystal diffraction line.

In a compound group consisting of the amorphous oxides and the chalcogenides, amorphous oxides of metalloid elements and chalcogenides are more preferable, and (composite) oxides consisting of one element or a combination of two or more elements selected from elements (for example, Al, Ga, Si, Sn, Ge, Pb, Sb, and Bi) belonging to Groups 13 (IIIB) to 15 (VB) in the periodic table or chalcogenides are still more preferable. Specific examples of preferred amorphous oxides and chalcogenides include $Ga_2O_3$, GeO, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, GeS, PbS, $PbS_2$, $Sb_2S_3$, and $Sb_2S_5$.

Preferable examples of the negative electrode active material which can be used in combination with the amorphous oxide containing Sn, Si, or Ge as a major component include carbonaceous materials that can intercalate and/or deintercalate lithium ions or lithium metal; elemental lithium; lithium alloys; and an active material that can form an alloy with lithium.

It is preferable that the oxide of a metal or a metalloid element, in particular, the metal (composite) oxide and the chalcogenide include at least one of titanium or lithium as components from the viewpoint of high current density charging-discharging characteristics. Examples of the metal composite oxide (lithium composite metal oxide) including lithium include a composite oxide consisting of lithium oxide and the metal (composite) oxide or the chalcogenide, specifically, $Li_2SnO_2$.

As the negative electrode active material, for example, a metal oxide (titanium oxide) having a titanium atom is also preferable. Specifically, $Li_4Ti_5O_{12}$ (lithium titanium oxide [LTO]) is preferable since the volume fluctuation during the intercalation and deintercalation of lithium ions is small, and thus the high-speed charging-discharging characteristics are excellent, and the deterioration of electrodes is suppressed, whereby it becomes possible to improve the service lives of lithium ion secondary batteries.

The lithium alloy as the negative electrode active material is not particularly limited as long as it is typically used as a negative electrode active material for a secondary battery, and examples thereof include a lithium aluminum alloy.

The active material capable of forming an alloy with lithium is not particularly limited as long as it is typically used as a negative electrode active material for a secondary battery. Examples of the active material include a (negative electrode) active material (for example, an alloy) having silicon element or tin element and a metal such as Al or In. A silicon-based negative electrode active material (silicon-containing active material) including, as a constituent element, a silicon element capable of exhibiting high battery capacity is preferable, and a silicon-containing active material including 50 mol % or higher of silicon element with respect to all the constituent elements is more preferable.

In general, a negative electrode including the negative electrode active material (for example, a Si negative electrode including a silicon-containing active material or an Sn negative electrode including tin element) can intercalate a larger amount of Li ions than a carbon negative electrode (for example, graphite or acetylene black). That is, the amount of Li ions intercalated per unit mass increases. Therefore, it is possible to increase the battery capacity. As a result, there is an advantage that the battery driving duration can be extended.

Examples of the silicon-containing active material include a silicon-containing alloy (for example, $LaSi_2$, $VSi_2$, La—Si, Gd—Si, or Ni—Si) including a silicon material such as Si or SiOx (0<x≤1) and titanium, vanadium, chromium, manganese, nickel, copper, lanthanum, or the like or a structured active material thereof (for example, $LaSi_2$/Si), and an active material such as $SnSiO_3$ or $SnSiS_3$ including silicon element and tin element. SiOx itself can be used as the negative electrode active material (metalloid oxide). In addition, Si is produced along with the operation of an all-solid state secondary battery, and thus SiO can be used as a negative electrode active material (or a precursor thereof) capable of forming an alloy with lithium.

Examples of the negative electrode active material including tin element include Sn, SnO, $SnO_2$, SnS, $SnS_2$, and the above-described active material including silicon element and tin element. In addition, a composite oxide with lithium oxide, for example, $Li_2SnO_2$ can also be used.

In the present invention, the above-described negative electrode active material can be used without any particular limitation. From the viewpoint of battery capacity, as the negative electrode active material, a negative electrode active material capable of forming an alloy with lithium is preferable, the above-described silicon material or an silicon-containing alloy (an alloy including silicon element) is more preferable, and a negative electrode active material including silicon (Si) or an silicon-containing alloy is still more preferable.

The chemical formulae of the compounds obtained using a calcination method can be calculated using inductively coupled plasma (ICP) optical emission spectroscopy as a measurement method from the mass difference of powder before and after calcinating as a convenient method.

The shape of the negative electrode active material is not particularly limited, but is preferably a particle shape. The average particle size of the negative electrode active material is not particularly limited is preferably 0.1 to 60 µm. The average particle size of the negative electrode active material particles can be measured using the same method as that of the average particle size of the inorganic solid electrolyte. In order to allow the negative electrode active material to have a predetermined particle size, an ordinary pulverizer or classifier may be used as in the positive electrode active material.

The electrode composition (negative electrode composition) may include one negative electrode active material or two or more negative electrode active materials.

The content of the negative electrode active material in the electrode composition is not particularly limited and is preferably 10% to 90 mass %, more preferably 20% to 85 mass %, still more preferably 30% to 80 mass %, and still more preferably 40% to 75 mass % with respect to 100 mass % of the solid content. In a case where the electrode composition includes the inorganic solid electrolyte, it is preferable that the total content of the negative electrode active material and the inorganic solid electrolyte is set to the content of the inorganic solid electrolyte in the solid electrolyte composition.

—Coating of Active Material—

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an actinic ray or an active gas (plasma or the like) before or after the coating of the surfaces.

—Conductive Auxiliary Agent—

It is preferable that the electrode composition includes a conductive auxiliary agent used for improving, for example, the electron conductivity of the active material. As the conductive auxiliary agent, a general conductive auxiliary agent can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, among these, one kind may be included, or two or more kinds may be included. The shape of the conductive auxiliary agent is not particularly limited, but is preferably a particle shape.

In a case where the electrode composition includes the conductive auxiliary agent, the content of the conductive auxiliary agent in the electrode composition is preferably 0% to 10 mass % with respect to 100 mass % of the solid content.

In the present invention, in a case where the active material and the conductive auxiliary agent are used in combination, among the above-described conductive auxiliary agents, a conductive auxiliary agent that does not intercalate and deintercalate ions (preferably Li ions) of a metal belonging to Group 1 or Group 2 in the periodic table and does not function as an active material during charging and discharging of the battery is classified as the conductive auxiliary agent. Therefore, among the conductive auxiliary agents, a conductive auxiliary agent that can function as the active material in the active material layer during charging and discharging of the battery is classified as an active material not as a conductive auxiliary agent. Whether or not the conductive auxiliary agent functions as the active material during charging and discharging of the battery is not uniquely determined but is determined based on a combination of the conductive auxiliary agent with the active material.

Components in the electrode composition other than the active material and the conductive auxiliary agent are the same as the components in the solid electrolyte composition, and the contents thereof are the same as described above.

The electrode composition can be prepared with the same method as that of the solid electrolyte composition using the active material, preferably at least one of the inorganic solid electrolyte, the conductive auxiliary agent, or the binder, the dispersion medium, and optionally other components. In a case where the electrode composition is applied, the mass (mg) of the active material per unit area ($cm^2$) of the active material layer (weight per unit area) is not particularly limited. The mass (mg) of the inorganic solid electrolyte can be appropriately determined depending on the designed battery capacity and may be, for example, 1 to 100 mg/$cm^2$.

Through the above-described active material layer forming step, the active material sheet including the active material layer formed on the substrate can be prepared.

<Pre-Compression Bonding Step>

In the manufacturing method according to the embodiment of the present invention, the pre-compression bonding step is performed. That is, the solid electrolyte layer and any one of the positive electrode active material layer or the negative electrode active material layer are laminated to form a laminate, and the laminate is compressed and bonded, the solid electrolyte layer being formed on a support. In a case where the solid electrolyte sheet and the active material sheet are used in the step, in a state where the solid electrolyte layer (the applied and dried layer of the solid electrolyte composition) of the solid electrolyte sheet and the active material layer (the applied and dried layer of the electrode composition) of the active material sheet are in contact with each other, the solid electrolyte sheet and the active material sheet are laminated and are compressed and bonded.

In the manufacturing method according to the embodiment of the present invention, it is preferable that the pre-compression bonding step is performed using the active material sheet (negative electrode active material sheet) including the negative electrode active material layer. That is, in a preferable manufacturing method, as shown in FIG.

Figure 3:
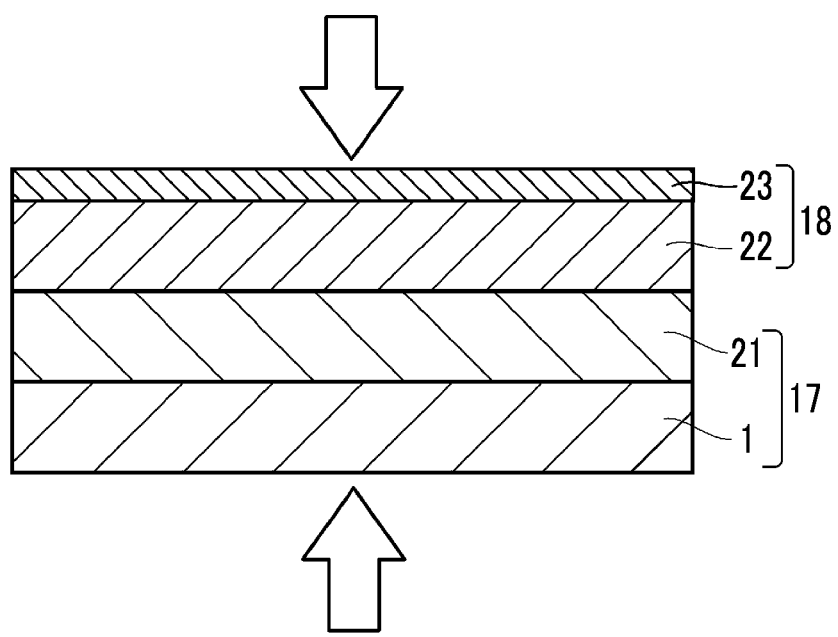
FIG. 3 is a schematic cross-sectional view showing a state where a negative electrode active material layer of a negative electrode active material sheet and a solid electrolyte layer of a solid electrolyte sheet are brought into contact with each other and are laminated in a pre-compression bonding step of a preferred method of manufacturing an all-solid state secondary battery according to the present invention.

3, in a state where a solid electrolyte layer 22 of a solid electrolyte sheet 18 including the solid electrolyte layer 22 formed on a support 23 and a negative electrode active material layer 21 of a negative electrode active material sheet 17 including the negative electrode active material layer 21 formed on a negative electrode current collector 1 are in contact with each other, the solid electrolyte sheet 18 and the negative electrode active material sheet 17 are laminated and are compressed and bonded in a direction indicated by an arrow in FIG. 3.

Examples of a compression bonding method include the same method as the compression method in the solid electrolyte layer forming step. A compression direction is a direction (the thickness direction of the solid electrolyte layer) in which both the layers are laminated, and a compression force is not particularly limited as long as the solid electrolyte layer and the active material layer are compressed (adhere). For example, the compression force can be set to be the same as that in the solid electrolyte layer forming step. As a compression bonding condition, the same condition as the compression bonding condition in the solid electrolyte layer forming step can be applied.

In the manufacturing method according to the embodiment of the present invention, one of the positive electrode active material layer or the negative electrode active material layer is formed with a large size (surface area), and the solid electrolyte layer is compressed and bonded to the electrode active material layer having a large size, which is preferable from the viewpoint of preventing short-circuit between the electrodes. In addition, it is preferable that the negative electrode active material layer is prepared with a larger size from the viewpoint of preventing overcharging at end portions of the active material layers.

In the pre-compression bonding step, the solid electrolyte layer and one active material layer are compressed (adhere) to obtain a laminate including the support/the solid electrolyte layer/and the one active material layer, preferably a sheet laminate including the solid electrolyte sheet and the active material sheet. It is preferable that the solid electrolyte layer and the active material layer in the sheet laminate are strongly compressed to each other with the compression force to the degree that the solid electrolyte layer and the active material layer do not peel off from each other in the peeling step described below and cracking, fracturing, or the like does not occur in the two layers.

There is no change except that the respective layers in the respective laminate are compressed in the pre-compression bonding step. The thickness of each of the layers can be set to be thin depending on the compression force.

<Peeling Step>

In the manufacturing method according to the embodiment of the present invention, for the sheet laminate prepared in the pre-compression bonding step, a step of peeling the support from the solid electrolyte layer compressed and bonded to the active material layers is performed.

During the peeling of the support, the solid electrolyte layer includes the binder and the inorganic solid electrolyte, and the binding state of the laminates have the above-described relationship. Therefore, a part of the solid electrolyte layer remains in the support (the solid electrolyte layer is not transferred to the active material layer in a state where it adheres thereto. That is, in the solid electrolyte layer formed on the support, the above-described binding portion remains in the support, and the above-described non-binding portion is transferred to the active material layer without remaining in the support. In a preferable manufacturing method according to the embodiment of the present invention, as shown in FIG. 4, the support 23 peels off in a state where a part of the solid electrolyte layer 22 remains in the support 23 (not shown). This way, the solid electrolyte layer 22 from which a part is missing (without being transferred) is transferred to the negative electrode active material layer 21, and a solid electrolyte layer 22a and the negative electrode active material layer 21 are strongly compressed.

In the present invention, 1% to 10 mass % of the solid electrolyte layer with respect to the total mass remains in the support. As a result, a recess portion where the solid electrolyte composition is missing is formed in the solid electrolyte layer from which the support is peeled off, and the surface is uneven without being flat.

From the viewpoint of further increasing the compression force with which the active material layer is compressed and bonded to the surface of the solid electrolyte layer in the post-compression bonding step described below, the residual amount of the solid electrolyte layer in the support is preferably 1.5 mass % or higher, more preferably 2 mass % or higher, and still more preferably 3 mass % or higher. On the other hand, from the viewpoint of inhibiting the formation of a deep recess portion and a pinhole in the thickness direction to effectively suppress the occurrence of short-circuit in the all-solid state secondary battery, the residual amount of the solid electrolyte layer in the support is preferably 8 mass % or lower, more preferably 7 mass % or lower, and still more preferably 5 mass % or lower.

This residual amount is not uniquely determined but can be set to be in the above-described range depending on the kind, content, or average particle size of the binder, the average particle size of the inorganic solid electrolyte, the compression force and compression temperature in the pre-compression bonding step, the active material layer (for example, the kind or average particle size of the active material or the kind or average particle size of the conductive auxiliary agent), the material of the support, the peeling method, and the like. A condition for adjusting the residual amount is not particularly limited. For example, in a case where the proportion of an adsorbing group adsorbed to the inorganic solid electrolyte including the polymer forming the binder increases, the residual amount tends to increase. In addition, in a case where the content of the binder increases, the residual amount tends to increase. Further, in a case where the average particle size of the particle binder increases, the residual amount tends to decrease. In a case where the average particle size of the inorganic solid electrolyte is large, the residual amount tends to increase. In a case where the compression force increases, the residual amount tends to decrease. The thickness of the solid electrolyte layer and the kind of one active material layer (the negative electrode active material layer or the positive electrode active material layer) has a small effect on the residual amount.

In particular, in a case where the content of the binder in the solid electrolyte layer is set to 2% to 5 mass % and the compression force is set to 1 to 100 MPa (preferably 5 to 100 MPa and the upper limit is more preferably 80 MPa or lower) as conditions in the pre-compression bonding step, the residual amount can be set to the above-described range. As more preferable conditions, the compression force in the pre-compression bonding step is set to 50 to 100 MPa, and the content of the binder in the solid electrolyte layer is set to higher than 3% and lower than 5 mass %.

In the peeling step, a method of peeling the support is not particularly limited, and the support may be peeled off at one stroke. Typically, the support is peeled off in a direction from one edge to another edge of the support. In this case, a rate and an angle at which the support is peeled from the solid electrolyte layer are not particularly limited. In a case where the peeling rate is 500 to 2000 mm/min, the solid electrolyte layer is likely to remain at a predetermined residual rate.

This way, the solid electrolyte layer having unevenness on the surface can be transferred to the active material sheet (one active material layer), and the above-described electrode sheet for an all-solid state secondary battery can be prepared. In a preferable manufacturing method according to the embodiment of the present invention, the electrode sheet 15 for an all-solid state secondary battery is prepared as the laminated sheet including the negative electrode sheet 17 and the solid electrolyte layer 22*a* having unevenness on the surface is prepared as shown in FIG. 4.

In the manufacturing method according to the embodiment of the present invention, in the compression step and the peeling step, the unevenness can be formed on the surface of the solid electrolyte layer. Therefore, even in a case where a step of forming unevenness on the solid electrolyte layer is not performed, the active material layer can be directly compressed in the post-compression bonding step described below, and high productivity is exhibited. The unevenness shape formed in the peeling step is not particularly limited.

<Another Active Material Layer Forming Step>

In the method of manufacturing an all-solid state secondary battery according to the embodiment of the present invention, the post-compression bonding step is performed. It is preferable that another active material layer forming step is performed before the post-compression bonding step. This film forming step may be performed before or after another step as long as it is performed before the post-compression bonding step. For example, the film forming step can be performed before the post-compression bonding step and before, during, or after the pre-compression bonding step and the peeling step.

In this film forming step, the active material layer is formed on the substrate (current collector) using the electrode composition including another one of the positive electrode active material or the negative electrode active material before the post-compression bonding step. As a result, the active material sheet is prepared. The active material sheet that is formed in this film forming step is determined depending on the active material sheet that is formed in the one active material layer forming step performed before the pre-compression bonding step. That is, in a case where the negative electrode active material sheet is prepared in the film forming step performed before the pre-compression bonding step, the positive electrode active material sheet is prepared in this film forming step.

The electrode composition used in this film forming step and a preparation method thereof are the same as the electrode composition used in the film forming step performed before the pre-compression bonding step and the preparation method thereof.

<Post-Compression Bonding Step>

In the method of manufacturing an all-solid state secondary battery according to the embodiment of the present invention, the post-compression bonding step is performed. That is, in the electrode sheet for an all-solid state secondary battery obtained in the peeling step, the solid electrolyte layer from which the support is peeled off and another one of the positive electrode active material layer or the negative electrode active material layer are laminated to faun a laminate, and the laminate is compressed to bond the layers. In a case where the active material sheet is used as the other active material layer in this step, in a state where the solid electrolyte layer of the electrode sheet for an all-solid state secondary battery and the active material layer (the applied and dried layer of the electrode composition) of the active material sheet are in contact with each other, the two sheets are laminated and are compressed and bonded.

Figure 5:
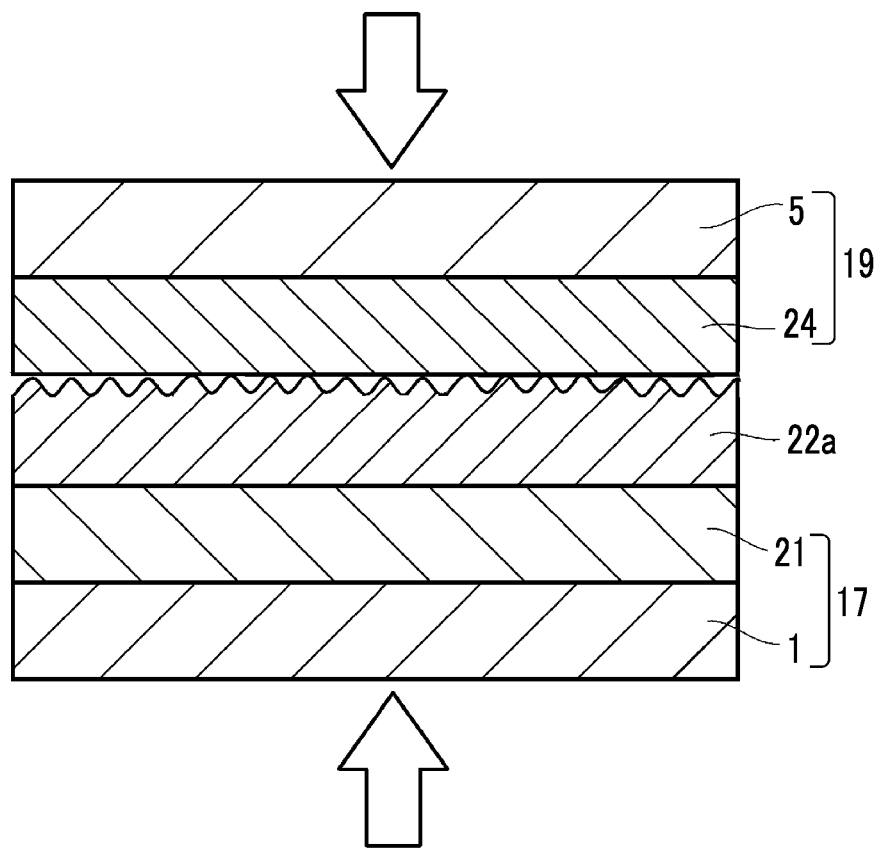
FIG. 5 is a schematic cross-sectional view showing a state where the solid electrolyte layer and a positive electrode active material layer of a positive electrode active material sheet are brought into contact with each other and are laminated in a post-compression bonding step of the preferred method of manufacturing an all-solid state secondary battery according to the present invention.

In the manufacturing method according to the embodiment of the present invention, it is preferable that the post-compression bonding step is performed using the active material sheet (positive electrode active material sheet) including the positive electrode active material layer. That is, in a preferable manufacturing method, as shown in FIG. 5, in a state where the solid electrolyte layer 22*a* and the positive electrode active material layer 24 of the positive electrode active material sheet 19 including the positive electrode active material layer 24 formed on the positive electrode current collector 5 are in contact with each other, the sheets are laminated and are compressed and bonded in a direction indicated by an arrow in FIG. 5.

The post-compression bonding step may be performed separately from the final compression step described below or may also function as the final compression step.

In a case where the post-compression bonding step is performed separately from the final compression step, examples of a compression bonding method include the same method as the compression method in the solid electrolyte layer forming step. A compression direction is a direction in which both the layers are laminated, and a compression force is not particularly limited as long as the solid electrolyte layer and the active material layer are compressed (adhere). For example, the compression force can be set to be the same as that in the solid electrolyte layer forming step. As a compression bonding condition, the same condition as the compression bonding condition in the solid electrolyte layer forming step can be applied.

On the other hand, in a case where the post-compression bonding step also functions as the final compression step, the compression bonding can be performed using the same method as that of the post-compression bonding step that is performed separately from the final compression step. In this case, it is preferable that the compression force is set to be the same as that in the final compression step described below.

This way, in a case where the solid electrolyte layer and the other active material layer are compressed and bonded in the post-compression bonding step, the other active material layer is deformed along the unevenness shape of the surface of the solid electrolyte layer, and the solid electrolyte layer and the other active material layer are compressed with a strong interlaminar adhesive strength. The detailed reason for this is not still clear but is presumed to be that, since the solid electrolyte layer has unevenness on the surface, the contact area with the other active material layer increases, both the layers are mixed at a contact interface, and a sufficient anchor effect is exhibited.

In the post-compression bonding step, the solid electrolyte layer and the other active material layer are compressed (adhere), and the laminate including the electrode sheet for an all-solid state secondary battery and the active material sheet, that is, the laminate for an all-solid state secondary battery having the layer configuration shown in FIG. 1 is obtained. In the laminate for an all-solid state secondary battery, the solid electrolyte layer of the electrode sheet for an all-solid state secondary battery and the active material layer of the active material sheet are compressed with a strong compression force.

There is no difference except that the respective layers are compressed in the post-compression bonding step. In this case, the unevenness of the solid electrolyte layer may be deformed, or the thickness of each of the layers may be reduced due to the compression force.

<Final Compression Step>

In the method of manufacturing an all-solid state secondary battery according to the embodiment of the present invention, the laminate for an all-solid state secondary battery obtained by performing the post-compression bonding step (the laminate including at least the positive electrode active material layer, the solid electrolyte layer, and the negative electrode active material layer) may be used as a battery but is preferably compressed at a compression force of 50 to 1500 MPa in the final compression step. In a case where the compression force in the final compression step is set to be higher than that in the post-compression bonding step, the interlaminar adhesion between the solid electrolyte layer and the other active material layer can be further improved.

The compression method and condition in this step are the same as those in the method of forming the film using the solid electrolyte composition. However, it is preferable that the compression force is set to a range of 100 to 1000 MPa. In addition, the compression is typically performed in an environment where heating is not performed (for example, at a temperature at which the all-solid state secondary battery is stored or used). The final compression may be performed for a short time (for example, within several hours) at a high pressure or for a long time (one day or longer) at an intermediate pressure. In this step, a restraining device (for example, a screw fastening pressure) can also be used in order to continuously apply an intermediate pressure to the laminate for an all-solid state secondary battery. In addition, the final compression can also be performed in a state where the laminate for an all-solid state secondary battery is sealed in a case. Further, in a state where the final compression is performed, the laminate for an all-solid state secondary battery can also be used as an all-solid state secondary battery (normal final compression state).

<Initialization Step>

In the method of manufacturing an all-solid state secondary battery according to the embodiment of the present invention, the obtained all-solid state secondary battery can be initialized after manufacturing or before use. As an initialization method, a well-known method can be appropriately used without any particular limitation. Examples of the initialization method include a method including: initially charging and discharging the all-solid state secondary battery in a state where the compression force is increased (under the final compression); and subsequently releasing the pressure until the all-solid state secondary battery reaches a pressure at which the all-solid state secondary battery is generally used.

As described above, in the method of manufacturing an all-solid state secondary battery according to the embodiment of the present invention, through the above-described steps, the constituent layers of the all-solid state secondary battery can be compressed and bonded with strong interlaminar adhesion. Specifically, the positive electrode active material layer, the solid electrolyte layer, and the negative electrode active material layer can be compressed and bonded with strong interlaminar adhesion, and further, the active material and the current collector can also be compressed and bonded with strong interlaminar adhesion.

Therefore, in the obtained solid secondary battery, an increase in battery resistance caused by compression failure is suppressed, and high battery performance is exhibited. In addition, even in a case where the thickness of the solid electrolyte layer is small, strong interlaminar adhesion can be maintained, the electrical capacitance per unit volume can be increased, and the energy density can also be increased. Further, in the manufacturing method according to the embodiment of the present invention, the proportion of the solid electrolyte layer remaining in the support in the support peeling step is set to be the above-described specific value. Therefore, in the solid electrolyte layer that is transferred to the active material layer in the pre-compression bonding step, the formation of a deep recess portion and further the formation of a pinhole that is formed in the thickness direction can be suppressed. As a result in the all-solid state secondary battery, the occurrence of short-circuit can be suppressed while maintaining high battery performance.

This way, with the method of manufacturing an all-solid state secondary battery according to the embodiment of the present invention, an all-solid state secondary battery having high battery performance can be manufactured with high productivity (in a state where the number of steps and costs are reduced). Further, the all-solid state secondary battery in which the occurrence of short-circuit is suppressed while maintaining high battery performance with the proportion of the solid electrolyte layer remaining in the support can also be manufactured with not only high productivity but also high reproducibility (high yield).

In addition, the method of manufacturing an electrode sheet for an all-solid state secondary battery according to the embodiment of the present invention is included in the method of manufacturing an all-solid state secondary battery according to the embodiment of the present invention. The electrode sheet for an all-solid state secondary battery obtained by the method of manufacturing an electrode sheet for an all-solid state secondary battery is suitable as an intermediate product used in the method of manufacturing an all-solid state secondary battery according to the embodiment of the present invention.

[Usages of All-Solid State Secondary Battery]

The all-solid state secondary battery according to the embodiment of the present invention manufactured with the manufacturing method according to the embodiment of the present invention can be applied to a variety of usages. Application aspects are not particularly limited, and, in the case of being mounted in electronic apparatuses, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, and backup power supplies. In addition, examples of an electronic apparatus for consumer use include an automobile, an electromotive vehicle, a motor, a lighting device, a toy, a game device, a load conditioner, a timepiece, a strobe, a camera, a medical device (for example, a pacemaker, a hearing aid, or a shoulder massager). Further, the all-solid state secondary battery can be used as various cells for use in military or aerospace applications. In addition, the all-solid state secondary battery can also be combined with solar batteries.

EXAMPLES

Hereinafter, the present invention will be described in more detail based on Examples but is not limited to these examples. "Parts" and "%" that represent compositions in the following examples are mass-based unless particularly otherwise described. In the present invention, "room temperature" refers to 25° C.

Synthesis Example 1: Synthesis of Sulfide-Based Inorganic Solid Electrolyte

A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon gas atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, put into an agate mortar, and mixed using an agate muddler for five minutes. The mixing ratio between $Li_2S$ and $P_2S_5$ ($Li_2S:P_2S_5$) was set to 75:25 in terms of molar ratio.

66 g of zirconia beads having a diameter of 5 mm were put into a 45 mL zirconia container (manufactured by Fritsch Japan Co., Ltd.), the full amount of the mixture of the lithium sulfide and the diphosphorus pentasulfide was put thereinto, and the container was completely sealed in an argon gas atmosphere. The container was set in a planetary ball mill P-7 (trade name; manufactured by Fritsch Japan Co., Ltd.), mechanical milling was carried out at a temperature of 25° C. and a rotation speed of 510 rpm for 20 hours. As a result, 6.20 g of a yellow powder of a sulfide-based inorganic solid electrolyte (Li/P/S-based glass; hereinafter, referred to as LPS) was obtained. The average particle size was 8 μm.

By dispersing the obtained LPS through a wet process under the following conditions, the average particle size of the LPS was adjusted.

That is, 160 zirconia beads having a diameter of 5 mm were put into a 45 mL zirconia container (manufactured by Fritsch Japan Co., Ltd.), and 4.0 g of the synthesized LPS and 6.0 g of diisobutyl ketone as a dispersion medium were added thereto. Next, the container was set in a planetary ball mill P-7 to disperse the components through a wet process for 60 minutes under the following conditions. The LPS having an average particle size shown below was obtained.

Condition 1: rotation speed 200 rpm, average particle size 5 μm
Condition 2: rotation speed 250 rpm, average particle size 3 μm
Condition 3: rotation speed 290 rpm, average particle size 2 μm In order to measure the average particle size of the LPS, the dispersion medium (diisobutyl ketone) was added to the dispersion liquid obtained by the wet mixing process to prepare a dispersion liquid for measurement having a concentration of solid contents of 1 mass %. In the dispersion liquid for measurement, the average particle size of the LPS was measured using a laser diffraction/scattering particle size distribution analyzer LA-920 (trade name, manufactured by Horiba Ltd.).

Synthesis Example 2: Synthesis of Polymer A Forming Binder (Preparation of Particle Binder A Dispersion Liquid)

200 g of heptane was added to a 1 L three-neck flask equipped with a reflux cooling pipe and a gas introduction coke, nitrogen gas was introduced at a flow rate of 200 mL/min for 10 minutes, and the solution was heated to 80° C. A liquid (a solution in which 140 g of ethyl acrylate (manufactured by Wako Pure Chemical Industries, Ltd.), 20 g of acrylic acid (manufactured by Wako Pure Chemical Industries, Ltd.), 40 g (solid content) of a macromonomer AB-6 (manufactured by Toagosei Co., Ltd.), and 2.0 g of a polymerization initiator V-601 (trade name, manufactured by Wako Pure Chemical Industries, Ltd.) were mixed with each other) prepared in a separate container was added dropwise to the solution for 2 hours and was stirred at 80° C. for 2 hours. Next, 1.0 g of V-601 was further added to the obtained mixture, and the solution was stirred at 90° C. for 2 hours. By diluting the obtained solution with heptane, a dispersion liquid of a particle binder A (average particle size: 150 nm) consisting of an acrylic polymer (mass average molecular weight: 75000, Tg: −5° C.) was obtained.

The macromonomer AB-6 is polybutyl acrylate (number-average molecular weight: 6000, SP value: 9.1) in which a terminal functional group is a methacryloyl group.

Synthesis Example 3: Synthesis of Polymer B Forming Binder (Preparation of Particle Binder B Dispersion Liquid)

In order to synthesize polyurethane, first, terminated diol-modified dodecyl polymethacrylate was synthesized.

Specifically, 20 mL of methyl ethyl ketone was added to a 500 mL three-neck flask and was heated at 75° C. in a nitrogen stream. On the other hand, 70 g of dodecyl methacrylate (manufactured by Wako Pure Chemical Industries, Ltd.) and 110 g of methyl ethyl ketone were added to a 500 mL measuring cylinder and were stirred for 10 minutes. 2.9 g of thioglycerol (manufactured by Wako Pure Chemical Industries, Ltd.) as a chain transfer agent and 3.2 g of a radical polymerization initiator V-601 (trade name, manufactured by Wako Pure Chemical Industries, Ltd.) were added to the measuring cylinder, and the solution was further stirred for 10 minutes. The obtained monomer solution was added dropwise to the 500 mL three-neck flask for 2 hours, and radical polymerization was caused to start. Further, after completion of the dropwise addition, heating and stirring were continued at 75° C. for 6 hours. The obtained polymer solution was concentrated under reduced pressure, methyl ethyl ketone was removed by distillation, and the obtained solid matter was dissolved in heptane. As a result, 292 g of a 25 mass % heptane solution of terminated diol-modified dodecyl polymethacrylate was obtained. The mass average molecular weight of the obtained polymer was 3200.

Next, polyurea colloidal particles MM-1 were synthesized.

Specifically, 260 g of the 25 mass % heptane solution of the terminated diol-modified dodecyl polymethacrylate was added to a 1 L three-neck flask and was diluted with 110 g of heptane. 11.1 g of isophorone diisocyanate (manufactured by Wako Pure Chemical Industries, Ltd.) and 0.1 g of NEOSTANN U-600 (trade name, manufactured by Nitto Kasei Co., Ltd.) were added to the solution, and the obtained solution was heated and stirred at 75° C. for 5 hours. Next, a dilute solution obtained by diluting 0.4 g of isophorone diamine (amine compound) with 125 g of heptane was added dropwise for 1 hour. 10 minutes after the start of the dropwise addition, the polymer solution having a transparent color was changed into a solution having a light yellow fluorescent color. The formation of urea colloid was verified from the change. The reaction solution was cooled to a room temperature, and 506 g of 15 mass % heptane solution of polyurea colloidal particles MM-1 was obtained.

The mass average molecular weight of polyurea in the polyurea colloidal particles MM-3 was 9,600.

Next, polyurethane was synthesized using the polyurea colloidal particle MM-3.

Specifically, 3.2 g of m-phenylene diisocyanate (manufactured by Tokyo Chemical Industry Co., Ltd.) and 8.0 g of polyethylene glycol (mass average molecular weight: 400, manufactured by Aldrich) were added to a 50 mL sample bottle. 60.0 g of the 15 mass % heptane solution of polyurea colloidal particles MM-1 was added to the sample bottle and was dispersed using a homogenizer for 30 minutes while heating the sample bottle at 50° C. During that time, the mixed solution was atomized to form a light orange slurry. The obtained slurry was put into a 200 mL three-neck flask heated to a temperature 80° C. in advance, 0.1 g of NEOSTANN U-600 (trade name, manufactured by Nitto Kasei Co., Ltd.) was added thereto, the obtained solution was heated and stirred at a temperature of 80° C. and a rotation speed of 400 rpm for 3 hours. The slurry was in the form of a white emulsion. It was estimated from the result that a particle binder consisting of polyurethane was formed. By cooling the white emulsion slurry, a dispersion liquid of a particle binder B (average particle size: 100 nm) consisting of polyurethane (not including the hydrocarbon polymer segment, mass average molecular weight: 16000, Tg: −3° C.) was prepared.

Synthesis Example 4: Synthesis of Polymer C Forming Binder (Preparation of Particle Binder C Dispersion Liquid)

First, a macromonomer solution was prepared. That is, toluene (269.0 g) was charged into a 1 L three-neck flask equipped with a stirrer, a thermometer, a reflux cooling pipe, and a nitrogen gas introduction pipe and was heated to 80° C. in a nitrogen stream. Next, a monomer solution consisting of methyl methacrylate (150.2 g), lauryl methacrylate (381.6 g), V-601 (5.3 g, an azo polymerization initiator, manufactured by Wako Pure Chemical Industries, Ltd.), and 3-mercaptopropionic acid (4.7 g) was added dropwise to the three-neck flask at a constant speed until the dropwise addition was completed after 2 hours. After completion of the dropwise addition of the monomer solution, the solution was stirred for 2 hours, was heated to 95° C., and was further stirred for 2 hours. Next, p-methoxyphenol (0.3 g), glycidyl methacrylate (31.8 g), and tetrabutylammonium bromide (6.4 g) were added to the obtained reaction mixture, and the solution was heated to 120° C. and was stirred for 3 hours. Next, the reaction solution was cooled to room temperature, was poured into methanol (2 L) under stirring, and was left to stand for a while. A solid obtained by decantation of the supernatant liquid was dissolved in heptane (1200 g), and the solvent was removed by distillation under reduced pressure until the solid content reached 40%. As a result, a macromonomer solution was obtained.

The number-average molecular weight of the macromonomer measured using the above-described measurement method was 10000, and the SP value was 18.

Next, a macromonomer adduct solution was prepared. That is, the obtained macromonomer solution (287 g, solid content: 40%), dipentaerythritol hexakis(3-mercaptopropionate) (5.0 g), and toluene (305.0 g) were charged into a 1 L three-neck flask equipped with a stirrer, a thermometer, a reflux cooling pipe, and a nitrogen gas introduction pipe and were heated to 80° C. in a nitrogen stream. Next, V-601 (0.1 g) was added to the three-neck flask, and the solution was stirred for 2 hours. As a result, a macromonomer adduct solution was obtained (solid content: 20.0%).

The obtained macromonomer adduct was an adduct (m=2) obtained by a reaction of the macromonomer with two mercapto groups on average in dipentaerythritol hexakis (3-mercaptopropionate).

Using the macromonomer adduct solution obtained as described above, a dispersion liquid of the particle binder C was prepared. That is, diisobutyl ketone (54.5 g) and the macromonomer adduct solution (225.0 g, solid content: 20.0%) were charged into a 1 L three-neck flask equipped with a stirrer, a thermometer, a reflux cooling pipe, and a nitrogen gas introduction pipe, and the solution was heated to 80° C. in a nitrogen stream. Next, a monomer solution consisting of hydroxyethyl acrylate (105.0 g) having a SP value of 23.5, diisobutyl ketone (115.5 g), and V-601 (1.5 g) was added dropwise to the three-neck flask at a constant speed until the dropwise addition was completed after 2 hours. After completion of the dropwise addition of the monomer solution, the solution was stirred for 2 hours, was heated to 90° C., and was further stirred for 2 hours. The obtained reaction mixture was filtered through a mesh having a pore size of 50 μm. This way, a dispersion liquid of a particle binder C (average particle size: 130 nm) consisting of polymer having a concentration of solid contents of 30 mass % represented by the following formula (mass average molecular weight: 400000, Tg: −20° C.) was prepared.

In the polymer represented by the following formula, a numerical value added to the lower right of a component represents a mass ratio.

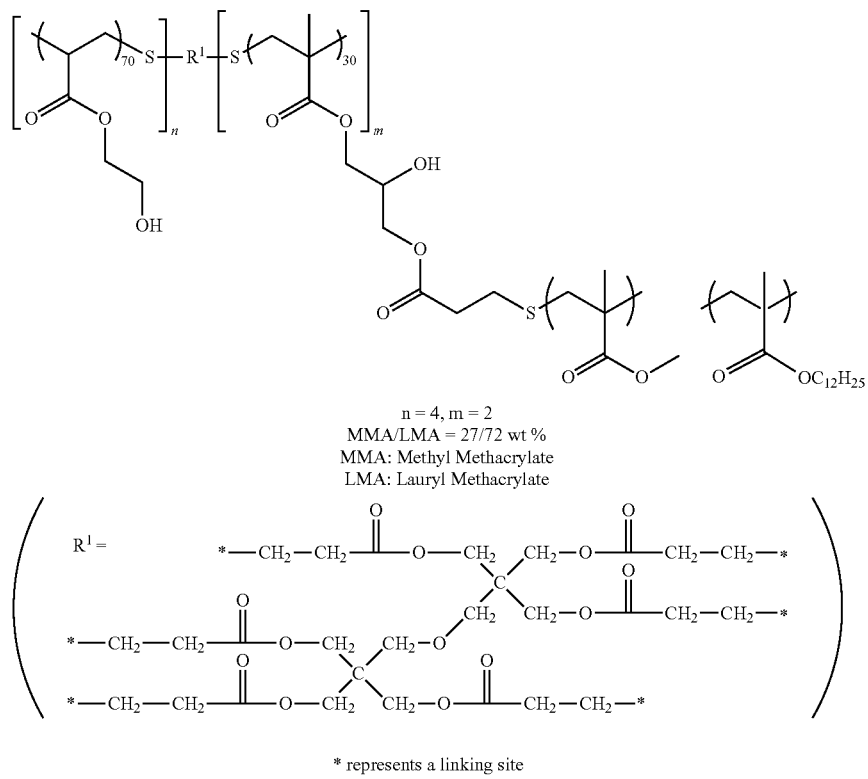

n = 4, m = 2
MMA/LMA = 27/72 wt %
MMA: Methyl Methacrylate
LMA: Lauryl Methacrylate \* represents a linking site Preparation Example 1: Preparation of DIBK Solution of Binder D By stirring poly(styrene-co-butadiene) (article number: 430072, manufactured by Sigma-Aldrich Corporation) in a diisobutyl ketone (DIBK) solvent heated to 90° C., a DIBK solution of a binder D (dissolution type) having a concentration of solid contents of 30 mass % was prepared.

EXAMPLES

Using the following manufacturing method, an electrode sheet for an all-solid state secondary battery and an all-solid state secondary battery were manufactured, and the battery performance (battery resistance) and the manufacturing yield (short-circuit occurrence rate) were evaluated. The results are shown in Table 1.

<Manufacturing of all-Solid State Secondary Battery No. 1>

During the manufacturing of an all-solid state secondary battery No. 1, a solid electrolyte layer was transferred to a negative electrode active material layer (in Table 1, shown as "Transferred Active Material Layer") using a particle binder, and then a positive electrode active material layer was compressed thereto. As a result, the all-solid state secondary battery No. 1 was manufactured.

(One Active Material Layer (Negative Electrode Active Material Layer) Forming Step Performed Before Pre-Compression Bonding Step)

CGB 20 (trade name, graphite, average particle size: 20 μm, manufactured by Nippon Kokuen Group) as a negative electrode active material, the LPS having an average particle size adjusted to 2 μm in Synthesis Example 1, and the binder B were mixed with each other at a mass ratio of 60:37:3, the mixture was added to a planetary mixer (TK HIVIS (trade name), manufactured by PRIMIX Corporation), diisobutyl ketone as a dispersant solvent was added to adjust the concentration of solid contents to 50 mass %, and the solution was stirred at 50 rpm for 2 hours. As a result, a negative electrode composition (slurry) was prepared.

The obtained negative electrode composition was applied to a carbon-coated aluminum foil (negative electrode current collector) having a thickness of 20 μm using a Baker Type applicator (trade name: SA-201, manufactured by Tester Sangyo Co., Ltd.), and was heated and dried at 100° C. for 1 hour. As a result, a negative electrode active material sheet No. 1 including a negative electrode active material layer (applied and dried layer) having a thickness of 150 μm was prepared.

(Solid Electrolyte Layer Forming Step)

The LPS having an average particle size adjusted to a value shown in Table 1 in Synthesis Example 1 and the particle binder A dispersion liquid were mixed with each other such that the contents thereof were as shown in Table 1 (the content of the binder polymer A with respect to 100 mass % of the solid content), the mixture was added to a planetary mixer (TK HIVIS (trade name)), diisobutyl ketone as a dispersant solvent was added to adjust the concentration of solid contents to 50 mass %, and the solution was stirred at 50 rpm for 1 hours. As a result, a solid electrolyte composition (slurry) was prepared.

The obtained solid electrolyte composition was applied to an aluminum foil (support) having a thickness of 20 μm using a Baker Type applicator (trade name: SA-201), and was heated and dried at 100° C. for 1 hour. As a result, a solid electrolyte sheet No. 1 including a solid electrolyte layer (applied and dried layer) having a thickness shown in Table 1 was prepared.

(Another Active Material Layer (Positive Electrode Active Material Layer) Forming Step Performed Before Post-Compression Bonding Step)

Lithium nickel manganese cobalt oxide (average particle size: 0.5 µm, manufactured by Sigma-Aldrich Corporation) as a positive electrode active material, the LPS having an average particle size adjusted to 2 µm in Synthesis Example 1, Acetylene Black (average particle size: 50 nm, manufactured by Denka Co., Ltd.) as a conductive auxiliary agent, and the binder A were mixed with each other at a mass ratio of 70:27:1:2, the mixture was added to a planetary mixer (TK HIVIS (trade name)), diisobutyl ketone as a dispersant solvent was added to adjust the concentration of solid contents to 45 mass %, and the solution was stirred at 50 rpm for 1 hours. As a result, a positive electrode composition (slurry) was prepared.

The obtained positive electrode composition was applied to a carbon-coated aluminum foil (positive electrode current collector) having a thickness of 20 µm using a Baker Type applicator (trade name: SA-201), and was heated and dried at 100° C. for 1 hour. As a result, a positive electrode active material sheet No. 1 including a positive electrode active material layer (applied and dried layer) having a thickness of 100 µm was prepared.

(Pre-Compression Bonding Step)

In the pre-compression bonding step, the solid electrolyte sheet No. 1 was used as the solid electrolyte layer formed on the support, and the negative electrode active material sheet No. 1 was used as one of the positive electrode active material layer or the negative electrode active material layer.

Specifically, the solid electrolyte layer of the solid electrolyte sheet No. 1 and the negative electrode active material layer of the negative electrode active material sheet No. 1 were brought into directly contact with each other and laminated. Using a press machine, this laminate was compressed to bond the layers in an argon gas atmosphere at a temperature of 25° C. and a compression force of 50 MPa for 10 seconds. This way, a sheet laminate No. 1 consisting of the negative electrode current collector/the negative electrode active material layer/the solid electrolyte layer/the support was prepared.

(Peeling Step)

Next, the support of the prepared sheet laminate No. 1 was peeled off from the solid electrolyte. As a result, an electrode sheet for an all-solid state secondary battery No. 1 was prepared. The support was peeled off in a direction from one edge to another edge of the support at an angle of 70° with respect to the solid electrolyte layer and a peeling rate of 1000 mm/min.

This way, a part of the solid electrolyte layer remained in the peeled support, and unevenness was formed on the surface of the solid electrolyte layer from which the support was peeled off.

(Cutting Step)

The electrode sheet for an all-solid state secondary battery No. 1 was cut into a diameter of 15 mm. In addition, the prepared positive electrode active material sheet No. 1 was cut into a diameter of 14 mm.

(Post-Compression Bonding Step (Post-Compression Bonding Step that Also Functioned as Final Compression Step)

In the post-compression bonding step, the positive electrode active material sheet No. 1 was used as another one of the positive electrode active material layer or the negative electrode active material layer.

That is, in a 2032-type coin case, the cut electrode sheet for an all-solid state secondary battery No. 1 and the cut positive electrode active material sheet No. 1 were laminated in a state where the solid electrolyte layer of the electrode sheet for an all-solid state secondary battery No. 1 and the positive electrode active material layer of the positive electrode active material sheet No. 1 were in direct contact with each other. Using a press machine, this laminate was compressed to bond the layers in an argon gas atmosphere at a temperature of 25° C. and a compression force of 600 MPa for 30 seconds. This way, a laminate for an all-solid state secondary battery having a layer structure shown in FIG. 1 consisting of the negative electrode current collector/the negative electrode active material layer/the solid electrolyte layer/the positive electrode active material layer/the positive electrode current collector was prepared.

This way, the coin case 11 was swaged at the compression force. As a result, an all-solid state secondary battery (coin-type all-solid state secondary battery shown in FIG. 2) No. 1 was manufactured.

In the manufactured all-solid state secondary battery, the thicknesses of the positive electrode active material and the negative electrode active material were less than the thicknesses of the respective layers in the positive electrode sheet and the negative electrode sheet and were 60 µm and 100 µm, respectively. The thickness of the solid electrolyte layer was 45 µm.

<Manufacturing of All-Solid State Secondary Batteries No. 2 to 15, 17, 18, and c1 to c8>

All-solid state secondary batteries No. 2 to 15, 17, 18, and c1 to c8 were manufactured using the same manufacturing method as that of the all-solid state secondary battery No. 1, except that the kind (average particle size) of the LPS used for the preparation of the solid electrolyte composition, the kind and content (mixing amount) of the binder used for the preparation of the solid electrolyte composition, the thickness of the solid electrolyte layer, and the compression force in the pre-compression bonding step were changed as shown in Table 1.

The thickness of the solid electrolyte layer was 35 µm in the all-solid state secondary battery No. 9 and was 20 µm in the all-solid state secondary batteries No. 10 to 12.

<Manufacturing of all-Solid State Secondary Battery No. 19>

During the manufacturing of an all-solid state secondary battery No. 19, a solid electrolyte layer was transferred to a positive electrode active material layer (in Table 1, shown as "Transferred Active Material Layer") and then was compressed to a negative electrode active material layer. As a result, the all-solid state secondary battery No. 19 was manufactured.

That is, An all-solid state secondary battery No. 19 was manufactured using the same manufacturing method as that of the all-solid state secondary battery No. 1, except that the positive electrode active material sheet No. 1 was used in the pre-compression bonding step and the negative electrode active material sheet No. 1 was used in the post-compression bonding step.

<Manufacturing of all-Solid State Secondary Battery No. 16>

During the manufacturing of an all-solid state secondary battery No. 16, a solid electrolyte layer was transferred to a negative electrode active material layer using a solid electrolyte composition including the dissolution type binder D, and a positive electrode active material layer was compressed thereto. As a result, the all-solid state secondary battery No. 16 was manufactured.

That is, the all-solid state secondary battery No. 16 was manufactured using the same manufacturing method as that of the all-solid state secondary battery No. 1, except that the solid electrolyte layer forming step was changed to the following film forming step.

(Solid Electrolyte Layer Forming Step Using Dissolution Type Binder D)

The LPS having an average particle size adjusted to 3 μm in Synthesis Example 1 and the DIBK solution of the binder D were mixed with each other such that the contents thereof were as shown in Table 1 (the content of the binder polymer D with respect to 100 mass % of the solid content), the mixture was added to a planetary mixer (TK HIVIS (trade name)), diisobutyl ketone as a dispersant solvent was added to adjust the concentration of solid contents to 50 mass %, and the solution was stirred at 50 rpm for 1 hours. As a result, a solid electrolyte composition (slurry) D1 was prepared.

Further, LPS and diisobutyl ketone were added to the solid electrolyte composition D1 to adjust the concentration of solid contents to 50 mass %, and the solution was stirred at 50 rpm for 3 minutes. The LPS added to the solid electrolyte composition D1 was the same LPS (average particle size: 3 μm) as the LPS used for the preparation of the solid electrolyte composition D1, and the mixing amount thereof was the same as that of the LPS used for the preparation of the solid electrolyte composition D1 (that is, the amounts of the LPS used for the preparation of the solid electrolyte composition D1 and the additionally added LPS were 50 mass % with respect to the total amount of the LPS). In addition, the total amount of the binder D was mixed during the preparation of the solid electrolyte composition D1. This way, the solid electrolyte composition (slurry) D1 including the dissolution type binder D was prepared.

The obtained solid electrolyte composition D was applied to an aluminum foil (support) having a thickness of 20 μm using a Baker Type applicator (trade name: SA-201, manufactured by Tester Sangyo Co., Ltd.), and was heated and dried at 100° C. for 1 hour. As a result, a solid electrolyte sheet No. 16 including a solid electrolyte layer (applied and dried layer) having a thickness of 80 μm was prepared.

<Calculation of Residual Amount of Solid Electrolyte Layer>

The mass of the support peeled off from the solid electrolyte layer in the peeling step during the manufacturing of each of the all-solid state secondary batteries was measured. The mass of the support used in the solid electrolyte layer forming step was subtracted from the measured mass to calculate the mass W1 of the solid electrolyte layer remaining in the peeled support.

On the other hand, the mass W2 of the solid content of the solid electrolyte composition used in the solid electrolyte layer forming step (the sum of the mass of the solid electrolyte layer in the solid electrolyte sheet and the mass of the solid electrolyte layer remaining in the support) was obtained.

Using the obtained mass W1 and W2, the residual amount of the solid electrolyte layer was calculated from the expression (W1/W2)×100(%). The results are shown in Table 1.

In Table 1, "Not Able to be Compressed" represents that most (about 100 mass %) of the solid electrolyte layer remained in the support such that the solid electrolyte layer was not able to be compressed to the active material layer.

<Evaluation of Battery Performance (Battery Resistance)>

The battery resistance of each of the all-solid state secondary batteries was measured using a charging and discharging evaluation device "TOSCAT-3000" (trade name; manufactured by Toyo System Corporation). The all-solid state secondary battery was charged at a current value of 0.1 mA until the battery voltage reached 4.2 V, and then was discharged at a current value of 0.1 mA until the battery voltage reached 2.5 V. This charging and discharging operation was set as one cycle and was repeated three times. Further, the all-solid state secondary battery was charged at a current value of 0.1 mA until the battery voltage reached 4.2 V, and then was discharged at a current value of 2 mA until the battery voltage reached 2.5 V (fourth cycle).

After 10 seconds from the start of the discharge at a current value of 2 mA in the fourth cycle, the battery voltage was read based on the following standards. The resistance of the all-solid state secondary battery was evaluated based on one of the following evaluation ranks in which this battery voltage was included. As the battery voltage increases, the resistance decreases. In this test, an evaluation rank of "B" or higher was an acceptable level.

"-" in the column "Battery performance" of Table 1 represents that the battery performance of the corresponding all-solid state secondary battery was not able to be evaluated.

—Evaluation Rank of Resistance—

A: 4.1 V or higher

B: 4.0 V or higher and lower than 4.1 V

C: lower than 4.0 V

<Evaluation of Short-Circuit Rate (Manufacturing Reproducibility)>

10 specimens of each of the all-solid state secondary batteries were manufactured, and whether or not short-circuit occurred in each of the samples was checked using the following method. The short-circuit occurrence rate (the number of short-circuited specimens/10 samples) in the 10 samples of the all-solid state secondary batteries was calculated, and the manufacturing reproducibility (yield) was evaluated.

Method of checking whether or not short-circuit occurred: A potential difference between the positive electrode and the negative electrode was measured using a tester, terminals of the tester were connected to the positive electrode and the negative electrode, and when the potential difference after 30 seconds was ±100 mV or lower, it was determined that short-circuit occurred.

TABLE 1

| | No. | Binder Kind | Binder Shape | Solid Electrolyte Average Particle Content (mass %) | Solid Electrolyte Particle Size (μm) | Solid Electrolyte Layer Thickness (μm) | Transferred Active Material Layer | Compression Force in Pre-Compression Bonding Step | Residual Amount (mass %) | Battery Performance | Short-Circuit Rate |
|---|---|---|---|---|---|---|---|---|---|---|---|
| Example | 1 | A | Particle | 3 | 3 | 80 | Negative Electrode | 50 MPa | 2 | A | <10% |
| | 2 | A | Particle | 3.5 | 3 | 80 | Negative Electrode | 50 MPa | 4 | A | <10% |
| | 3 | A | Particle | 4 | 3 | 80 | Negative Electrode | 50 MPa | 8 | B | >10% |
| | 4 | A | Particle | 5 | 2 | 80 | Negative Electrode | 50 MPa | 5 | B | >10% |
| | 5 | A | Particle | 2 | 5 | 80 | Negative Electrode | 50 MPa | 1.5 | A | <10% |
| | 6 | A | Particle | 4 | 2 | 80 | Negative Electrode | 50 MPa | 2.5 | B | <10% |
| | 7 | A | Particle | 4 | 3 | 80 | Negative Electrode | 80 MPa | 3 | B | <10% |
| | 8 | A | Particle | 2.5 | 3 | 80 | Negative Electrode | 30 MPa | 2 | A | <10% |
| | 9 | A | Particle | 3 | 3 | 60 | Negative Electrode | 50 MPa | 2 | A | <10% |
| | 10 | A | Particle | 3 | 3 | 40 | Negative Electrode | 50 MPa | 2 | A | <10% |
| | 11 | A | Particle | 3.5 | 3 | 40 | Negative Electrode | 50 MPa | 4 | A | <10% |
| | 12 | A | Particle | 4 | 3 | 40 | Negative Electrode | 50 MPa | 8 | B | >10% |
| | 13 | B | Particle | 3 | 3 | 80 | Negative Electrode | 50 MPa | 1.5 | A | <10% |
| | 14 | B | Particle | 4 | 3 | 80 | Negative Electrode | 50 MPa | 2.5 | B | <10% |
| | 15 | B | Particle | 5 | 3 | 80 | Negative Electrode | 50 MPa | 7 | B | >10% |
| | 16 | D | Dissolution | 2 | 3 | 80 | Negative Electrode | 50 MPa | 2 | B | <10% |
| | 17 | C | Particle | 3 | 3 | 80 | Negative Electrode | 50 MPa | 2.5 | A | <10% |
| | 18 | C | Particle | 4 | 3 | 80 | Negative Electrode | 50 MPa | 5 | B | <10% |
| | 19 | A | Particle | 3 | 3 | 80 | Positive Electrode | 50 MPa | 2 | A | <10% |
| Comparative Example | c1 | A | Particle | 3 | 3 | 80 | Negative Electrode | 80 MPa | <1 | C | <10% |
| | c2 | A | Particle | 1 | 3 | 80 | Negative Electrode | 50 MPa | <1 | C | <10% |
| | c3 | A | Particle | 5 | 3 | 80 | Negative Electrode | 80 MPa | Not Able to be Compressed | — | — |
| | c4 | A | Particle | 2 | 2 | 80 | Negative Electrode | 50 MPa | <1 | C | <10% |
| | c5 | B | Particle | 2 | 3 | 80 | Negative Electrode | 50 MPa | <1 | C | <10% |
| | c6 | C | Particle | 1.5 | 3 | 80 | Negative Electrode | 50 MPa | <1 | C | <10% |
| | c7 | D | Dissolution | 2 | 3 | 80 | Negative Electrode | 50 MPa | <1 | C | <10% |
| | c8 | D | Dissolution | 3 | 3 | 80 | Negative Electrode | 50 MPa | Not Able to be Compressed | — | — |
| | c9 | A | Particle | 4.5 | 3 | 80 | Negative Electrode | 50 MPa | 11 | — | 100% |

The following can be seen from the results of Table 1.

That is, in the manufactured all-solid state secondary batteries No. c1, c2, c4 and c7 in which the residual amount of the solid electrolyte layer in the peeling step did not reach 1 mass %, another active material layer (positive electrode active material layer) was able to be compressed to the solid electrolyte layer in the post-compression bonding step. However, the interlaminar compression force was not sufficient, the battery voltage was low, and the battery performance was poor. On the other hand, in the all-solid state secondary batteries No. c3 and c8, most of the solid electrolyte layer remained in the support in the peeling step, and the solid electrolyte layer was not able to be compressed to the negative electrode active material layer. Further, in the manufactured all-solid state secondary battery No. c9 in which the residual amount of the solid electrolyte layer was 11 mass %, another active material layer (positive electrode active material layer) was able to be compressed to the solid electrolyte layer in the post-compression bonding step. However, the formation state of the solid electrolyte layer was so poor that the battery performance was not able to be evaluated, and the occurrence of short-circuit was not able to be suppressed.

On the other hand, when the proportion of the solid electrolyte layer remaining in the peeling step is 1% to 10 mass %, in the post-compression bonding step, unevenness can be formed on the surface of the solid electrolyte layer where the other active material layer is formed. In the all-solid state secondary batteries No. 1 to 19 manufactured using the method including this peeling step, the other active material layer (the positive electrode active material layer or the negative electrode active material layer) was strongly compressed to the solid electrolyte layer in the post-compression bonding step, and a high battery voltage was exhibited. This way, in the method of manufacturing an all-solid state secondary battery according to the embodiment of the present invention, the constituent layers can be compressed with strong interlaminar adhesion, and an all-solid state secondary battery having high battery performance can be manufactured with high productivity and high reproducibility.

The present invention has been described using the embodiments. However, unless specified otherwise, any of the details of the above description is not intended to limit the present invention and can be construed in a broad sense within a range not departing from the concept and scope of the present invention disclosed in the accompanying claims.

The present application claims priority based on JP2018-182797 filed on Sep. 27, 2018, the entire content of which is incorporated herein by reference.

EXPLANATION OF REFERENCES

1: negative electrode current collector
2: negative electrode active material layer
3: solid electrolyte layer
4: positive electrode active material layer
5: positive electrode current collector
6: operation portion
10: all-solid state secondary battery 11: coin case
12: laminate for all-solid state secondary battery
13: coin-type all-solid state secondary battery
15: electrode sheet for all-solid state secondary battery
17: negative electrode active material sheet
18: solid electrolyte sheet
19: positive electrode active material sheet
21: negative electrode active material layer (applied and dried layer)
22: solid electrolyte layer (applied and dried layer)
22A: solid electrolyte layer (applied and dried layer) after peeling off support
23: support
24: positive electrode active material layer (applied and dried layer)

What is claimed is:

1. A method of manufacturing an all-solid state secondary battery having a layer configuration in which a positive electrode active material layer, a solid electrolyte layer, and a negative electrode active material layer are laminated in this order, the method comprising:
a pre-compression bonding step of laminating a solid electrolyte layer and one of a positive electrode active material layer or a negative electrode active material layer to form a laminate and compressing the laminate to bond the layers, the solid electrolyte layer being formed on a support and including a binder consisting of a polymer and an inorganic solid electrolyte;
a step of peeling off the support from the solid electrolyte layer such that 1% to 10 mass % of the solid electrolyte layer that is compressed and bonded to the active material layer remains in the support; and
a post-compression bonding step of laminating the solid electrolyte layer from which the support is peeled off and another one of the positive electrode active material layer or the negative electrode active material layer to form a laminate and compressing the laminate to bond the layers.

2. The method of manufacturing an all-solid state secondary battery according to claim 1, further comprising:
a step of forming a film on the support using a solid electrolyte composition including a binder consisting of a polymer and an inorganic solid electrolyte before the pre-compression bonding step.

3. The method of manufacturing an all-solid state secondary battery according to claim 1,
wherein the binder is a particle binder.

4. The method of manufacturing an all-solid state secondary battery according to claim 1,
wherein in the pre-compression bonding step, a content of the binder in the solid electrolyte layer is 2% to 5 mass % and a compression force is 5 to 100 MPa.

5. The method of manufacturing an all-solid state secondary battery according to claim 1,
wherein a thickness of the solid electrolyte layer formed on the support is 20 to 100 μm.

6. The method of manufacturing an all-solid state secondary battery according to claim 1,
wherein in the peeling step, the support is peeled off in a state where 1% to 5 mass % of the solid electrolyte layer remains.

7. The method of manufacturing an all-solid state secondary battery according to claim 1, further comprising:
a final compression step of compressing the laminate that is obtained in the post-compression bonding step and includes the positive electrode active material layer, the solid electrolyte layer, and the negative electrode active material layer at a compression force of 100 to 1000 MPa.

8. A method of manufacturing an electrode sheet for an all-solid state secondary battery, the electrode sheet for an all-solid state secondary battery comprises one of a positive electrode active material layer or a negative electrode active material layer; and a solid electrolyte layer that is laminated on the active material layer, wherein the solid electrolyte layer includes a binder consisting of a polymer and an inorganic solid electrolyte and has unevenness on a surface, whose recess portions are formed in a state where 1% to 10 mass % of the solid electrolyte layer with respect to the total mass of the inorganic solid electrolyte layer falls out,
the method comprising:
a pre-compression bonding step of laminating a solid electrolyte layer and one of a positive electrode active material layer or a negative electrode active material layer to form a laminate and compressing the laminate to bond the layers, the solid electrolyte layer being formed on a support; and
a step of peeling off the support from the solid electrolyte layer such that 1% to 10 mass % of the solid electrolyte layer that is compressed and bonded to the active material layer remains in the support.

* * * * *